United States Patent [19]

Wolf et al.

[11] Patent Number: 5,757,181
[45] Date of Patent: *May 26, 1998

[54] ELECTRONIC CIRCUIT FOR AUTOMATICALLY COMPENSATING FOR ERRORS IN A SENSOR WITH AN ANALOG OUTPUT SIGNAL

[75] Inventors: Ronald J. Wolf; Martin James Lynch, both of Elkhart; John Richard Nuss, Goshen, all of Ind.

[73] Assignee: Durakool Incorporated, Elkhart, Ind.

[*] Notice: The term of this patent shall not extend beyond the expiration date of Pat. No. 5,497,081.

[21] Appl. No.: 486,650

[22] Filed: Jun. 7, 1995

Related U.S. Application Data

[63] Continuation-in-part of Ser. No. 51,412, Apr. 28, 1993, Pat. No. 5,497,081, which is a continuation-in-part of Ser. No. 902,075, Jun. 22, 1992, Pat. No. 5,332,965.

[51] Int. Cl.$^6$ .................... G01B 7/14; G01R 35/00
[52] U.S. Cl. .................... 324/270.12; 324/207.2; 324/225
[58] Field of Search .................... 324/207.12, 207.25, 324/207.21, 207.22, 225, 235, 173, 174

[56] References Cited

U.S. PATENT DOCUMENTS

| | | |
|---|---|---|
| 2,942,177 | 6/1960 | Neumann et al. |
| 2,992,369 | 7/1961 | LaRocca |
| 3,060,370 | 10/1962 | Varterasian |
| 3,112,464 | 11/1963 | Ratajski et al. |
| 3,118,108 | 1/1964 | Zoss et al. |
| 3,185,920 | 5/1965 | Brunner |

(List continued on next page.)

FOREIGN PATENT DOCUMENTS

| | | |
|---|---|---|
| 0053938 | 6/1982 | European Pat. Off. |
| 0363738 | 4/1990 | European Pat. Off. |
| 4014885 | 11/1990 | Germany |
| 56-107119 | 8/1981 | Japan |
| 1416925 | 12/1975 | United Kingdom |
| WO88/07172 | 9/1988 | WIPO |

OTHER PUBLICATIONS

A Smart Pressure Sensor with On–Chip Calibration and Compensation Capability by E. Obermeier et al., *Sensors*, Mar., 1995, pp. 20, 21, 52 and 53.

Ravi, Vig, "Power Hall–Effect Sensor Take to the Road," *Machine Design*, Aug. 23, 1990, pp. 113–119.

*Primary Examiner*—Walter E. Snow
*Attorney, Agent, or Firm*—Fitch, Even, Tabin & Flannery

[57] ABSTRACT

A smart angular position sensor includes electronic circuitry for automatically compensating for errors in the output signal of the sensor. The electronic circuitry includes an electronic memory for storing predetermined compensation values used to compensate the output signal of the sensor. The predetermined compensation values are determined by comparing the output signal of the sensor with ideal values at predetermined angular positions. The deviation of the actual values relative to the ideal values is used in determining the compensation values. The compensation values are stored in the electronic memory and are used to automatically compensate the output signal of the sensor.

19 Claims, 17 Drawing Sheets

U.S. PATENT DOCUMENTS

| | | |
|---|---|---|
| 3,473,109 | 10/1969 | Maaz et al. . |
| 3,482,163 | 12/1969 | Peek et al. . |
| 3,818,292 | 6/1974 | Berman . |
| 3,988,710 | 10/1976 | Sidor et al. . |
| 4,066,962 | 1/1978 | Jaffe . |
| 4,086,533 | 4/1978 | Ricouard et al. . |
| 4,107,604 | 8/1978 | Bernier . |
| 4,156,191 | 5/1979 | Knight et al. . |
| 4,293,814 | 10/1981 | Boyer . |
| 4,293,837 | 10/1981 | Jaffe et al. . |
| 4,377,088 | 3/1983 | Evert . |
| 4,392,375 | 7/1983 | Eguchi et al. . |
| 4,524,932 | 6/1985 | Bodziak . |
| 4,570,118 | 2/1986 | Tomczak et al . . |
| 4,731,579 | 3/1988 | Petersen et al. . |
| 4,745,363 | 5/1988 | Carr et al. . |
| 4,771,237 | 9/1988 | Daley .................................. 324/202 |
| 4,798,920 | 1/1989 | Mehino et al. .................. 324/207.12 |
| 4,829,248 | 5/1989 | Loubier . |
| 4,857,842 | 8/1989 | Sturman et al. . |
| 4,893,502 | 1/1990 | Kubota et al. . |
| 4,922,197 | 5/1990 | Juds et al. . |
| 4,970,463 | 11/1990 | Wolf et al. . |
| 4,992,731 | 2/1991 | Lorenzen . |
| 5,045,920 | 9/1991 | Ravi Vig et al. . |
| 5,087,879 | 2/1992 | Sugifune et al. . |
| 5,144,233 | 9/1992 | Christenson et al. . |
| 5,159,268 | 10/1992 | Wu . |
| 5,164,668 | 11/1992 | Alfors . |
| 5,274,328 | 12/1993 | Begin et al. . |
| 5,285,154 | 2/1994 | Burreson . |
| 5,311,124 | 5/1994 | Hubbard et al. . |
| 5,332,965 | 7/1994 | Wolf et al. . |
| 5,341,097 | 8/1994 | Wu . |
| 5,351,003 | 9/1994 | Bauer et al. . |
| 5,363,361 | 11/1994 | Baka . |
| 5,369,361 | 11/1994 | Wada . |
| 5,406,200 | 4/1995 | Begin et al. . |
| 5,497,081 | 3/1996 | Wolf et al. ..................... 324/207.12 |

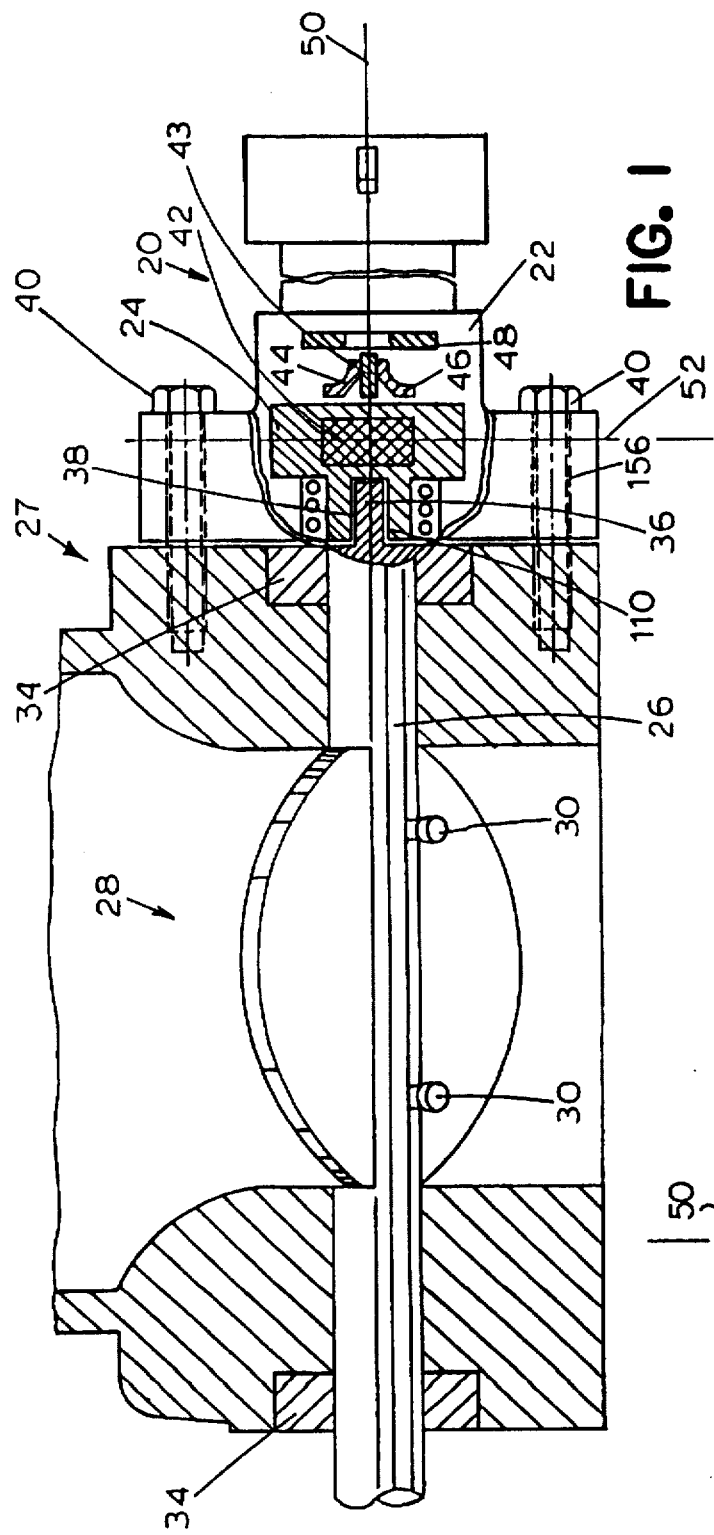
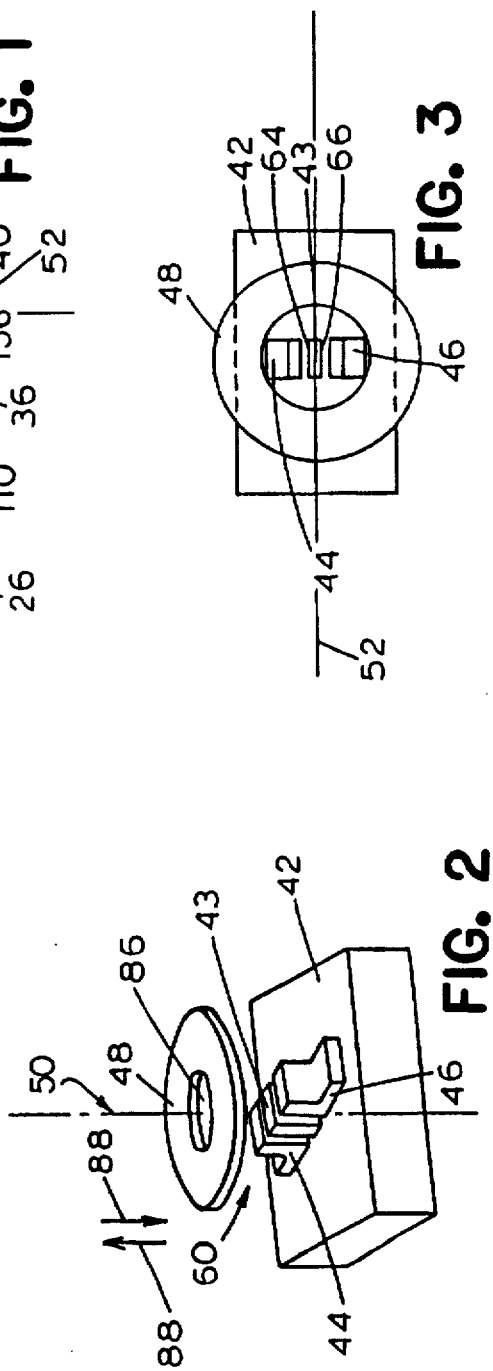

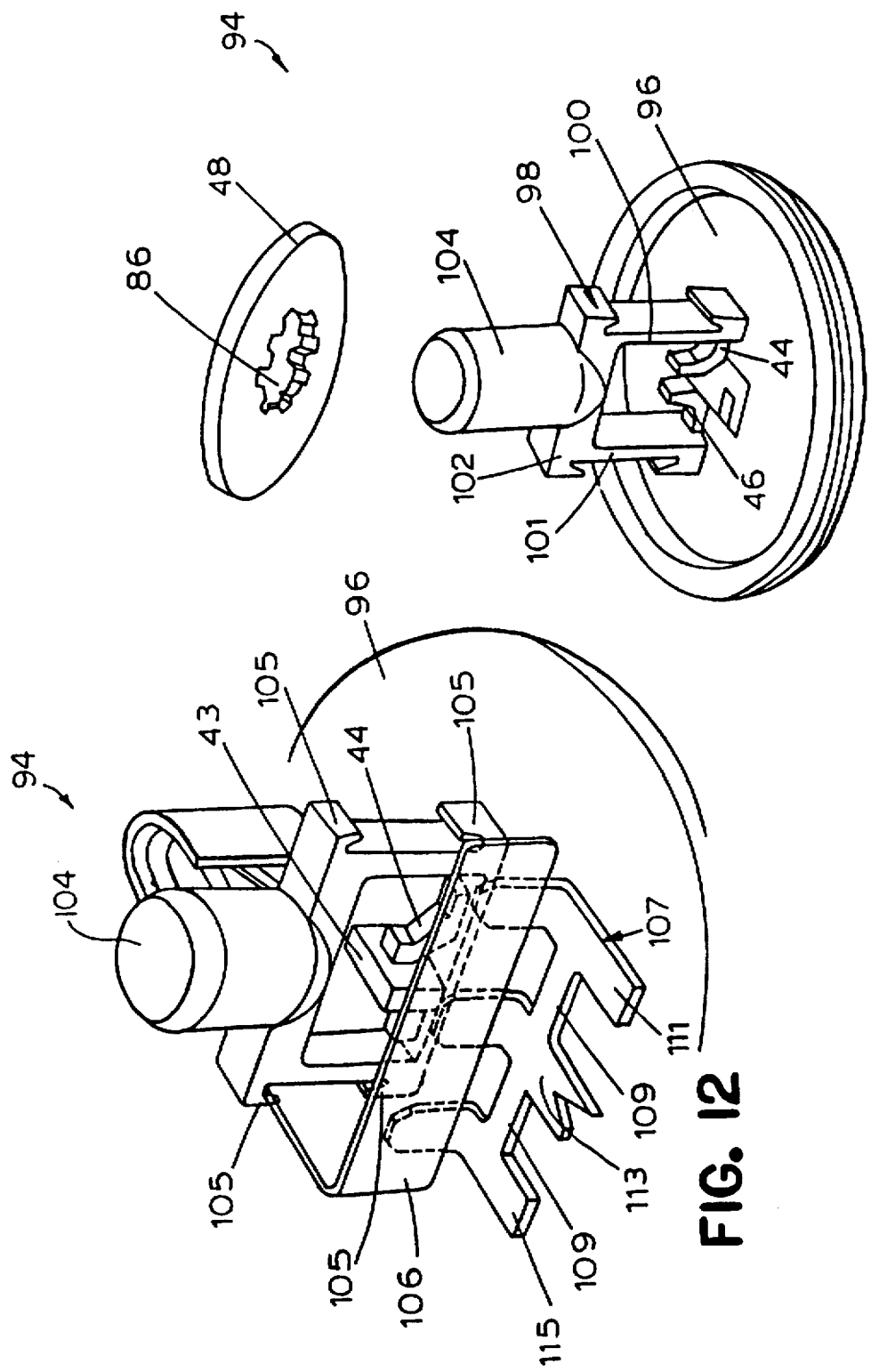

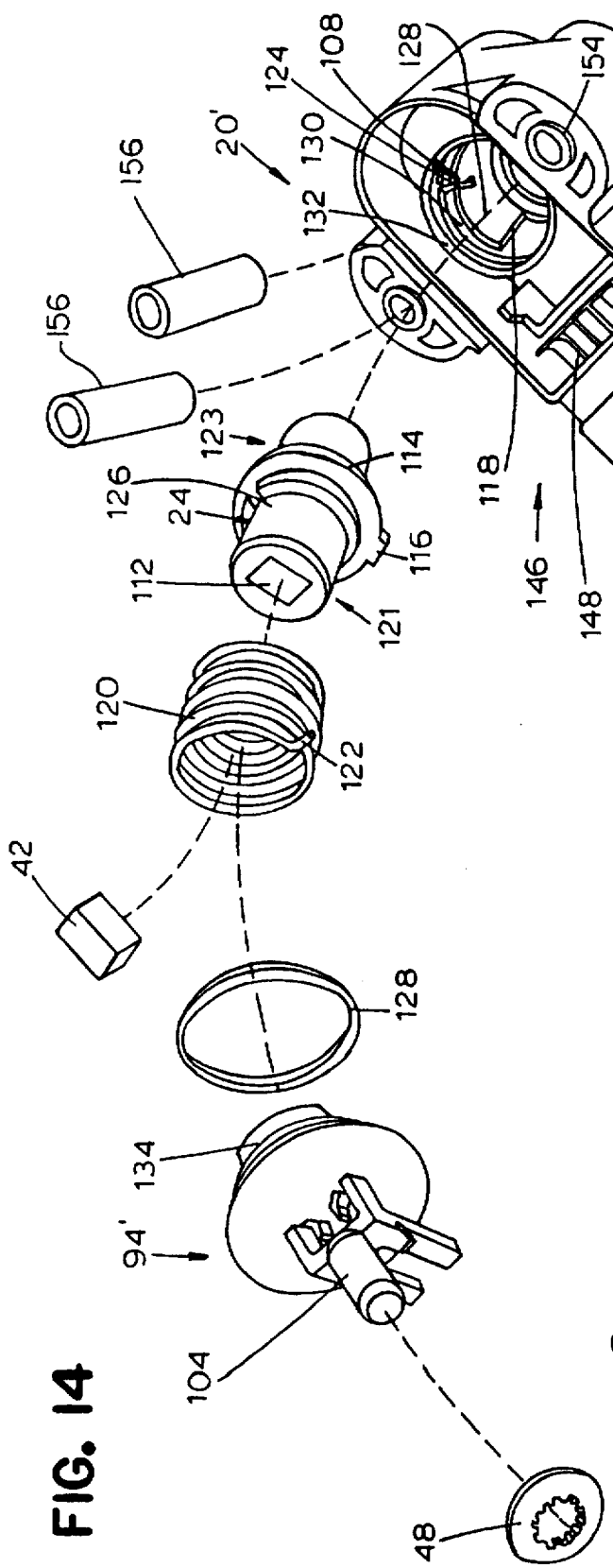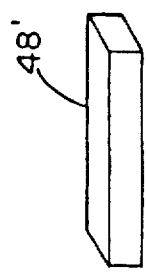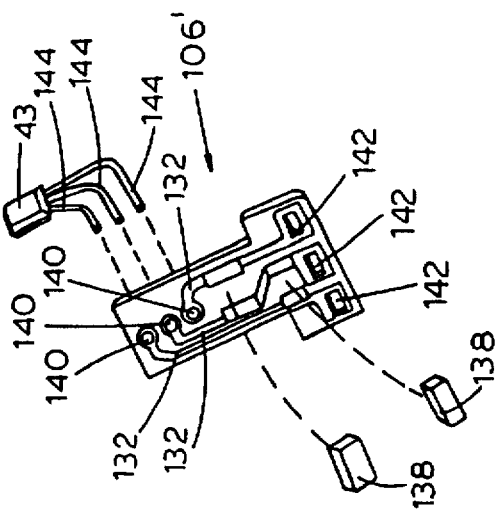
FIG. 14
FIG. 15

| | CALIBRATION ANGLE | MEASURED | IDEAL | M | B |
|---|---|---|---|---|---|
| $\theta_0$ | 14.4 | 1.170 | 0.825 | | |
| $\theta_1$ | 17.4 | 1.262 | 0.965 | 1.522 | -.955 |
| $\theta_2$ | 20.4 | 1.358 | 1.104 | 1.448 | -.862 |
| $\theta_3$ | 34.8 | 1.856 | 1.774 | 1.345 | -.722 |
| $\theta_4$ | 49.2 | 2.418 | 2.444 | 1.192 | -.438 |
| $\theta_5$ | 63.6 | 3.030 | 3.113 | 1.053 | -.199 |
| $\theta_6$ | 78.0 | 3.561 | 3.783 | 1.267 | -.710 |
| $\theta_7$ | 92.4 | 4.037 | 4.452 | 1.405 | -1.220 |

ELECTRONIC CIRCUIT FOR AUTOMATICALLY COMPENSATING FOR ERRORS IN A SENSOR WITH AN ANALOG OUTPUT SIGNAL

CROSS-REFERENCE TO RELATED APPLICATIONS

This application is a continuation-in-part of U.S. patent application Ser. No. 08/051,412 filed on Apr. 28, 1993, now U.S. Pat. No. 5,497,081, which is a continuation-in-part of U.S. patent application Ser. No. 07/902,075, filed on Jun. 22, 1992, now U.S. Pat. No. 5,332,965.

BACKGROUND OF THE INVENTION

1. Field of the Invention

The present invention relates to a smart angular position sensor and more particularly to a linear non-contact angular position sensor for sensing the angular position of a pivotally mounted device, such as a throttle valve, which includes a magnetic sensing element, such as a Hall effect integrated circuit (IC) and electronic circuitry which automatically compensates for errors in the output signal of the magnetic sensing element.

2. Description of the Prior Art

Angular position sensors are known to be used for various purposes including throttle position sensors for determining the angular position of a butterfly valve in a throttle body. Examples of such sensors are disclosed in U.S. Pat. Nos. 4,893,502 and 5,332,965. Such sensors are generally used to sense the angular position of the butterfly valve in the throttle body in order to control the amount of fuel applied to the combustion chamber of an internal combustion engine.

Such throttle position sensors, such as the sensors disclosed in U.S. Pat. Nos. 4,893,502 and 5,332,956, are typically subject to part-to-part variations which require each and every sensor to be calibrated either by the throttle body manufacturer as in the case of U.S. Pat. No. 4,893,502 or the sensor manufacturer as in the case of U.S. Pat. No. 5,332,965. In the embodiment disclosed in the '502 patent, a circular magnet is rigidly secured directly to the butterfly valve shaft. A magnet-resistive element (MRE) is disposed within a modified throttle body at a fixed air gap relative to the circular magnet. An amplifying circuit with variable gain is used to calibrate the sensor by way of potentiometers or variable resistors. As is known in the art, the output of such potentiometers may vary with temperature or time. Due to the relatively wide operating temperature range of such a sensor used in an internal combustion engine environment, such potentiometers will drift and affect the overall calibration of the device. The sensor disclosed in the '965 patent is mechanically adjusted; and thus, the calibration is not subject to drift as in the case of the '502 patent. However, such mechanical adjustments are time-consuming and cumbersome, which increases the overall labor cost to manufacture the product.

SUMMARY OF THE INVENTION

It is an object of the present invention to solve various known problems associated with angular position sensors.

It is yet another object of the present invention to provide an angular position sensor which automatically compensates for errors in the output signal.

It is yet another object of the present invention to provide a non-contact angular position sensor.

It is yet another object of the present invention to provide an angular position sensor that provides a generally linear output over a relatively wide temperature range.

Briefly, the present invention relates to a smart angular position sensor which includes electronic circuitry for automatically compensating for errors in the output signal of the sensor. The electronic circuitry includes an electronic memory for storing predetermined compensation values used to compensate the output signal of the sensor. The predetermined compensation values are determined by comparing the output signal of the sensor with ideal values at predetermined angular positions. The deviation of the actual values relative to the ideal values is used in determining the compensation values. The compensation values are stored in the electronic memory and are used to automatically compensate the output signal of the sensor.

BRIEF DESCRIPTION OF THE DRAWING

These and other objects of the present invention will be readily understood with reference to the specification and the following drawing, wherein:

FIG. 1 is a sectional view, partially broken away, of a throttle body with an angular position sensor in accordance with the present invention attached thereto;

FIG. 2 is a simplified perspective view of the angular position sensor in accordance with the present invention;

FIG. 3 is a plan view of the angular position sensor illustrated in FIG. 2;

FIG. 11 is a perspective view of one embodiment of a carrier assembly in accordance with the present invention, shown with a flux concentrator removed;

FIG. 12 is a perspective view of the assembly illustrated in FIG. 11 in a further stage of development;

FIG. 14 is an exploded perspective view of an alternate embodiment of the angular position sensor in accordance with the present invention;

FIG. 15 is a perspective view of a flux concentrator in accordance with the present invention;

3

Figure 18:
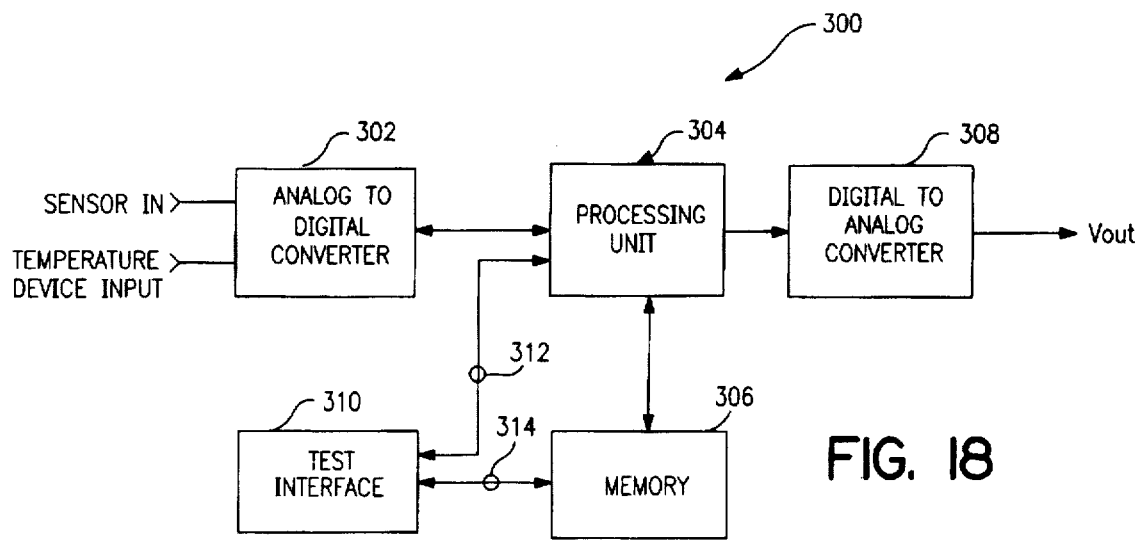
FIG. 18 is a block diagram of electronic circuitry for automatically compensating the output signal of an angular position sensor in accordance with the present invention.
Figure 19:
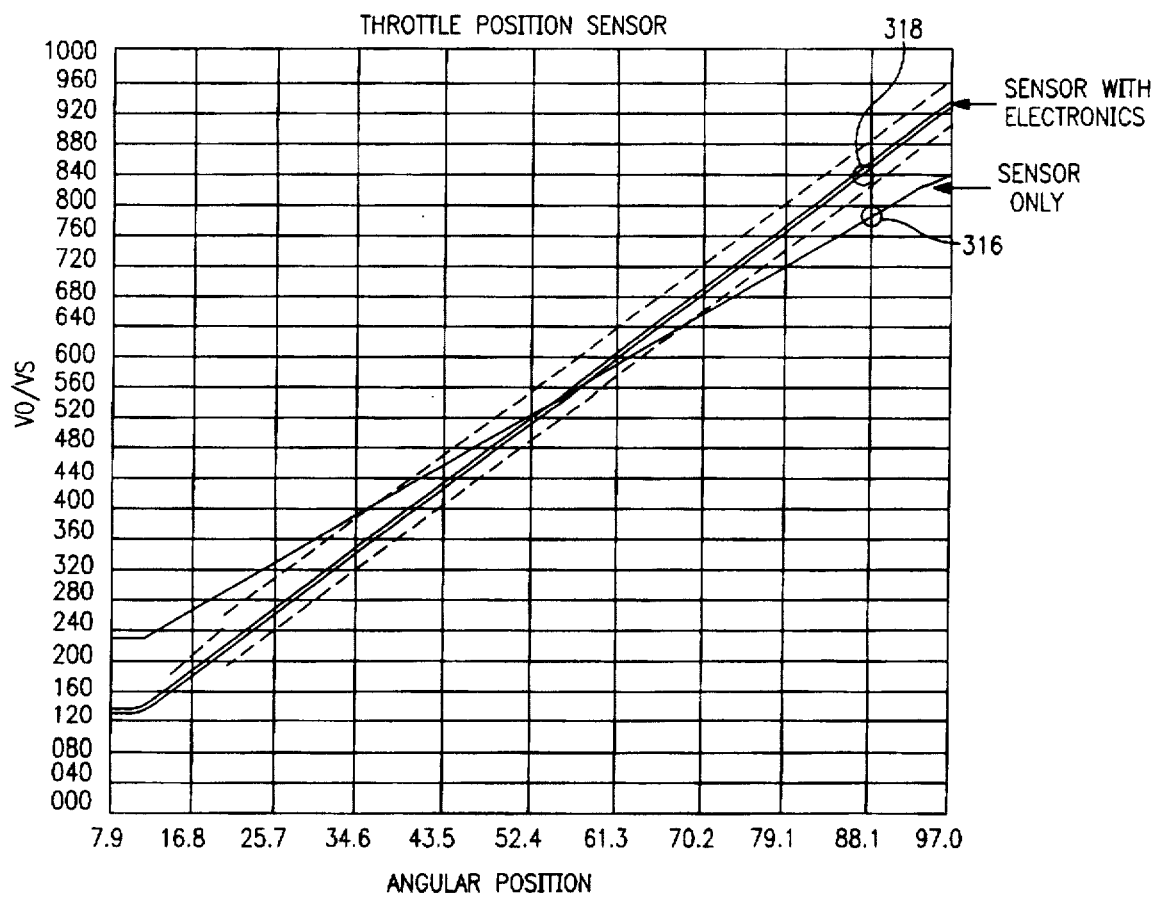

FIG. 19 is a graphical representation of the output voltage of an angular position sensor as a function of angular position, illustrating a sensor with and without the electronic circuitry illustrated in FIG. 18.

Figure 20:
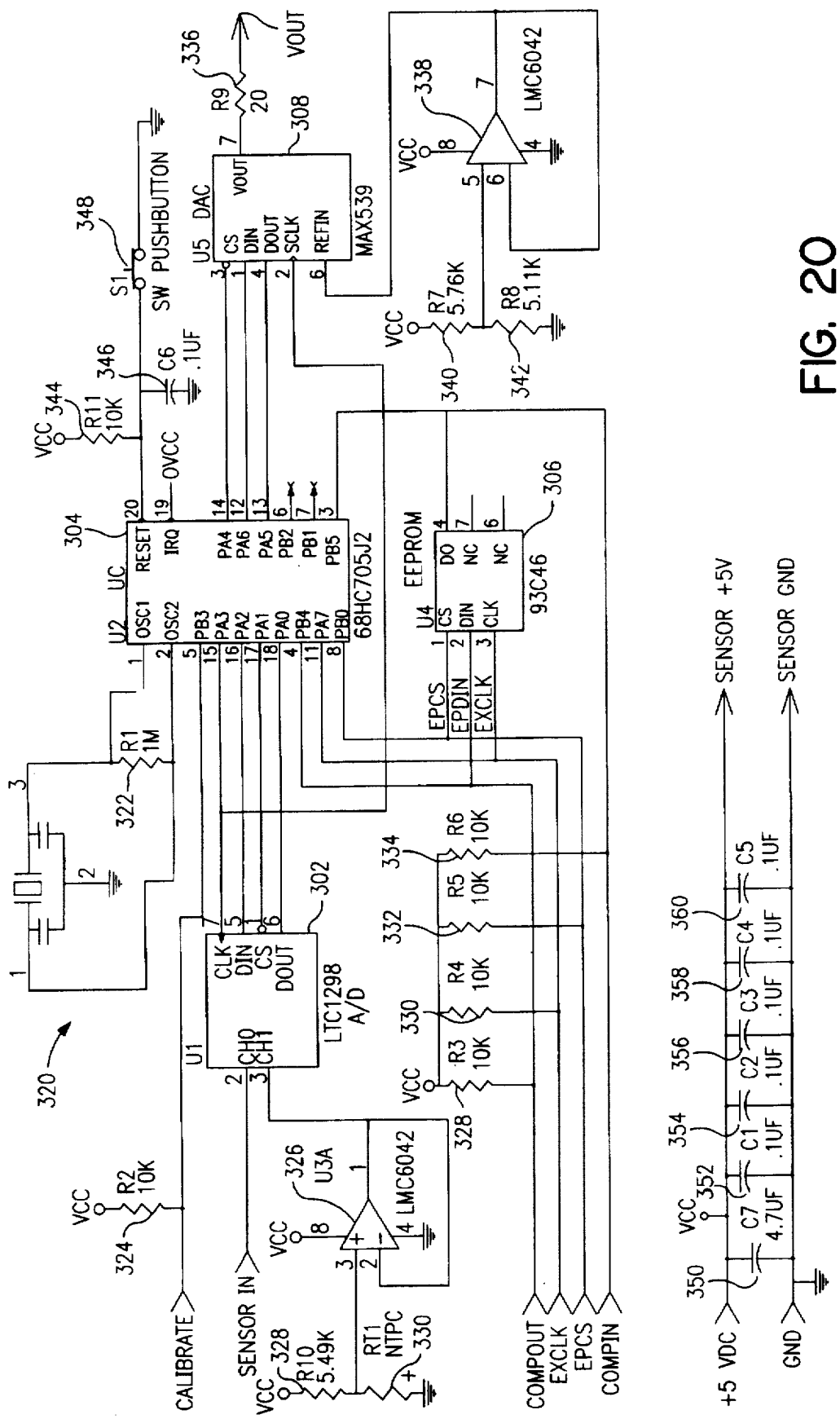

FIG. 20 is a schematic diagram of the electronic circuitry illustrated in FIG. 18.

Figure 21:
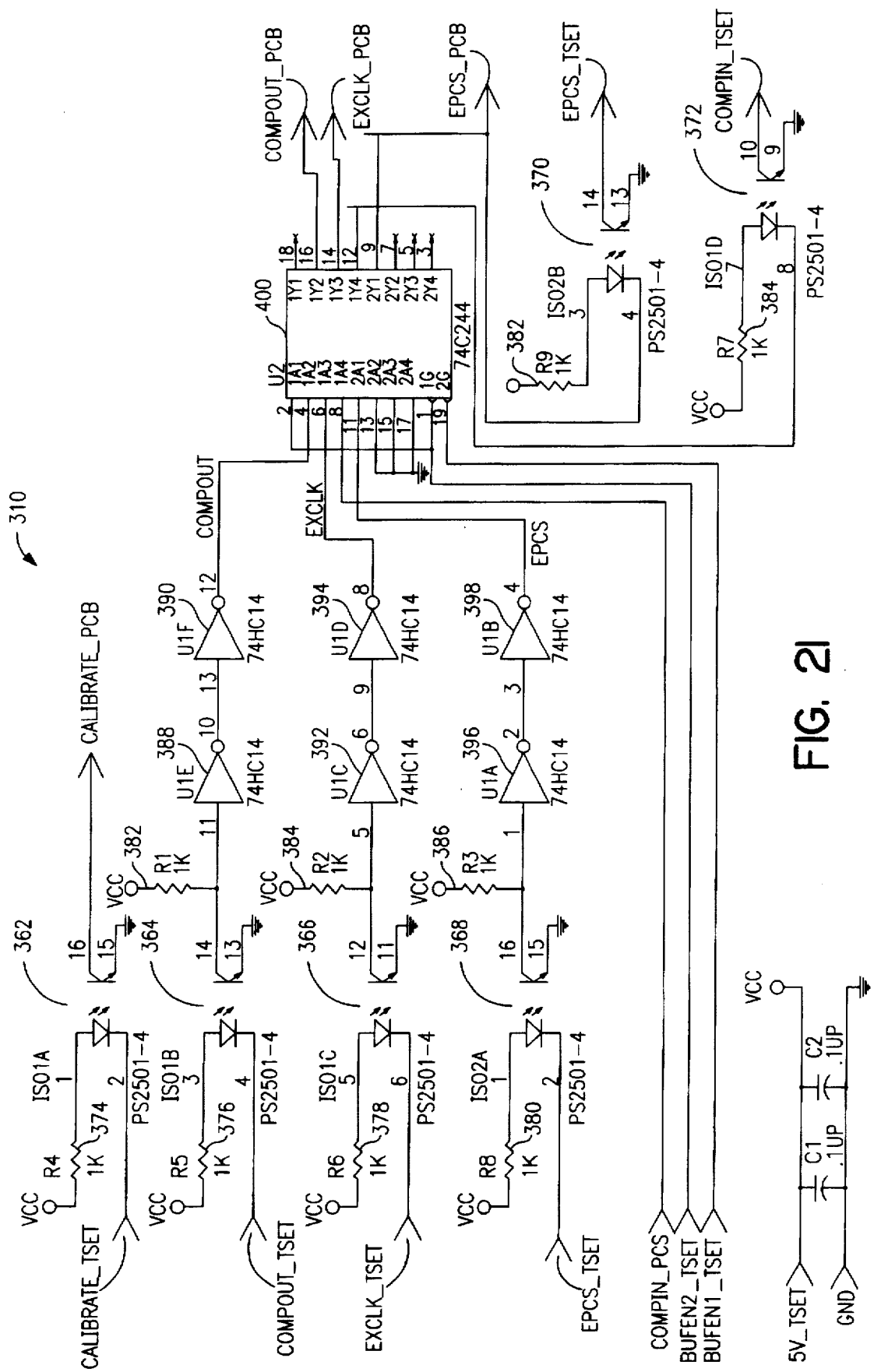

FIG. 21 is a schematic diagram of a test interface in accordance with the present invention.

Figure 22:
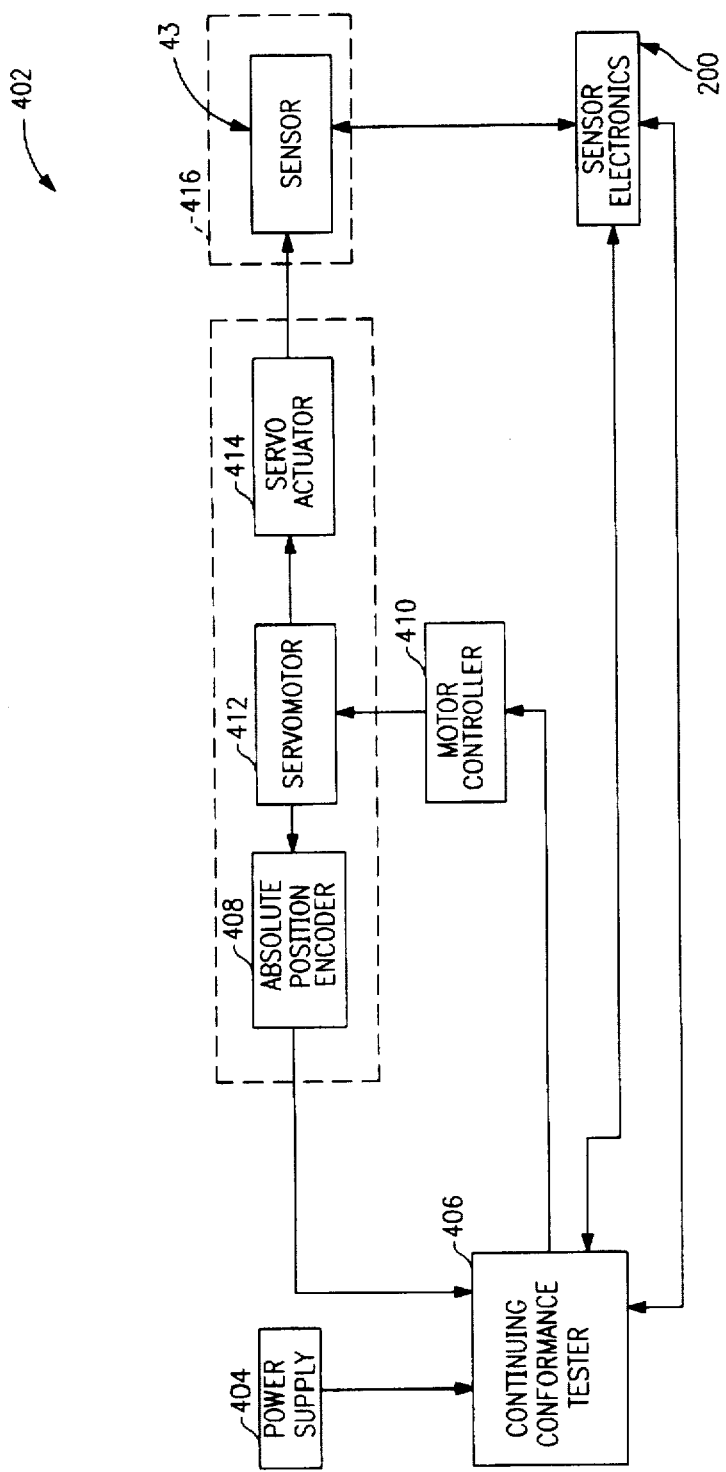

FIG. 22 is a block diagram of the test equipment for determining the compensation values in accordance with the present invention.

Figure 23:
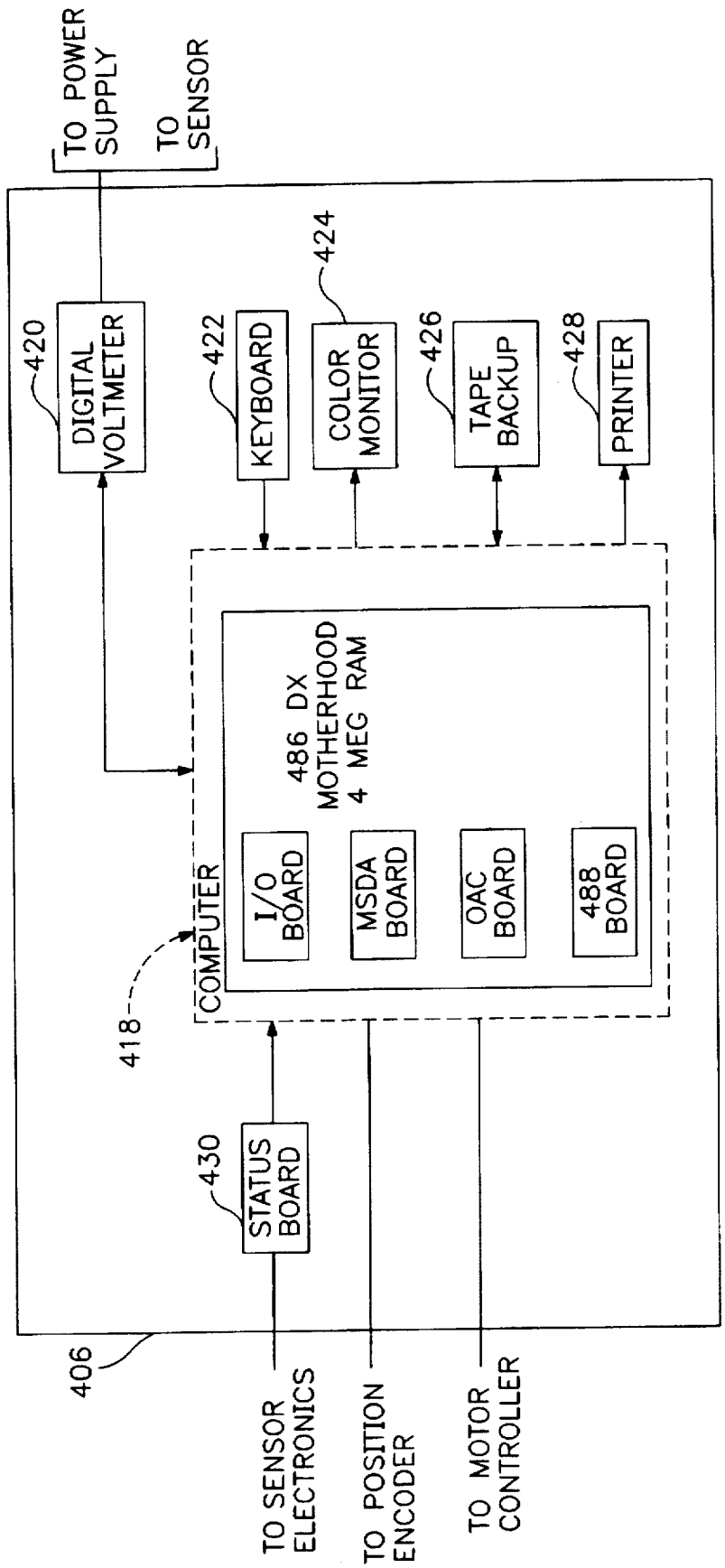

FIG. 23 is a block diagram of the personal computer interface which forms a portion of the test equipment illustrated in FIG. 22.

Figures 24, 25:
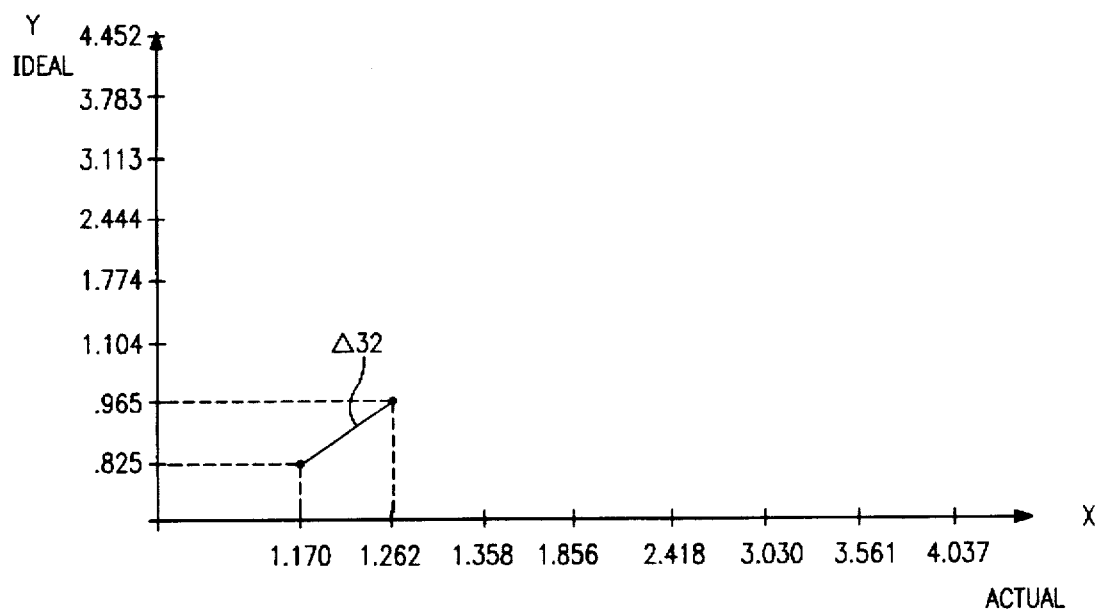

FIG. 24 is a table of exemplary values of measured and ideal values at a plurality of predetermined calibration values.

FIG. 25 is a graphical representation of the measured values as a function of ideal values illustrated in FIG. 24.

Figure 26:
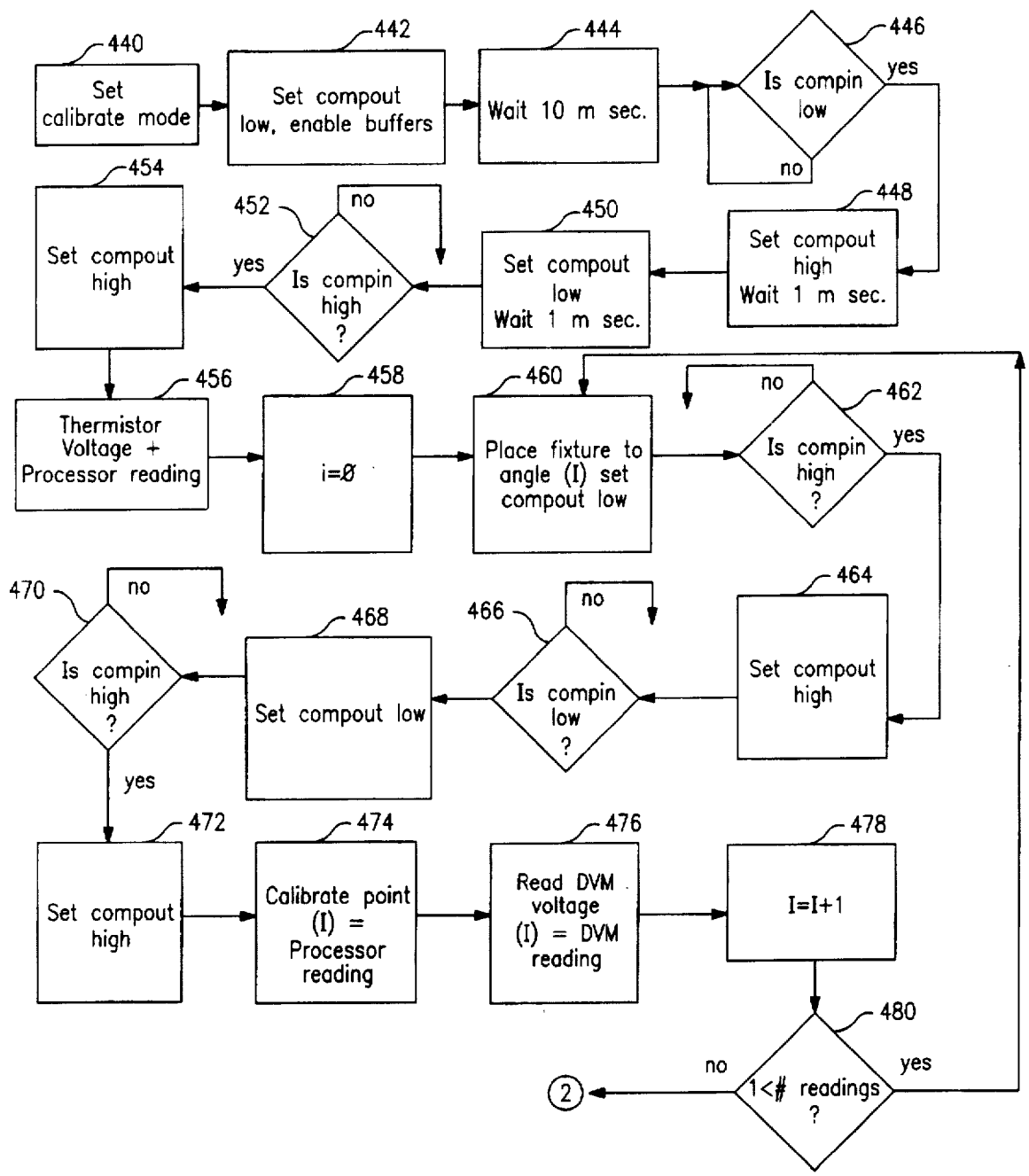
Figure 27:
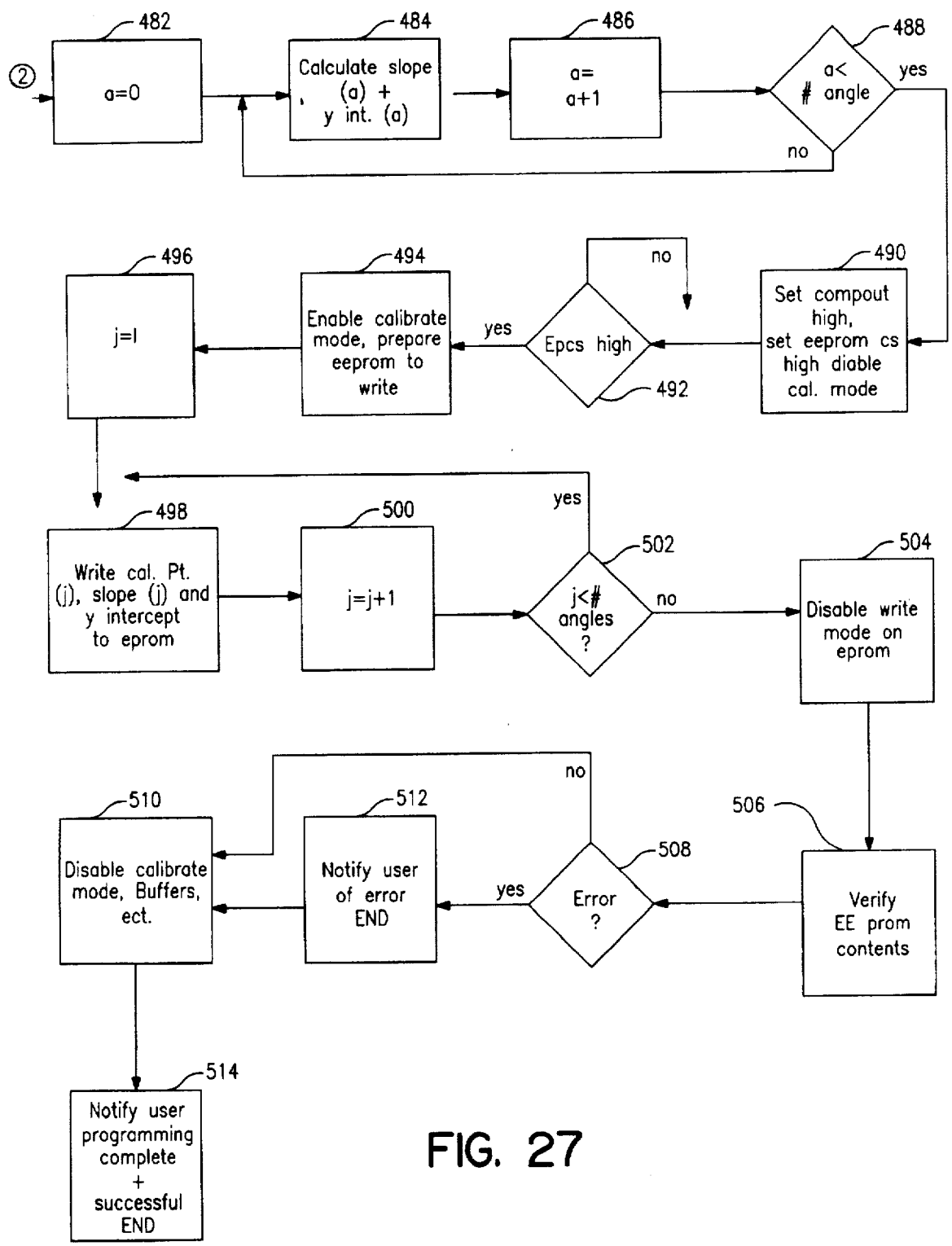

FIGS. 26 and 27 are flow charts of the software for the test equipment in accordance with the present invention.

Figure 28:
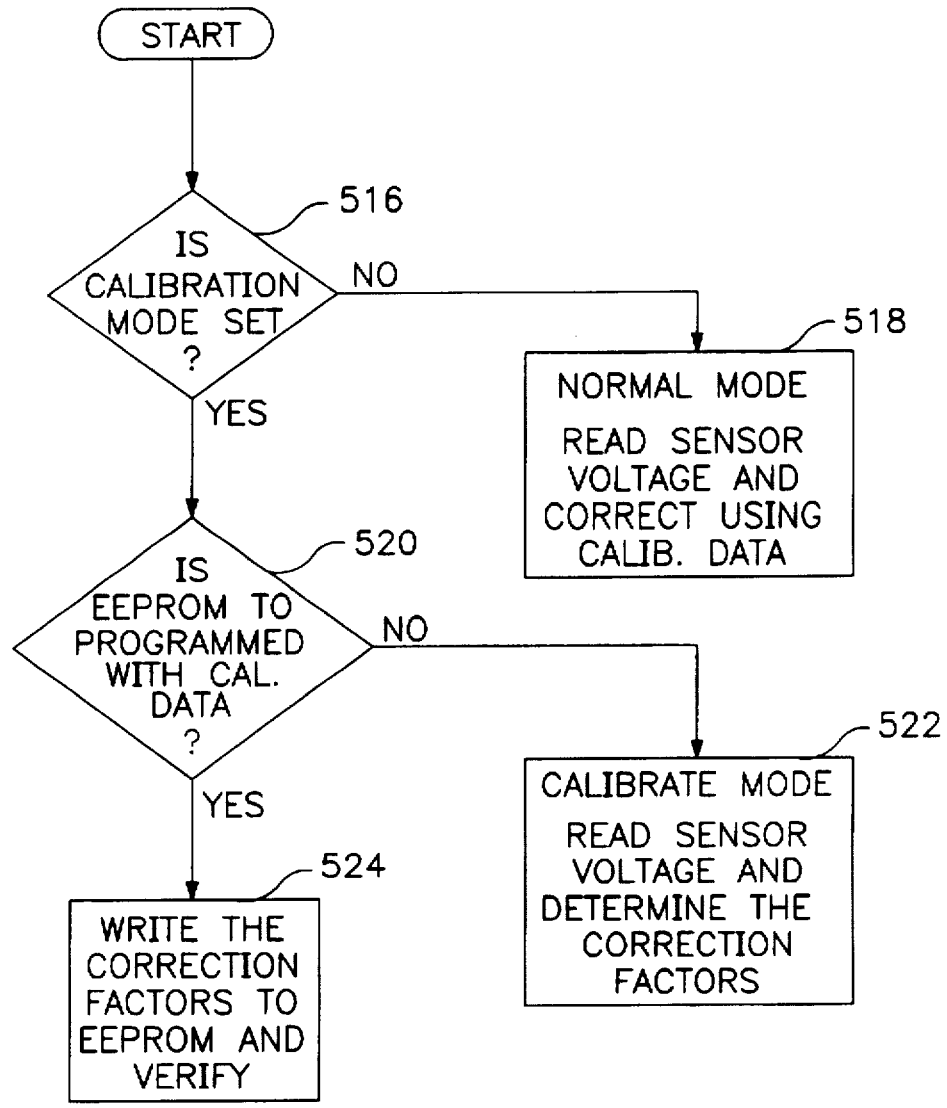
Figure 29:
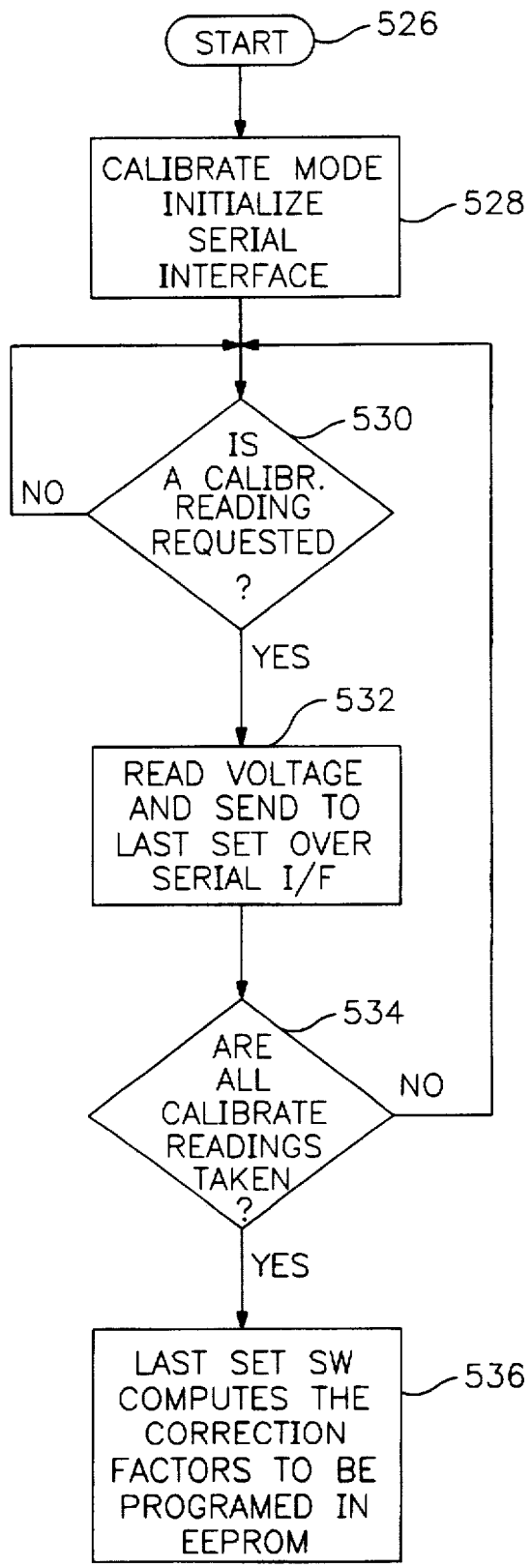
Figure 30:
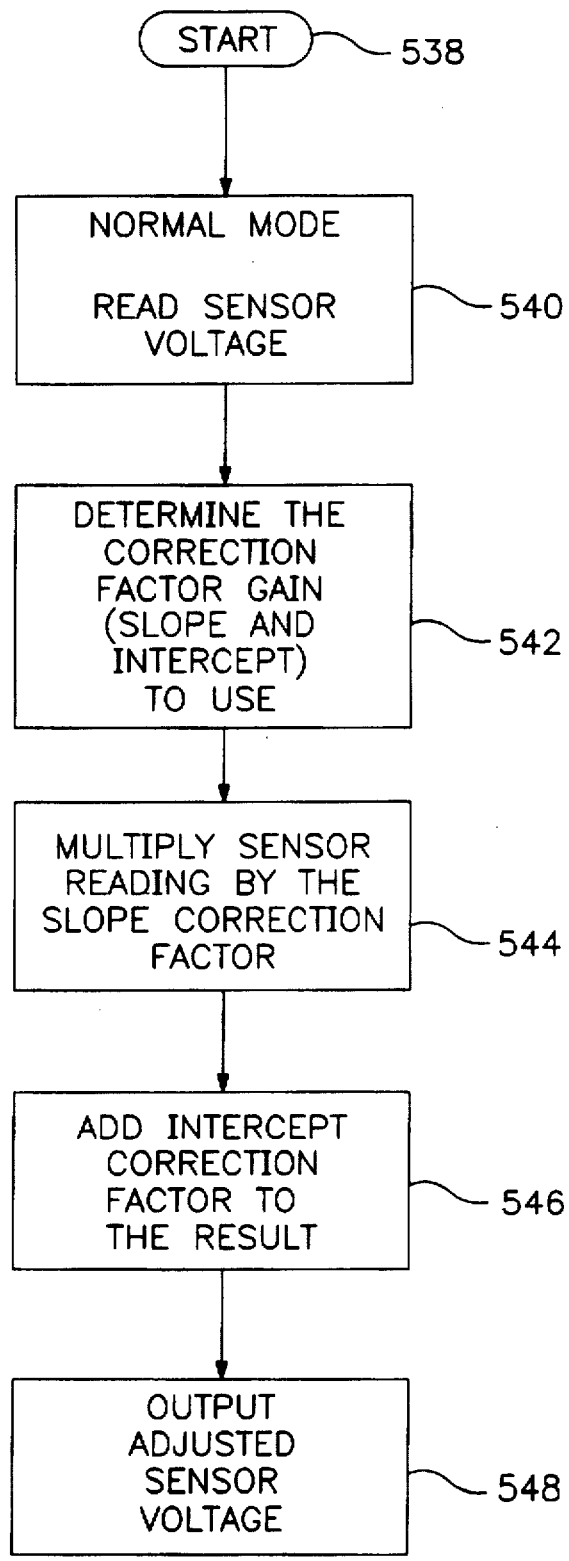

FIGS. 28–30 are flow charts of the software for the electronic circuitry in accordance with the present invention.

DETAILED DESCRIPTION OF THE PREFERRED EMBODIMENT

The angular position sensor in accordance with the present invention is generally identified with the reference numeral 20. An important aspect of the invention relates to the method for calibration. In the embodiment illustrated in FIGS. 1–17 and described below, the angular position sensor in accordance with the present invention is adjusted mechanically. In an alternative embodiment illustrated in FIGS. 18–30, the angular position sensor 20 is provided with electronic circuitry for automatically compensating for errors in the output signal.

MECHANICALLY ADJUSTABLE ANGULAR POSITION SENSOR

Referring first to FIGS. 1–17, the first embodiment of the angular position sensor 20 is adapted to be adjusted mechanically which eliminates the need for potentiometers and the like, used to calibrate known angular position sensors, such as the angular position sensor disclosed in U.S. Pat. No. 4,893,502. As discussed above, such potentiometers and the like are temperature dependent. Thus, in relatively hostile temperature environments, the calibration of such sensors is affected.

As will be appreciated by those of ordinary skill in the art, the angular position sensor 20 is adapted to be used in various applications for providing a signal representative of the angular position of a pivotally mounted device. The angular position sensor 20 is illustrated and discussed below in an application as a throttle position sensor. However, it should be appreciated by those of ordinary skill in the art that the application of the angular position sensor 20 in accordance with the present invention is also useful for various other applications.

With reference to FIG. 1, the angular position sensor 20 is disposed in its own housing 22 and includes a drive arm 24, rotatably mounted relative to the housing 22, that enables the sensor 20 to be mechanically coupled to an output shaft of a pivotally mounted device. In an application, such as a throttle position sensor, the drive arm 24 is mechanically coupled to a butterfly valve shaft 26 carried by a throttle body 27. More particularly, in such an application, a butterfly valve 28 is rigidly affixed to the rotatably mounted shaft 26 with suitable fasteners 30 or by spot welding. The shaft 26 is rotatably mounted relative to a throttle body 27 with suitable bearings 34.

The butterfly valve 28 is formed to close or throttle the air flow to an internal combustion engine (not shown). By coupling the angular position sensor 20 to the butterfly valve shaft 26, the angular position sensor 20 is adapted to provide a signal representative of the angular position of the butterfly valve 28 for use in controlling the amount of fuel applied to the combustion chamber in an internal combustion engine.

It is contemplated that the shaft 26 and the drive arm 24 be prevented from rotating relative to each other. Various means can be used for preventing such rotation; all of which are intended to be included within the broad scope of the invention. As shown, the butterfly valve shaft 26 is formed with a reduced cross-sectional area portion or tongue 36 which extends outwardly from one side of a throttle body 27 to allow engagement with the drive arm 24. In order to prevent the rotation of the tongue 36 relative to the drive arm 24, the tongue 36 may be formed with a non-circular cross-section that is adapted to mate with a cooperating recess 38 formed in the drive arm 24.

Another important aspect of the angular position sensor 20 is that it is formed as a separate unit that is adapted to rather quickly and easily be secured to, for example, the throttle body 27 by way of suitable fasteners 40. By providing the angular position sensor 20 as a separate unit, the calibration of the sensor 20 can be done at the factory by the sensor manufacturer. In contrast, some known angular position sensors are incorporated directly into the throttle body, for example, as disclosed in U.S. Pat. No. 4,893,502. In such an embodiment, calibration of the sensor is normally done by the throttle body manufacturer whose experience with such sensors is admittedly less than the sensor manufacturer.

FIGS. 2 and 3 illustrate the basic principles of the angular position sensor 20 in accordance with the present invention. In particular, the angular position sensor 20 includes a magnet 42, preferably a standard bar-shaped magnet defining opposing North and South magnetic poles, a magnetic sensing element 43, a pair of generally L-shaped flux concentrators 44 and 46 and an additional flux concentrator 48, used for adjustment. As will be discussed in more detail below, the magnet 42 is adapted to be mounted in the drive arm 24 for rotation about an axis 50 (FIG. 1) that is generally perpendicular to a magnetic axis 52 which interconnects the opposing North and South magnetic poles, as shown in FIG. 1. As will be discussed in more detail below, the magnet 42 is mounted within the drive arm 24 such that the axis of rotation 50 of the magnet is coaxial with the butterfly valve shaft 26 and generally perpendicular to the magnetic axis 52 such that rotation of the butterfly valve shaft 26 causes rotation of the magnet 42 about the axis 50 by a corresponding amount.

The magnetic sensing element 43 is preferably a Hall effect IC with on-chip amplifier circuits, for example, an Allergo Model No. 3506. Since the angular position sensor 20 is adjusted mechanically, there is no need for external circuitry for electrically adjusting the sensor 20. As such, the output of the magnetic sensing device 43 is adapted to be directly coupled to the fuel control circuit (not shown) for the internal combustion engine. By eliminating the need for external potentiometers or variable resistors, the need for conductive tracings on a printed circuit board to connect the magnetic sensing device 43 to such external potentiometers or variable resistors is eliminated. As mentioned above, the conductive tracings in such an application can act as antennas and thus subject the sensor to various electromagnetic interference. In sensors which incorporate such external potentiometers or variable resistors for adjustment, for example, as disclosed in U.S. Pat. No. 4,893,502, the circuitry must be shielded against electromagnetic interferences which adds to the cost of the sensor. Such external potentiometers or variable resistors are also affected by temperature. Thus, in a relatively hostile environment, such as an under-hood environment of an internal combustion engine, the calibration drifts with temperature change. The angular position sensor 20 in accordance with the present invention solves these problems by using a mechanical adjustment for the sensor which eliminates the need for external potentiometers and the like.

Figure 13:
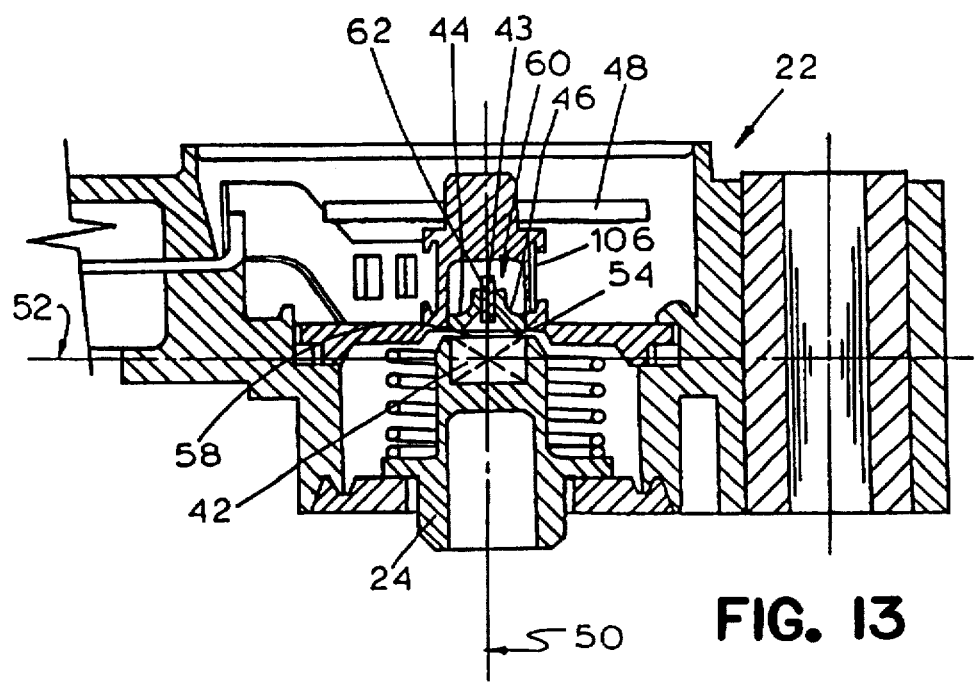
FIG. 13 is a cross-sectional view of an angular position sensor incorporating the carrier assembly illustrated in FIGS. 11 and 12.

As best shown in FIG. 13, the magnetic sensing element 43 is mounted stationary relative to the housing 22 at a fixed air gap 54 relative to a surface 58 of the magnet 42 that is generally parallel to the magnetic axis 52. The generally L-shaped flux concentrators 44 and 46 are rigidly disposed relative to the magnetic sensing device 43 forming an assembly 60. In particular, the magnetic sensing device 43 is sandwiched between the generally L-shaped flux concentrators 44 and 46 to form the assembly 60. The assembly 60 is disposed such that a sensing plane 62, defined by the magnetic sensing element 43, is generally parallel to the axis of rotation 50 of the magnet 42. As shown, a Hall effect IC is used as the magnetic sensing element 43. In such an embodiment, the sensing plane 62 is defined as a plane generally parallel to opposing surfaces 64 and 66, shown in FIG. 4.

As shown in FIG. 2, the assembly 60 is disposed such that the axis of rotation 50 of the magnet 42 is through the midpoint of the magnetic sensing device 43 and parallel to the sensing plane 62. However, it is also contemplated that the assembly 60 can be disposed such that the axis of rotation 50 is offset from the midpoint of the magnetic sensing element 43 along an axis generally parallel to the sensing plane 62.

Figure 4:
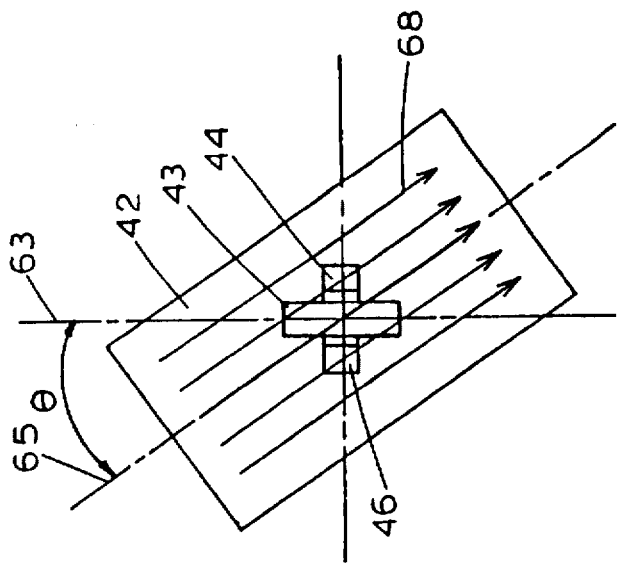
FIG. 4 is a simplified plan view of the angular position sensor in accordance with the present invention illustrating the relationship between the angular position sensor and the magnetic flux in a static position.
Figure 5:
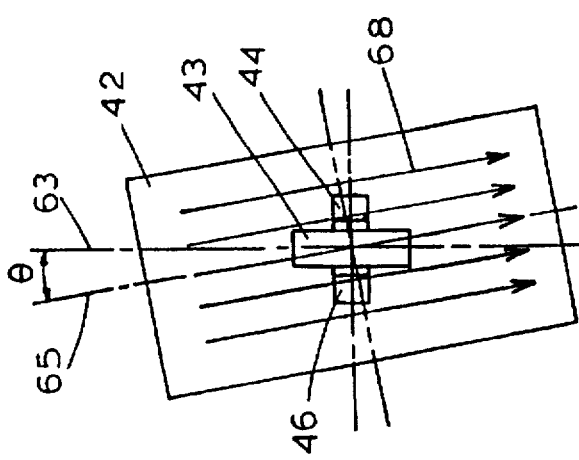
FIGS. 5 and 6 are similar to FIG. 4 and illustrate the relationship between the angular position sensor and the magnetic flux in various operating positions.
Figure 6:
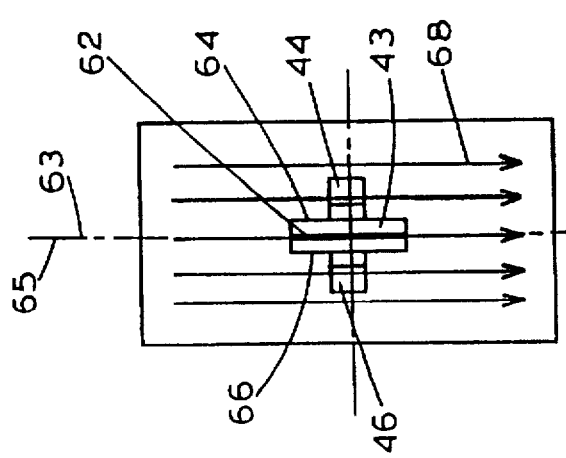

As shown in FIG. 4, the angular position sensor 20 is in a quiescent state. In this state the magnetic flux density B, represented by the arrows identified with the reference numeral 68, is generally parallel to the sensing plane 62 of the magnetic sensing device 43. In this state the magnetic sensing element 43 outputs a quiescent voltage. For an Allegro Model No. 3506 Hall effect IC, the quiescent output voltage is typically about 2.5 volts DC. Rotating the magnet 42 counterclockwise as shown in FIGS. 5 or 6 or clockwise (not shown) causes an ever increasing amount of magnetic flux density 68 to be applied to the sensing plane 62 of the magnetic sensing element 43 to vary the output voltage of the magnetic sensing element 43 as a function of an angle θ defined between an axis 63 parallel to the sensing plane 62 and an axis 65. For an Allegro Model No. 3506, the output voltage swing is approximately ±2.0 volt DC depending on the direction of the angular rotation.

In accordance with an important aspect of the invention, the relationship between the axes 63 and 65 can be varied in order to adjust the offset voltage of the sensor 20. In particular, the assembly 60 is rotated relative to the magnet 42 in a quiescent state to adjust the sensor offset voltage. In such an application, the sensor would be configured in the quiescent state to have a small angle θ between the axes 63 and 65 as illustrated in FIG. 4.

Figure 7:
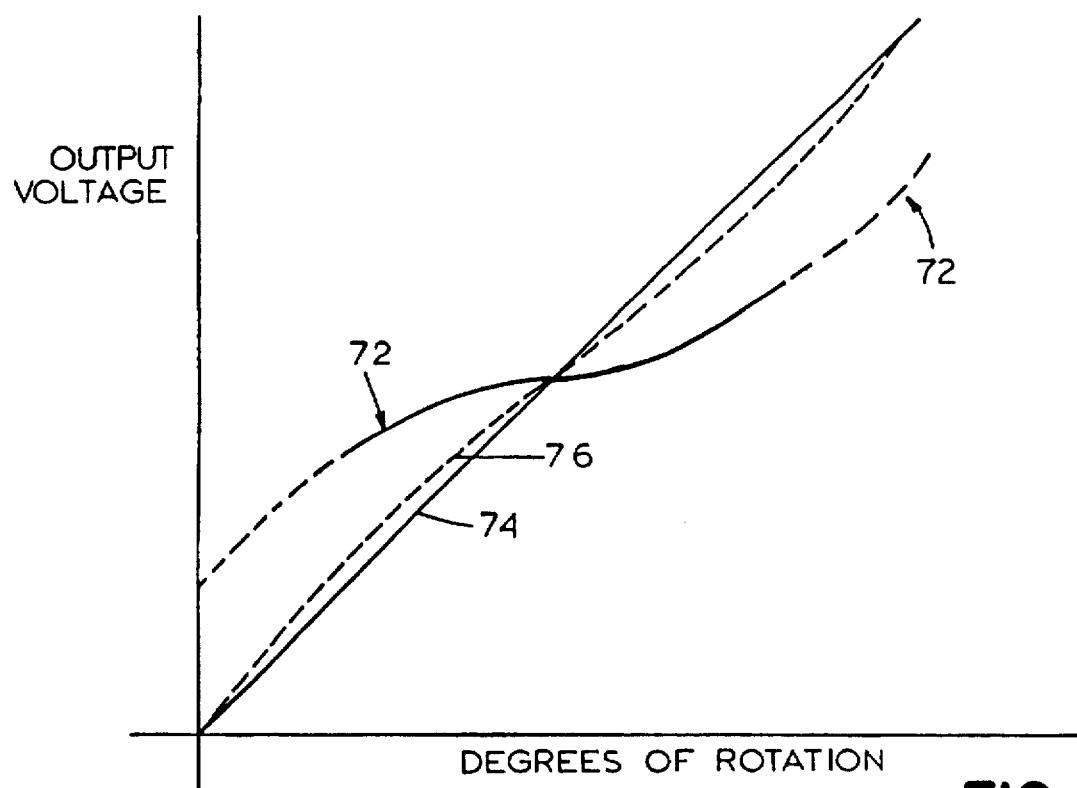
FIG. 7 is an exemplary graph illustrating the relationship between the output voltage of the angular position sensor versus degrees of rotation shown in dotted line with a superimposed curve which illustrates the effects of the flux concentrators in accordance with the present invention.

As will be discussed in more detail below, an important aspect of the invention relates to the fact that the output voltage of the angular position sensor 20 varies linearly as a function of the angular rotation of the magnet 42. As such, the output voltage of the angular position sensor 20 can be applied directly to the fuel consumption circuit for the internal combustion engine without the need for additional and expensive external circuitry. In particular, known angular position sensors have utilized various circuitry including microprocessors to linearize the output voltage, which adds to the complexity and cost of the sensor. The angular position sensor 20 in accordance with the present invention eliminates the need for such external circuitry. In particular, the output signal is linearized by way of the generally L-shaped or book-end type flux concentrators 44 and 46, which not only direct the magnetic flux and control the density and polarity of the magnetic flux density but also linearize the output signal to near straight line form. As such, the angular position sensor 20, in accordance with the present invention, is adapted to be substituted for potentiometer-type throttle position sensors which are contact devices with a finite life. More particularly, FIG. 7 illustrates a graph of the output voltage of the angular position sensor 20 as a function of the degrees of rotation. The solid line 72 represents the output of the angular position sensor 20 without the bookend shaped flux concentrators 44 and 46. As shown, the output voltage of such an embodiment varies relatively non-linearly relative to the degrees of rotation. By incorporating the book-end shaped flux concentrators 44 and 46, the output voltage of the angular position sensor 20 becomes fairly linear. More particularly, the solid line 74 represents the desired relationship between the output voltage of the angular position sensor 20 versus the degrees of rotation of the magnet 42. The dashed line 76 represents the output voltage of the sensor 20 which incorporates the book-end shaped flux concentrators 44 and 46. As illustrated, the dashed line 76 is fairly linear over the anticipated operating range of the sensor, for example, 110° rotation.

Figure 8:
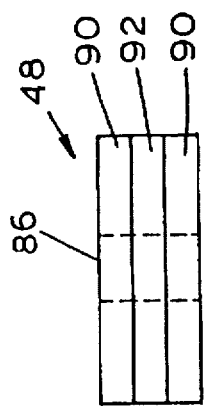
FIG. 8 is a perspective view of a pair of flux concentrators which form a portion of the present invention.
Figure 9:
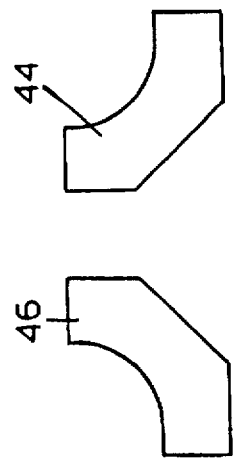
FIG. 9 is an elevational view of an alternate embodiment of the flux concentrators illustrated in FIG. 8.

The book-end shaped flux concentrators 44 and 46 are formed from a magnetically soft material—a magnetically permeable material which does not retain residual magnetism. Various configurations of the book-end shaped flux concentrators 44 and 46 are contemplated, for example, as shown in FIGS. 8 and 9. Referring to FIG. 8, the book-end flux concentrators 44 and 46 are formed in a generally L-shape defining two depending leg portions 78 and 80. The outer intersection of the depending legs 78 and 80 defines a heel portion 82. The inner intersection of the depending legs 78 and 80 defines a generally arcuately-shaped inner portion 84. It is also contemplated that the inner portion 84 may be formed such that the depending leg portions 78 and 80 are virtually perpendicular at the point of inter-section or have a predetermined radius of curvature as illustrated in FIG. 8. In the preferred embodiment illustrated in FIG. 9, the flux concentrators 44 and 46 are formed in a similar manner as the flux concentrators illustrated in FIG. 8 but with the heel portion 82 removed and a relatively larger radius of curvature for the inner portion 84.

In accordance with another important aspect of the invention, the sensor 20 allows the sensitivity (e.g., volts/degree of rotation) of the sensor 20 to be adjusted mechanically. As discussed above, various known sensors utilize potentiometers or variable resistors and the like for varying the sensitivity of the sensor. However, such sensors are relatively temperature dependent. Thus, in a relatively hostile environment where the temperature is anticipated to vary over a relatively wide range, the calibration of such sensors is known to drift. The angular position sensor 20 in accordance with the present invention solves this problem by providing a method for mechanically adjusting the sensitivity of the sensor without the need for potentiometers and the like. In particular, an additional flux concentrator 48 is provided. Although the flux concentrator 48 is described and illustrated having a halo or washer shape, as illustrated in FIG. 2, for example, it is to be understood that various shapes for the flux concentrator 48 are contemplated. For example, a rectangular shape may be used for the flux concentrator as illustrated and identified with reference numeral 48' in FIG. 15. In such an embodiment, various means within the ordinary skill in the art are contemplated for supporting the flux concentrator 48 relative to the magnet 42.

In the preferred embodiment, the flux concentrator 48 is formed in a generally circular or halo shape with a centrally disposed aperture 86. The flux concentrator 48 is adapted to be disposed such that the midpoint of the aperture 86 is generally coaxial with the axis of rotation 50 of the magnet 42. The sensor's sensitivity is adjusted by varying the distance between the flux concentrator 48 and the magnet 42 in an axial direction relative to the axis of rotation 50 as indicated by the arrows 88 (FIG. 2). It is contemplated that the plane of the flux concentrator 48 be generally parallel the plane of the magnet 42. The halo-shaped flux concentrator 48 thus provides a mechanical and relatively stable method for adjusting the sensitivity of the sensor 20 utilizing a relatively inexpensive and until now often impractical class of linear IC; impractical because of the relatively wide range of part-to-part electrical output values of offset voltage and sensitivity per gauss.

Figure 10:
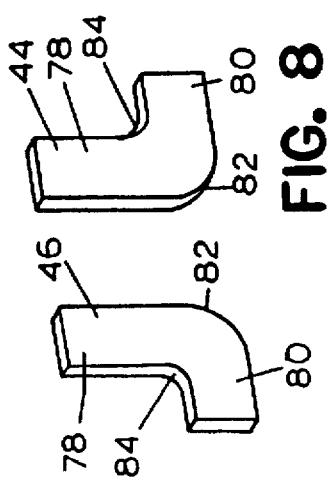
FIG. 10 is an elevational view of a halo-shaped flux concentrator which forms a portion of the present invention.

In an alternate embodiment of the invention as illustrated in FIG. 10, it is contemplated that the flux concentrator 48 be formed to be self-temperature compensating. In this embodiment, the flux concentrator 48 may be formed in a plurality of layers. Three layers are shown for example. The outer layers 90 are formed from a first material, for example, an iron-nickel alloy comprised of approximately 29%–33% nickel. The inner layer 92 is formed from low carbon steel, for example, C1008 low carbon steel. With such an embodiment, the properties of the nickel alloy used in the outer layers 90 cause the permeability of the outer layers 90 to decrease with an increase in temperature which decreases the ability of the flux concentrator 48 to concentrate magnetic flux as a function of temperature. Thus, as the temperature increases, the magnetic flux concentrator 48 captures less of the magnetic field causing a relatively greater portion of the magnetic field to be applied to the magnetic sensing element 43 during such a condition. Thus, since it is known that the magnetic field intensity of known magnets weakens as a function of temperature, the magnetic flux concentrator 48 illustrated in FIG. 10 allows a greater percentage of the magnetic flux density 68 to be applied to the magnetic sensing element 43 during relatively high temperature conditions and is thus self-temperature compensating.

FIGS. 11 and 12 illustrate a carrier assembly 94 for carrying the magnetic sensing device 43 as well as the magnetic flux concentrators 44, 46 and a halo-shaped flux concentrator 48. In particular, FIG. 11 illustrates the carrier assembly 94 with the halo-shaped flux concentrator 48 removed. The carrier assembly 94 includes a disk-shaped base portion 96 and a generally T-shaped frame portion 98. The T-shaped frame portion 98 defines a pair of depending legs 100 and 101, disposed generally perpendicular to the plane of the base portion 96, interconnected by a connecting member 102. A stud portion 104 is formed to extend outwardly from the connecting member 102. The stud portion 104, as will be discussed in more detail below, is used for adjusting the distance between the halo-shaped flux concentrator 48 and the magnet 42. In alternate embodiments of the invention where a configuration other than a halo shape is used for the additional flux concentrator, for example, a rectangular shape, as illustrated in FIG. 15, the stud portion 104 is unnecessary and thus eliminated and substituted with a suitable arrangement for supporting such a flux concentrator 48' relative to the magnet 42.

Referring back to the preferred embodiment, the halo-shaped flux concentrator 48 is shown with a generally star-shaped aperture 86. In such an application, the diameter of the stud 104 is formed to provide a friction fit with the irregular-shaped aperture 86 to allow the sensitivity of the sensor 20 to be adjusted by way of axial movement of the flux concentrator 48 relative to the magnet 42. In an alternate embodiment of the invention, it is contemplated that the stud 104 and the aperture 86 be threaded to enable the distance between the flux concentrator 48 and the magnet 42 to be varied by rotating the flux concentrator 48.

The book-end type flux concentrators 44 and 46 are disposed intermediate the depending legs of the T-shaped frame 98 to enable the magnetic sensing device 43 to be sandwiched therebetween. As shown best in FIG. 14, the magnetic sensing device 43 is a three wire Hall effect IC. This magnetic sensing device 43 is adapted to be connected to a flexible printed circuit board 106 (FIG. 12) and wrapped around the frame 98 as best illustrated in FIG. 12. Opposing fingers 105 may also be formed in the depending leg portions 100 and 101 to capture a portion of the printed circuit board 106 as shown. A terminal structure 107 is then connected to the printed circuit board 106 to enable the sensor 20 to be connected to an external electrical conductor (now shown). The terminal structure 107 is shown in FIG. 12 with bridging members 109, which are removed to form three electrical terminals 111, 113 and 115. The carrier assembly 94 complete with the printed circuit board 106 is then assembled to the housing 22 as illustrated in FIG. 13.

An alternate embodiment of the sensor is illustrated in FIG. 14, identified with the reference numeral 20'. In this embodiment, like components are identified with the same reference numerals and are distinguished with primes. The housing 22' is formed as an irregular-shaped housing with a central aperture 108 for receiving the drive arm 24. As best shown in FIG. 1, the drive arm 24 is formed with a centrally disposed aperture 110 on one end (FIG. 1) that is keyed or otherwise adapted to rotate with the butterfly valve shaft 26 defining a drive arm portion 123 (FIG. 14). The other end of the drive arm 24 is provided with a generally rectangular aperture 112 defining a magnet holder portion 121 for receiving the magnet 42. The drive arm 24 is adapted to be received in the aperture 108 formed in the housing 22'. The drive arm 24 may be formed with an integral washer 114 with an extending tongue 116. The tongue 116 cooperates with stops 118 formed within the aperture 108 which are radially disposed to limit the rotation of the drive arm 24 relative to the housing 22'. As will be appreciated by those of ordinary skill in the art, the location of the stops 118 within the aperture 108 are provided to coincide with the expected angular rotation of the device whose angular position is being sensed. As mentioned above, when the angular position sensor 20 in accordance with the present invention is used as a throttle position sensor, the stops 118 are provided to allow for about 110° of rotation. In alternate embodiments of the invention, the housing 22 may be formed without the stops 118 to enable a full 360° of isolation for the sensor 20.

The drive arm 24 may be biased by a torsion spring 120 having extending end portions 122. The bottom end portion (not shown) is adapted to be received in a slot 124 formed in the aperture 108. The top end portion 122 is received in a corresponding slot 126 formed in the drive arm 24. The diameter of the torsion spring 120 is sized to be slightly larger than the magnet holder portion 121. In embodiments wherein the sensor is adapted to rotate 360°, the torsion spring 120 is eliminated.

The aperture 108 is formed with concentric walls 128, 130 and 132. The concentric wall 128 only spans a portion of the circumference of the aperture 108 to form the stops 118 as discussed above. The drive arm portion 123 is received within the aperture 108 to allow rotational movement of the tongue 116 relative to the stops 118, formed in the partial concentric inner wall 128. The magnet holder portion 121 is received in an integrally formed circular guide, 134 formed on the underside of the carrier 94'. Once the drive arm 24 and torsion spring 120 are disposed within the aperture 108, the carrier assembly 94 closes the aperture 108 by way of an O-ring 158 forming the angular position sensor in accordance with the present invention. As shown, the carrier 94' and printed circuit board 106' are configured differently than the embodiment illustrated in FIGS. 11–13.

As shown, the printed circuit board 106' may include three conductive tracings 132 for connecting the electrical conductors 144 from the magnetic sensing element 43 thereto. A pair of capacitors 138, preferably surface mount capacitors, are electrically connected with the conductive tracings 132 to suppress noise-to-ground. Three plated-through holes 140 are provided for connecting the conductors 144 of the magnetic sensing device 43 to the printed circuit board 106'. The printed circuit board 106' includes an additional three plated-through holes 142 for connection with corresponding terminals 148, insert molded into the housing 22', which enables the sensor 20' to be connected to an external electrical conductor (not shown). Once the components of the sensor 20' are assembled, the component side 146 of the sensor 20' is then potted with a suitable potting compound, such as epoxy to seal the electrical components. This allows the electrical components of the sensor to be sealed from moisture, contaminants and the like without the need for a dynamic or a static seal as discussed above. As such, the seal in accordance with the present invention is virtually unaffected by wear or vibration.

As discussed above, the angular position sensor 20, 20' is connected to a throttle body 27 by way of the fasteners 40. Thus, the housing 22, 22' may be provided with a pair of oppositely disposed apertures 154 for receiving a pair of insert molded mounting sleeves 156. The fasteners 40 are received in the mounting sleeves 156 and are used to connect the sensor 20, 20' to the throttle body 27.

Figure 16:
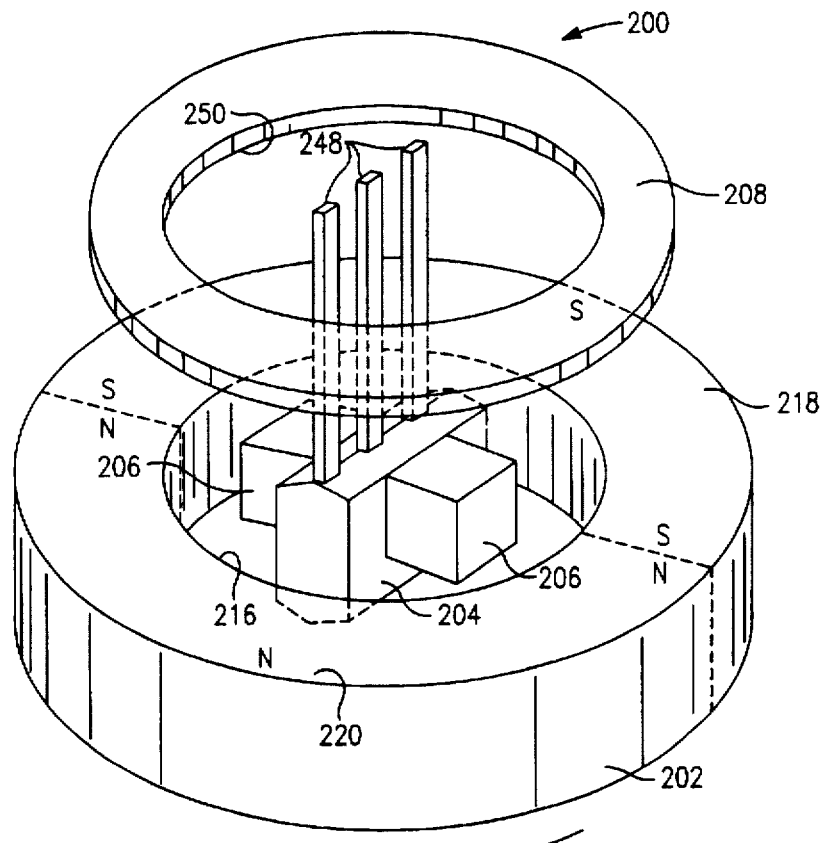
FIG. 16 is a perspective view of an alternate embodiment of the angular position sensor illustrated in FIG. 1.
Figure 17:
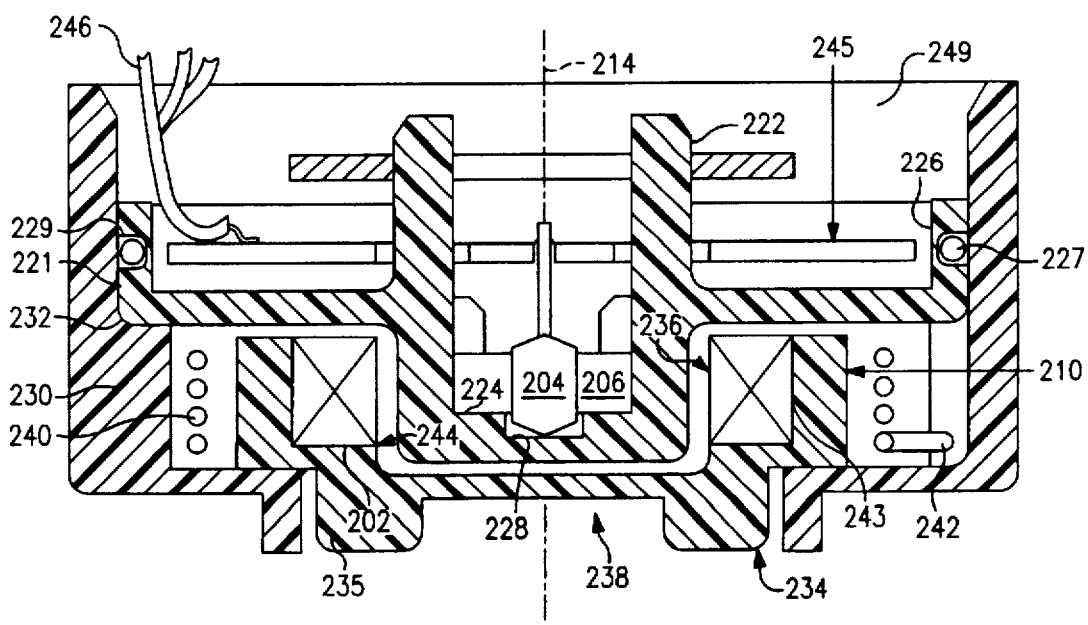
FIG. 17 is a cross sectional view in elevation of the angular position sensor illustrated in FIG. 16.

An alternate embodiment of the throttle position sensor is illustrated in FIGS. 16 and 17 and generally identified with the reference numeral 200. This throttle position sensor 200 includes a magnet 202, a magnetic sensing element 204, one or more flux concentrators 206 rigidly secured relative to the magnetic sensing element 204 and a movably mounted flux concentrator 208 which enables the throttle position sensor 200 to be adjusted mechanically without the need for potentiometers and the like. In this embodiment, the magnet 202 is carried by a drive arm assembly 210 rotatably mounted relative to the magnetic sensing element 204 and the stationary mounted flux concentrators 206 and 208. As shown by the direction of the arrows 212, the magnet 202 is adapted to rotate about an axis 214.

The magnet 202 is formed as a generally circular element with a center aperture 216. The magnet 202 is formed such that each semicircular portion forms a pole. In particular, a semicircular portion 218 forms a south pole, while a semicircular portion 220 forms a north pole.

The magnetic sensing element 204 and the rigidly mounted flux concentrators 206 are carried by a housing 221; the housing 221 being formed from a non-magnetically conductive material; for example, plastic, brass or aluminum. In particular, the housing 221 as best shown in FIG. 17 is formed with a generally cylindrical portion 222 closed on one end 224 and an annular skirt portion 226. The magnetic sensing element 204 may be sandwiched between the rigidly mounted flux concentrators 206 and carried by the closed end 224 of the cylindrical portion 222 of the housing 221. A notch 228 may be formed in the closed end 224 for capturing the magnetic sensing element 204 to facilitate proper orientation of the magnetic sensing element 204 relative to the housing 221.

The outer diameter of the cylindrical portion 222 of the housing 221 may be formed to be relatively smaller than the diameter of the centrally disposed aperture 216 in the circular magnet 202. Such a configuration enables the cylindrical portion 222 of the housing 221 to be disposed within the aperture 216 in order to reduce the overall axial length of the sensor 200.

A cover 230 is provided and adapted to be rigidly secured to the throttle body 27 (FIG. 1) in a similar manner as discussed above. The cover 230 is formed as a generally cylindrical member with at least a partial interior annular shoulder 232 and a mouth portion 234. The annular shoulder 232 defines a first interior diameter and a second interior diameter. The first interior diameter is selected to be slightly larger than an outer diameter of the skirt portion 226 of the housing 221. An O-ring 227 may be used to seal the housing 221 relative to the cover 230 to prevent the potting material from getting into the area of the drive arm 235. The O-ring 227 may be disposed in an annular notch 229 formed in the housing 221.

The second interior diameter of the cover 230 is relatively smaller than the first interior diameter. The size of the second interior diameter of the cover 230 is selected to enable the drive arm assembly 210 to rotate freely therewithin.

The drive arm assembly 210 includes a drive arm 235 formed as an annular member with an irregular shape defining an annular well portion 236 and a drive portion 238. The annular well portion 236 is formed to receive the cylindrical portion 222 of the housing 221 to enable the overall axial length of the sensor 200 to be reduced in a manner as discussed above. The drive portion 238 is adapted to be coupled to the throttle shaft 26 in a manner as discussed above such that the drive arm assembly 210 rotates with a throttle shaft 26.

A helical spring 240 is used to bias the drive arm assembly 210 to a predetermined position, for example, the position shown in FIG. 17. In particular, a helical spring 240 is disposed about the outer diameter of the drive arm 235. One end (not shown) of the helical spring 240 is rigidly secured to the drive arm 235. The other end 242 of the spring 240 is rigidly secured to the cover 230. As such, rotation of the drive arm assembly 210 relative to the cover 230 can cause compression or tension of the spring 240 to bias the drive arm assembly 210.

The well portion 236 of the drive arm 235 is formed with an interior annular shoulder 243. The dimensions of the annular shoulder 243 are selected to enable the circular magnet 202 to be flush with an interior annular wall 244 of the drive arm 235.

The sensor 200 also includes a printed circuit board (PCB) 245. The PCB 245 is carried by the cylindrical portion 222 of the housing 221 for providing an electrical path between the magnetic sensing element 204 and a set of external electrical leads 246. In particular, if a Hall effect device is used for the magnetic sensing element 204, such a device will have a plurality of electrical leads 248. The PCB 245 is formed to provide an electrical path between the electrical leads 246 and 248 in a manner as discussed above.

An important aspect of the invention is the mechanical method for adjusting the sensitivity of the sensor 200 which eliminates the problems discussed above with sensors with electronic sensitivity adjustments. The offset voltage of the sensor 200 is adjusted in a similar manner as discussed above; namely, rotating the cylindrical portion 221 and the sensing plane of the magnetic sensing element 204 with respect to the magnet 202.

The sensitivity of the sensor 200 is adjusted by varying the axial distance between the flux concentrator 208 and the magnetic sensing element 204. As best shown in FIG. 17, the flux concentrator 208 is carried by the cylindrical portion 222 of the housing 221 with a slight friction or interference fit to enable the axial distance relative to the magnetic sensing element 204 to be varied. More specifically, the flux concentrator 208 is formed in a generally circular shape with a central aperture 250. The diameter of the central aperture 250 is selected to be slightly smaller than the outer diameter of the cylindrical portion 222 of the housing 221 to enable the flux concentrator 208 to be carried thereby in order to enable the axial distance between the flux concentrator 208 and the magnetic sensing element 204 to be varied. Once the axial distance of the flux concentrator 208 is set, a portion of the housing 221 is potted with a suitable potting material 249, such as epoxy, to seal the assembly from dust, moisture and other harmful contaminants. The annular skirt portion 226 of the housing 221 protects the bottom portion (FIG. 17) from the potting material 249 in order to allow the drive arm assembly 210 to rotate freely.

In operation, rotation of the throttle shaft 26 causes rotation of the drive arm assembly 210. Since the magnet 202 is rigidly secured to the drive arm assembly 210, such rotation will cause the relative angular position of the north and south magnetic poles 202 to vary relative to a sensing plane of the magnetic sensing element 204. Such a change will cause the output signal from the magnetic sensing element 204 to vary as a function of the change in angular position of the magnet 202 and the throttle shaft 26.

AUTOMATICALLY ADJUSTED ANGULAR POSITION SENSOR

An alternative embodiment of the calibration method of the angular position sensor is illustrated in FIGS. 18–30. In particular, the embodiment illustrated in FIGS. 18–30, is provided with electronic circuitry which automatically compensates for any errors in the output signal due to the electronics, part-to-part variations of the magnet or temperature. The electronic circuitry includes an electronic memory, such as an electrically erasable read-only memory (EEPROM) for storing predetermined compensation values used to compensate the output signal of the sensor. The compensation values are determined by comparing the output signals of the sensor at predetermined calibration angles with ideal values. The deviation between the actual values and the ideal values is used to determine the compensation values as discussed in more detail below. The compensation values are stored in the electronic memory and used to automatically compensate the output signal of the sensor. As will be discussed in more detail below, the compensation of the output signals is done under software control which eliminates the need for mechanical adjustment of the sensor as described in the connection with the embodiment illustrated in FIGS. 1–17; thus providing automatic calibration.

An important aspect of the invention is that the electronic circuitry enables the compensation values to be determined by the sensor manufacturer and stored in the EEPROM. Thus, once the sensors are shipped to the end user, the end user simply installs the sensor.

There are several error sources associated with such sensors. More particularly, such sensors normally include a hall effect device 43, which typically include on-chip operational amplifiers. Such operational amplifiers are frequently subject to offset errors which may vary from part-to-part. In addition, part to part variations in the magnetic flux distribution of the magnets used with such sensors also necessitates sensitivity adjustment of the Hall Effect device relative to the magnet. In addition, such sensors are also subject to error due to temperature variation.

The electronic circuitry in accordance with the present invention, as illustrated in FIGS. 18–30, automatically compensates for such errors, thus obviating the need for mechanical adjustment. Although the electronic circuitry illustrated in FIGS. 18–30 and described hereinafter is discussed in terms of the angular position sensor, similar to the sensor illustrated in FIGS. 1–17, the principles of the present invention are applicable to virtually any angular position sensor and for that fact any displacement type sensor which measures angular or linear displacement and provides an analog output signal.

In addition, although the electronic circuitry is discussed in terms of various discrete electronic components, as discussed below, the principles of the present are also applicable to other electronic components which generally perform the same basic functions. For example, all or a portion of the electronic circuitry described and illustrated below could be formulated into an application specific integrated circuit (ASIC). All such embodiments are considered to be within the broad scope of the invention.

Referring to FIG. 18, the electronic circuitry, generally identified with the reference numeral 300, includes a analog to digital converter (ADC) 302, for example, a twelve-bit serial ADC model number LTC 1298, as manufactured by Linear Technology, Inc., described in detail in *LTC1286/ LTC1298 MICROPOWER SAMPLING TWELVE BIT A/D CONVERTERS IN SO-8 PACKAGES*, by Linear Technology, Inc., pages 6–140 to 6–162, hereby incorporated by reference. One input to the ADC 302 is the output of the Hall effect device, for example the output signal 248 on the Hall effect device 204 (FIG. 16). The Hall effect device is a linear device, for example, an Allegro model no. 3506, which provides a relatively linear output signal over the useful output range of the Hall effect device, as shown in FIG. 19 and discussed below. A temperature sensor, for example a thermistor 330 may also be applied to the ADC 302. The analog temperature and sensor signals are digitized by the ADC 302 under the control of a microcontroller 304, for example, a Motorola model number 68HC705J2, HCMOS Microcontroller, described in detail in *HCO5 MC68HC705J2 TECHNICAL DATA*, by Motorola, Inc., copyright 1991, hereby incorporated by reference. The microcontroller 304 compares the digitized sensor output signal values from the ADC 302 with compensation values stored in an electronic memory 306, for example a Micro- Chip Technology, Inc., Model No. 93C46 CMOS EEPROM, described in detail in *MICROCHIP 93C06/46 256 BIT/1K 5B CMOS SERIAL EEPROM*, BY MICROCHIP TECHNOLOGY, INC., COPYRIGHT 1994, hereby incorporated by reference. The deviations between the actual values from the ADC 302 and the stored compensation values from the electronic memory 306 are used by the microcontroller 304 to generate compensated output values that are applied to a digital to analog converter (DAC) 308. The DAC 308 may be a Maxim Model No. MAX539, 12 bit DAC described in detail in *MAXIM 5V, LOW-POWER, VOLTAGE OUTPUT, SERIAL 12-BIT DAC'S MAX531 MAX538/MAX539* by Maxim Integrated Products, Copyright 1994, hereby incorporated by reference. The DAC 308, in turn, provides a compensated analog output voltage signal $V_{OUT}$.

The electronic circuitry 300 includes a test interface 310 which enables the compensation values to be determined, for example by the sensor manufacturer, and programmed into the electronic memory 306. The test interface 312 is connected to the balance of the electronic circuitry 300 by a pair of cables 310 and 314. The cable 312 is connected between the test interface 310 and the microcontroller 304 while the cable 314 is connected between the test interface 310 and the electronic memory 306. These cables 310 and 314 allow for serial communication between the electronic circuitry 300 and the test interface 310 to enable the compensation values to be determined. More particularly, as will be discussed in more detail below, in a CALIBRATION mode, the angular position sensor is tested at a predetermined number of calibration points (i.e., angular positions). The output signals from the sensor at the predetermined calibration points are then compared with the ideal values for each point to determine the deviation of the actual values from the compensation values. These deviations are used to determine the compensation values for each position of the sensor. The compensation values are, in turn, programmed into the electronic memory 306. Once the compensation values are programmed into the electronic memory 306, the test interface 310 may be disconnected from the electronic circuitry 300.

FIG. 19 is a graphical representation of the automatic compensation of the electronic circuitry 300. In particular, the output signal of the sensor as a fraction of the power supply voltage VS along the vertical axis is plotted as a function of an exemplary angular operating range, for example 90 degrees. The curve 316 represents the output of the sensor without compensation over the exemplary operating range of the sensor while the curve 318 represents the output of the sensor which incorporates the electronic circuitry 300 (FIG. 18) in accordance with the present invention. The curve 318 corresponds with the ideal values.

Although the output curve for a typical sensor is not perfectly linear as illustrated in FIG. 19, the curve can be approximated on a piecemeal linear basis to generate the ideal curve 318 in response to sensor values along the curve 316. As such, the electronic circuitry 300 is adapted to provide automatic compensation for the sensor output signal 300. The determination of the compensation values is discussed in detail below.

A schematic diagram for the electronic circuitry 300 shown in FIG. 18 is illustrated in FIG. 20, while a schematic diagram for the test interface 310 is illustrated in FIG. 21. Referring first to FIG. 20, an oscillator signal for the microcontroller 304 is provided by an oscillator circuit 320, for example an AVX KYOCERA, KBR-4.00-MKS TR Ceramic Resonator, as described on a data sheet entitled, *KBR-MKS SERIES CERAMIC RESONATORS, P14 BY AVX KYOCERA*, hereby incorporated by reference. The oscillator circuit 320 is connected to the oscillator pins OSC1 and OSC2 of the microcontroller 304, along with a parallel connected resistor 322 to form a parallel resonance circuit, for providing, for example, a 4 megahertz (mHz) oscillator signal to the microcontroller 304.

The microcontroller 304 includes an 8-bit port PA[7:0] and a 6-bit port PB[5:0]; all of the bits being programmable as either input or output ports by way of data direction registers on board the microcontroller 304. A CALIBRATE mode signal is applied to a port bit PB[3]; programmed as an input port bit. The CALIBRATE mode signal is available at the test equipment 402 (FIG. 22) by way of the test interface 310 (FIG. 21). As will be discussed in more detail below, the CALIBRATE mode signal is enabled when the test equipment 402 is being used to determine the compensation values to be written to the EEPROM 306. In particular, the port bit PB[3] is normally pulled high by a pull-up resistor 324, connected between the port bit PB[3] and the sensor 5 volt power supply VCC. Normally, the port bit PB[3] will be high. During a CALIBRATE mode, the CALIBRATE signal pulls the port bit PB[3] low to let the microcontroller 304 know the system is in a CALIBRATE mode.

A SENSOR IN signal, such as from an analog Hall effect device, is applied to one channel CH0 of the ADC 304, which includes a two-channel multiplexed input at pins CH0 and CH1. The thermistor 330 is applied to the other channel CH1 by way of an operational amplifier 326 and a serially connected resistor 328. The output of the operational amplifier is applied to the second input CH1 of the ADC 304.

The ADC 302 is a two-channel device and communicates with the microcontroller 304 by way of a synchronous half-duplex 4-wire serial interface. In particular, the serial interface includes a clock signal CLK, a chip select signal CS, a digital data input signal DIN and a digital data output signal DOUT, applied to port bits PA[3], PA[1], PA[2] and PA[0] respectively. The port bits PA[3], PA[2] and PA[1] are configured as outputs while the port bit PA[0] is configured as an input.

Data transfer between the microcontroller 304 and the ADC 302 is initiated by a falling edge of the chip select signal CS. The clock signal CLK synchronizes the data transfer in both directions. After the chip select signal CS goes low, the ADC 302 awaits a start bit on the data input pin DIN. The first logical one shifted into the data input DIN pin after the chip select signal CS goes low represents the start bit. The next three bits shifted in after the start bit are used to configure the ADC 302 to select one of the input signals at the CH0 and CH1 inputs for conversion and to specify whether the most significant bit (MSB) or the least significant bit (LSB) is shifted out first on the data out DOUT pin. After the start bit and three configuration bits are shifted into the data input pin DIN, the conversion process begins. Any additional bits shifted into the data input pin DIN are ignored until the next chip select CS cycle.

Data transfer between the microcontroller 304 and the test interface 310 are handled in a similar manner. In particular, four signals, a data out signal COMPOUT, a data in signal COMPIN, a clock signal EXCLK, and a chip select signal EPCS are used to control serial communication between the test interface 310 and the microcontroller 304. Each of the signals COMPOUT, EXCLK, EPCS and COMPIN are tied high by way of pull-up resistors 328, 330, 332 and 334, respectively.

The COMPOUT and COMPIN signals are used for handshaking and data communication between the microcontroller 304 and the test interface 310. The COMPIN signal is available at port bit PB[5] of the microcontroller 304 configured as an output. The COMPIN signal is also used to read serial data from the data output pin DO when the system is not in the CALIBRATE mode. The COMPOUT signal from the test interface 310 is applied to the port bit PB[4] of the microcontroller 304 and to the clock input of the EEPROM 306. The COMPOUT signal is used for writing to the EEPROM 306 as well as handshaking with the microcontroller 304. The chip select signal EPCS from the test interface 310 is used to enable the conversion values from the ADC 302 to be transferred to the test equipment 402 for determination of the compensation values when the chip select EPCS is deselected and to enable the compensation values to be written to the EEPROM 306 when the chip select signal EPCS is selected. The clock signal EXCLK is applied to the data input pin DI of the EEPROM 306 and to the port bit PA[7] of the microcontroller 304 to control the bit by bit transfer of the 12 bit output of the ADC 302 when the test equipment 402 is reading digitized sensor and thermistor values from the microcontroller 304 and controls the bit-by-bit writes to the EEPROM 306. A start bit is determined after the data input pin DI and chip select pins CS on the EEPROM 306 are high for the first time relative to the clock input CLK.

As discussed above, the values from the Hall effect device are corrected by the compensation values stored in the EEPROM 306. The compensated values are converted to analog form by the DAC 308 under the control of the microcontroller 304. In particular, the DAC 308 includes a chip select pin CS, a data input pin DI, a data output pin DOUT and a clock pin CLK, that are controlled by the microcontroller 304. These pins are connected to port pins PA[4], PA[6] PA[5] and PA[0], respectively on the microcontroller 304 and are all configured as outputs. The data output pin DOUT on the DAC 308 enables the digital data from the DAC 308 to be read back by the microcontroller 304. The analog output of the DAC 308 is available at an output pin $V_{OUT}$ and is coupled to an external circuit (not shown) by way of a resistor 336.

A reference voltage, for example, developed by an operational amplifier 338 and a pair of serially connected resistors 340 and 342, configured as a voltage divider, are applied to a reference input REFIN of the DAC 308. The reference voltage is used to set the full scale output of the DAC 308.

In order to assure proper operation of microcontroller 304, an interrupt request pin IRQ is tied high, and, in particular, connected directly to the five-volt supply VCC, since the system does not need to monitor any interrupts. The microcontroller 304 is reset by way of its reset pin RESET. The RESET pin is normally pulled high by a pull-up resistor 344, connected between the power supply voltage VCC and the RESET pin. In order to prevent spurious operation of the signal applied to the RESET pin, a capacitor 346 is coupled between the RESET pin and ground. The microcontroller 304 is reset by way of a pushbutton 348, connected between the RESET pin and ground. Normally, the RESET pin is high. When the RESET push button 348 is depressed, the RESET pin is brought low to indicate a forced RESET to the microcontroller 304. In order to stabilize the power supply voltage to the microcontroller 304, a plurality of capacitors 350, 352, 354, 356, 358 and 360 are connected between the five-volt sensor supply VCC and the sensor ground.

The schematic diagram for the test interface 310 is shown in FIG. 21. In order to provide electrical isolation between the test interface 310 and the electronic circuitry 300, a plurality of optical isolators 362, 364, 366, 368, 370 and 372 are used to isolate connections between the test interface 310 and the electronic circuitry 300. The signals with the suffix__.TSET indicate connection to the test equipment 402 (FIG. 22) while the signals with the suffix__.PCB indicate connection to the electronic circuitry 300 (FIG. 20).

Each of the optical isolators 362, 364, 366, 368, 370 and 372 includes a light-emitting diode (LED) and a phototransistor. The anodes of each of the LEDs are connected to the power supply voltage VCC by way of current-limiting resistors 374, 376, 378, 380, 382 and 384. The cathode of each of the LEDs is connected to the appropriate signals as will be discussed below. In operation, when the signals connected to the cathodes of the LEDs are brought low, the LEDs will emit light which will be sensed by the phototransistors. The photo-transistors are connected with their emitters grounded. The collectors are connected to the various signals discussed above. As will be discussed in more detail below, the collectors are normally pulled high and go low when light is sensed from the LEDs. More particularly, a CALIBRATE_TSET signal from the test interface 310 is applied to the anode of the optical isolator of the LED forming the optical isolator 362. The collector of the photo-transistor is the CALIBRATE signal, which, as discussed above, is applied to the port PB[3] of the microcontroller 304.

As mentioned above, the COMPIN, COMPOUT, EXCLK and EPCS signals are used for forming a serial communication interface between the microcontroller 304 and the test equipment 402 illustrated in FIGS. 22 and 23. The signals COMPOUT_TSET, EXCLK_TSET, and EPCS_TSET, available from the test equipment 402 (FIG. 22), are applied to the cathodes of the LEDs forming the optical isolators 364, 366 and 368, respectively. The collector outputs of the optical isolators 364, 366, 368 are tied high by way of pull-up resistors 382, 384, and 386, respectively. As mentioned above, the emitter terminals of each of the photo-transistors associated with the optical isolators 364, 366 and 368 respectively are grounded. Thus, during normal operation the collectors of the optical transistors associated with the optical isolators 364, 366 and 368 will be high. When the signals COMPOUT_TSET, EXCLK_TSET, EPCS_TSET go low, the collector outputs of the photo-transistors associated with the optical isolators 364, 366 and 368 will go low. The collectors of the photo-transistors associated with the optical isolators 364, 366 and 368 are applied to a pair of serially connected NOT gates 388, 390, 392, 394, 396 and 398, for example type 74HC14, which act as buffers to buffer the output of the optical transistors associated with the optical isolators 364, 366 and 368.

In order to provide isolation of the test interface 310 from the balance of the electronic circuitry 300 when the system is not in a CALIBRATE mode, the signals COMPOUT_TSET, EXCLK_TSET, EPCS_TSET and COMPIN_PCB are applied to a quad-tristate device 400, for example a type 74C 244. In particular, the COMPOUT signal, available at the output of the NOT gate 390, is applied to an input 1A2, while the COMPIN signal available at port bit PB[5] of the micro-controller 304 (FIG. 20), is applied to the 1A4 input of the tristate device 400. Similarly the EXCLK and EPCS signals, available at the outputs of the NOT gates 394 and 398 respectively, are applied to the 1A3 and 2A1 inputs of the tristate device 400.

The tristate device 400 provides yet another isolation interface between the test interface 310 and the electronic circuitry 300. In particular, the COMPOUT_PCB, EXCLK_PCB, and EPCS_PCB signals, available at the 1Y2, 1Y3 and 2Y1 outputs of the tristate device 400 are connected to the microcontroller 304 (FIG. 20) as discussed above. The EPCS_TSET and COMPIN_TSET signals, available at the 2Y1 and 1Y4 outputs of the tristate device 400, are isolated by the optical isolators 370 and 372 in a similar manner as discussed above and applied to the test equipment.

The tristate device 400 is under control of buffer enable signals BUFEN1_TSET and BUFEN2_TSET, available at the test equipment 402. As will be discussed in detail below, during a CALIBRATE mode, the tristate device 400 will be enabled thus connecting the serial communication control signals between the test equipment and the electronic circuitry 300 by way of the optical isolation circuits discussed above. During conditions other than the CALIBRATE mode the tristate device 400 provides electrical isolation of the electronic circuitry 300 from the test interface 310.

The test equipment is illustrated in FIG. 22 and is generally identified with the reference numeral 402. The test equipment 402 includes a power supply 404 which provides a five-volt DC voltage supply for the sensor. The power supply 404 may be a Hewlett Packard Model No. E3620 A. The power supply voltage is monitored by a Continuing Conformance Tester 406, for example, a S/N 95015 by Altech Control Systems. The Continuing Conformance Tester 406 monitors the voltage from the power supply 404 to ensure that it is within proper limits. As will be discussed below, the Continuing Conformance Tester 406 includes a personal computer and various peripherals as illustrated in FIG. 23. In a CALIBRATION mode the Continuing Conformance Tester 406 positions the sensor to predetermined calibration angles by monitoring an Absolute Position Encoder 408, for example, a model No. M25G-F1-L8192-G-XD2CR-E-C25-X-5 by BEI Motion Systems Company, Positions Controls Division. By monitoring the Absolute Position Encoder 408, the Continuing Conformance Tester 406 is able to generate an error voltage to a motor controller 410, for example, a model number SC401-01-T1 by Pacific Scientific Motor & Control Division, proportional to the distance away from the required angle. The motor controller 410 drives a servo motor 412, for example, a model R21KENT-TS-NS-NV-00 by Pacific Scientific Motor & Control Division. The Servo Motor 412 in turn drives a servo actuator 414, for example, a model number RH-100-CC-SP by Harmonic Drive Systems, Inc. which, in turn, positions the sensor to a predetermined calibration point. The sensor may be disposed in a chamber in which the temperature is set to a predetermined value for all of the calibration points. The chamber 416 may be a Versa 10 type oven, as manufactured by Tenney Engineering Inc.

As mentioned above, the motor controller 410 controls the operation of the servomotor 412 and in turn the servo actuator 414 to drive the sensor to predetermined calibration angles. A positive voltage from the Continuing Conformance Tester 406 forces the servomotor 412 to move clockwise while a negative voltage moves the servomotor 412 counter-clockwise. The sensor voltage is read at each calibration point. After all of the calibration readings are taken the deviation between the values measured at the calibration points (i.e., the actual values) and the ideal values are determined for each position of the sensor. Compensation values are then written into the EEPROM 306.

As mentioned above, the Continuing Conformance Tester 406 is provided with a personal computer 418 (FIG. 23) which should include at least an Intel type 80486 DX or equivalent microprocessor. The Continuing Conformance Tester 418, in addition to the personal computer 418, may include a digital volt meter 420 for measuring the voltage of the sensor and the power supply 404 as well as a user-interface which includes a keyboard 422 and a monitor 424. The Continuing Performance Tester 406 may also include a tape back-up system 426 and a printer 428 as well as a status board 430 for providing an indication of the status of the system.

As mentioned above, the test equipment 402, illustrated in FIG. 22, is interfaced with the sensor electronics 300 by way of the test interface 310. As will be discussed in more detail below, the test equipment 402 including the personal computer 418 forming a portion of the Continuing Conformance Tester 406 is used to communicate with the microcontroller 304 in order to determine the compensation values for the sensor over a predetermined operating range. The software control for the personal computer 418 is illustrated in FIGS. 26 and 27. In addition, the source code for the personal computer 418 for determining the compensation values is set forth in Appendix I, while the source code for the microcontroller 304 is set forth in Appendix II.

A key aspect of the invention is the method for determining the calibration values. As mentioned above the test equipment 402 positions the sensor 43 at various predetermined calibration points and determines the sensor output value at each of the points. These calibration points taken at a predetermined temperature, for example 25° C., are, in turn, compared with ideal values. The deviation between the actual values and the deviation values is used to develop a compensation value that is written to the EEPROM 306. The method for determining the compensation value is best understood with references to FIGS. 24 and 25. In particular, the output voltage of the sensor 43 is measured at a predetermined number of calibration angles. The calibration angles, as well as the other values illustrated in FIGS. 24 and 25, are exemplary. It is to be understood that virtually any number of calibration angles and values are within the present scope of the invention. Referring first to FIG. 24, the sensor output voltage is measured at 8 calibration angles $\theta_0$–$\theta_7$, which, for example, have been selected between 14.4° and 92.4° for discussion purposes. The particular calibration angles will vary as a function of the application of the sensor. The sensor output voltage at each of the calibration angles $\theta_0$–$\theta_7$ is measured and plotted along an X axis as shown in FIG. 25. The actual or measured values are then compared with the ideal values for each of the calibration angles $\theta_0$–$\theta_7$ which are plotted along a Y axis as shown in FIG. 25.

As discussed above, throughout the useful range of the sensor the output voltage of the sensor is assumed to be linear as illustrated in FIG. 19. Thus, between each of the calibration angles $\theta_0$–$\theta_7$ the response is assumed to be linear. As such the compensation values are determined by determining the slope m and y-intercept b of the line segments 432 (FIG. 25) for each of the calibration angles $\theta_0$–$\theta_7$. The slope m and y-intercept b between each of the calibration angles $\theta_0$–$\theta_7$ is determined and written to the EEPROM 306 in order to provide automatic compensation of the measured values by the analog input. In particular, the system measures actual values X of the sensor output. Since the ideal values are assumed to be linearly related to the actual values, the actual value is multiplied by the slope m and added with the y-intercept b to produce an ideal value. Since the slope m and y-intercept b compensation values vary between each calibration angle, the microcontroller 304 first determines the particular correction slope m and y-intercept b to be used. This is done by comparing the measured output voltages with the ideal voltage to determine the particular correction slope and y-intercept to be used. For example, referring to FIG. 24, assume that a value of 1.40 was measured by the sensor. The system would compare this measured value of 1.4 with the ideal values and ascertain that the calibration angle was between 20.4 and 34.8. In such a situation since the compensation values are assumed to be linear between successive predetermined calibration angles the slope compensation and y-intercept compensation values associated with the angle 20.4 would be used. Thus in such an example, the voltage of 1.4 volts would be multiplied (using the exemplary data illustrated in FIG. 24) by the value 1.448. The y-intercept b of −0.862 would be subtracted from that value to render an ideal voltage in that range.

A flow chart for the test equipment 402 and in particular the personal computer 418 for determining the compensation values is illustrated in FIGS. 26 and 27. A flow chart for providing a compensated output value for the Hall effect device by the microcontroller 34 is illustrated in FIGS. 28–30. Referring first to FIGS. 26 and 27, the system starts by setting the CALIBRATION mode and in particular, generating an active low CALIBRATE signal that is applied to the test interface 310 and in particular to the optical isolator 362 in step 440. Once the CALIBRATE mode is enabled, the test equipment 402 initiates a handshake with the microcontroller 304. In particular, in step 442, the COMPOUT signal is set low and the tristate device 400 is enabled in step 442 by setting the BUFEN1-TSET and BUFEN2_TSET signals. The COMPOUT signal is applied to the optical isolator 364 and indicates to the microcontroller 304 that the test equipment 402 is ready to initiate determination of the compensation values as discussed above. The enable signals for the tristate device 400 BUFEN1_TSET, and BUFEN2_TSET are applied to the 1G, 2G respectively pins of the tristate device 400. These signals are active low in order to enable the tristate device 400. After the COMPOUT signal is set low and the tristate device 400 is enabled, the system waits for a predetermined time period, for example, 10 milliseconds, in step 444 to determine if the microcontroller 304 is ready. After the 10 millisecond time period the system reads the COMPIN_ TSET signal, available at the output of the optical isolator 372 as part of the handshake between the microcontroller 304 and the personal computer 418. If the COMPIN_TSET signal has not been set low, the system returns to Step 446 and awaits the handshake from the microcontroller 304. Once the COMPIN_PCB signal is pulled low by the microcontroller 304 the COMPIN_TSET signal is read by the personal computer 418 at the output of the optical isolator 372. If the COMPIN_TSET signal is low, the personal computer 418 sets the COMPOUT_TSET signal high in step 448 and waits for a predetermined time period, for example 1 millisecond. Subsequently, the personal computer 418 pulls the COMPOUT signal low in step 450 and waits 1 millisecond. Afterwards, the personal computer 418 checks the status of the COMPIN signal from the microcontroller 304. If the COMPIN signal is low the system recycles back to Step 450. Once the COMPIN signal is set high by the microcontroller 304 as ascertained in step 452 the personal computer 418 sets the COMPOUT signal high in step 454 to let the microcontroller 304 know that the handshake is complete. After the handshake is complete, the system proceeds to step 456 and reads the digitized sensor output voltage at the port bit PB[5] of the microcontroller 304 on the COMPIN line. In particular, the sensor output voltage is digitized by the ADC 302 under the control of the microcontroller 304. The digitized 12 bit value is made available at the port bit PB[5] one bit at a time and communicated serially to the PC 418 under the control of the clock signal EXCLK. In addition to measuring the sensor voltage in Step 456, the system also measures the thermistor voltage. In particular, while the digitized sensor voltage is being read, the microcontroller 304 configures the ADC 302 to digitize the analog signal on channel 0 (CH0), when the thermistor voltage is being read, the microcontroller 304 configures the ADC 302 to read the thermistor voltage on channel 1 CH1. After the digitized sensor voltage and thermistor voltage are read in step 456, the system starts cycling the sensor 413 through the predetermined calibration angles for example $\theta_0$–$\theta_7$ (FIG. 24). In particular, in steps 458 et seq., the system commands the test equipment 402 to position the sensor at each one of the calibration angles $\theta_0$–$\theta_7$. Initially for the first calibration angle $\theta_0$ the test equipment 402 is configured to place the sensor at angle $\theta_0$ in step 460 and to set the COMPOUT signal low. Subsequently in step 462 the system ascertains whether the microcontroller 304 has acknowledged that the Hall effect device is being calibrated at the initial calibration angle $\theta_0$ by determining whether the microcontroller 304 has pulled the COMPIN signal high. If not, the system loops back to step 462 and awaits for the COMPIN signal to be pulled high by the microcontroller 304. Once the COMPIN signal goes high the personal computer 418 sets the COMPOUT signal high in step 464. After the COMPOUT signal has been set for in step 464, the system awaits an acknowledgment by the microcontroller 304 by determining whether the COMPIN signal has been set low in step 466. If not, the system loops back to step 466 and awaits acknowledgment by the microcontroller 304. Once the COMPIN signal is set low, the personal computer 418 sets the COMPOUT signal low in step 468. After the COMPOUT signal is set low, the system awaits acknowledgment by the microcontroller 304 by determining whether the COMPIN line has been set high in step 470. If not, the system returns awaits the acknowledgment by the microcontroller 304 and returns to step 468. Once the microcontroller 304 acknowledges the personal computer 418 by setting its COMPIN signal high, the personal computer 418 sets its COMPOUT signal high in step 472. Subsequently in step 474 the actual sensor values are read in steps 474 and 476. For the first time through the loop, I is set to zero and thereafter incremented in step 478. In step 480 the system determines whether I is less than the total number of readings required. As indicated above, eight exemplary readings may be taken at calibration angles $\theta_0$–$\theta_7$. If less than all of the readings have been taken the system proceeds to FIG. 27 and calculates the slope and intercept of the actual measurements versus the ideal values in steps 482, 484, 486 and 488 as discussed above. The steps 460 through 488 are cycled until the slopes m and y-intercepts b have been determined for all the calibration angles $\theta_0$–$\theta_7$. Once all of the calculations have been determined for a particular sensor, the system proceeds to step 490 in order to initiate writing of the compensation values to the EEPROM 306 (FIG. 20). In particular, in step 490 the COMPOUT signal is set high. This signal is tied to the data input DIN of the EEPROM 306 and is used to initiate a write to the EEPROM 306 in a manner as discussed above. In addition, the system selects the EEPROM 306 by setting the signal EPCS high, which, in turn, is tied to the chip select pin CS of the EEPROM 306. In addition, the CALIBRATE mode is disabled by pulling the CALIBRATE signal high. Subsequently in step 492, the system checks to determine if the chip select pin CS of the EEPROM 306 has been set, since this pin is also under the control of the microcontroller 304 and in particular the port bit PB[0]. If the EEPROM chip-select signal is not high, the system awaits in step 490 until the chip select signal for the EEPROM 306 is high. Once the chip select signal EPCS for the EEPROM 306 goes high, the CALIBRATE mode is enabled by pulling the CALIBRATE signal low in step 494. In addition, as discussed above, the EEPROM 306 is prepared for write. In steps 496, 498, 500 and 502 the system writes all of the calibration points, and, in particular, the slopes m and y-intercepts b for each of the calibration points $\theta_0$–$\theta_7$ to the EEPROM 306. As indicated above, communication to the EEPROM 306 is serial with bits being clocked in one bit at a time under the control of the clock signal EXCLK. After all the compensation values have been written to the EEPROM 306, the system disables the WRITE mode for the EEPROM 306 in step 504. After the WRITE mode for the EEPROM 306 has been disabled, the contents of the EEPROM 306 are verified in steps 506 and 508 for errors. If no errors are found in the contents of the EEPROM 306 the system proceeds to step 510 where the CALIBRATE mode is disabled as well as the buffer enable signals BUFEN1_TSET and BUFEN2_TSET to disable the tristate device 400, which, in essence, disconnects the test equipment 402 from the interface 310. If errors are detected in step 508, the user is notified of the errors by way of the monitor (FIG. 23) in step 512 with the system subsequently going to step 510. After the CALIBRATE mode and buffer enable signals are disabled, the tristate device 400 is disabled. The system proceeds to step 514 and prints a message on the monitor 424 that the programming of the EEPROM 306 is complete and was successful.

The flow charts for the microcontroller 304 are illustrated in FIGS. 28–30. Initially the system determines in step 516 whether the CALIBRATE mode of operation has been selected. If not, the system proceeds to step 518 and assumes a NORMAL mode is selected and executes the code illustrated in FIG. 30 for NORMAL mode. If the system is in a CALIBRATE mode as determined by reading the CALIBRATE signal applied to port bit PB[3] the microcontroller 304 system proceeds to step 520 and determines whether the compensation values need to be programmed into the EEPROM 306. If not, the system assumes a CALIBRATE mode and proceeds to step 522 and the software illustrated in FIG. 29. Otherwise, the correction factors are written to the EEPROM 306 and verified in step 524.

The CALIBRATE mode is initiated in step 526. Initially in step 528 the serial interface is initialized. After the serial interface is initialized the microcontroller 304 determines whether a reading is being requested in step 530. If not, the system waits at step 530 for such a request. If a calibration reading has been requested the sensor voltage or thermistor voltage is read and sent to the test equipment 402 over the serial interface in step 532. The system next determines in step 534 whether all readings have been taken. If not, the system returns to step 530. If so, the system proceeds to step 536 and determines the correction values to be programmed to the EEPROM 306.

The NORMAL mode is illustrated in FIG. 30 and is initiated in step 538. Initially, in step 540 the system ascertains whether the system is in a NORMAL mode by monitoring the logic level of the CALIBRATE signal. If the CALIBRATE signal is high, a NORMAL mode is indicated and the sensor voltage is determined. After the sensor voltage is read, the proper correction factor from the EEPROM 306 is determined in step 542. Subsequently in step 544 the measured value is multiplied by the slope m correction factor in step 544. Next, in step 546, the y-intercept b is added to the result obtained from step 544. Lastly, in step 548 the adjusted output voltage is applied to the DAC 308 which in turn provides a corrected sensor output voltage $V_{OUT}$.

The system also provides for thermal compensation. As mentioned above, the compensation values are determined at a particular temperature, for example, 25° C. The readings provided by the thermistor 330, for example, a Yageo 1% metal film fixed resistor. The temperature compensation is accomplished by assuming, for example, –3% deviation at 150° C. in the output signal due to temperature when the sensor is hot and a +1% deviation at –40° C. in the output signal when the sensor is cold. Whether the sensor is hot or cold is determined by comparing the thermistor voltage $V_{THM}$ with the thermistor voltage $V_{AMB}$ at the temperature at which the compensation values were taken. If the compensation values were determined at a 25° C. ambient, then $V_{AMB}$ is the thermistor voltage at 25° C. Thus, if the thermistor voltage $V_{THM}$>$V_{AMB}$, the system is assumed to be hot and a 3% tolerance is assumed. If the thermistor voltage $V_{THM}$<$V_{AMB}$, the system is assumed to be cold and a 1% tolerance is assumed. For a 5 volt system, it is assumed that at the null point voltage $V_{CROSSOVER}$ of the sensor (i.e. output voltage at which the output signal indicates 0 gauss), that there is no shift in the output voltage due to temperature deviation. The deviation is thus determined by the following equation:

$$DEV = +/- \left[ \frac{V_{AMB} - V_{THM}}{V_{THM}} * TOLERANCE * (V_{MEASURED} - V_{CROSSOVER}) \right]$$

If the system is hot, the deviation is added to the measured voltage. If the system is cold, the deviation is subtracted from the measured voltage.

The temperature tolerances as well as the thermistor voltage readings are linearized to provide a more accurate output. Also a resistor (not shown) of the same value as the thermistor may be connected in parallel with the thermistor. For a 3% total tolerance, the tolerance can be linearized by assuming the tolerance varies linearly over the 3% total tolerance range and the temperature range. Assuming the tolerance is in the general form of y=mx+b, for a 3% tolerance over a 125° C. temperature range (i.e. 150° C.–25° C.), the slope m will be 0.00024 and the y-intercept b will be –0.006.

In order to linearize the thermistor voltage $V_{THM}$ values, the voltages are read at the temperature extremes, 25° C. and 150° C. Assuming that $V_{THM}$ is in the general form y=mx+b, the slope and y-intercept b can be determined. For example at 25° C., $V_{THM}$ is 2.3832212 volts and at 150° C., $V_{THM}$= 0.1591433, the slope m will be –56.2031 and the y-intercept b will be 158.9444. Thus, the temperature will be equal to –56.2031 $V_{THM}$+158.944. For a 3% tolerance, the tolerance is equal to 0.00024*TEMP–0.006. Substituting the value for the temperature yields a tolerance of –0.03488744 $V_{THM}$+ 0.03214656. The tolerance is then substituted into the equation above for the deviation DEV in order to determine the amount of temperature compensation.

In a similar manner, the tolerance thermistor voltage $V_{THM}$ are linearized for a 1% tolerance. These values are then used to determine the deviation as discussed above.

While the invention has been described with reference to details of the embodiments shown in the drawings, these details are not intended to limit the scope of the invention as described in the appended claims.

APPENDIX I
© DURAKOOL, INC 1995

```c
#include <conio.h>
#include <stdio.h>
#include <dos.h>
#include <math.h>
#include "lindels.cpp"
#include "linear.h"

#define eeprom_output_data_port    0x02A2
#define ad_output_port             0x02A2
#define eeprom_cs                  0x0001
#define eeprom_clk                 0x0002
#define eeprom_data_out            0x0004
#define calibrate_enable           0x0008
#define buffer1_enable             0x0020
#define buffer2_enable             0x0040
define trigger_source             0x0080 define eeprom_input_data_port     0x02A3
define ad_input_port              0x02A3
#define eeprom_data_in             0x0001
#define eeprom_cs_in               0x0002
define test_abort                 0x0080 define thermistor_address         0x0000 define number_of_calibration_points   0x0008 define angle1   0x0000
define angle2   0x0001
#define angle3   0x0002
#define angle4   0x0003
#define angle5   0x0004
#define angle6   0x0005
#define angle7   0x0006
define angle8   0x0007 void    set_eeprom_cs_low(void);
void    set_eeprom_cs_high(void);
void    send_start_bit(void);
void    send_opcode(int bit1, int bit2);
void    send_eeprom_bit(int bit);
void    send_eeprom_address(int address);
void    send_eeprom_data(int data);
void    erase_write_enable();
void    erase_write_disable();
void    eeprom_write(int address, int data);
int     receive_eeprom_data();
int     eeprom_read(int address);
void    enable_buffer1(void);
void    enable_buffer2(void);
void    disable_buffer1(void);
void    disable_buffer2(void);
void    enable_calibrate_mode(void);
void    disable_calibrate_mode(void);
void    set_compout_high(void);
void    set_compout_low(void);
int     wait_for_compin_to_go_low(void);
int     wait_for_compin_to_go_high(void);
int     read_processor_data(void);
void    set_calibration_angle(double angle);
double  precision_read_ad();
int     wait_for_epcs_to_go_high(void);
void    precision_place_fixture(double angle);

enum cto
{
temperature1,
temperature2,
temperature3,
number_sensor_temperature_characteristics
};

enum sv
{
hall_reading,
thermistor_reading,
number_voltage_readings
};

double   sensor_voltage[number_sensor_temperature_characteristics][number_of_calibration_points][number_voltage_readings];
double   characteristic_angle[number_of_calibration_points];

int      tdelay=1;
```

```
int      rdelay=1;

extern double angle1_calpoint,angle2_calpoint,angle3_calpoint,
              angle4_calpoint,angle5_calpoint,angle6_calpoint,
              angle7_calpoint,angle8_calpoint,
              position_velocity;

int      eeprom_port_image=0xFF,troubleshoot=0 void     program_eeprom()
{
    int i,j,thermistor_voltage,calibration_point[number_of_calibration_points];

double bin_vo,up_dac_voltage[number_of_calibration_points];
    double slope[number_of_calibration_points],
           y_intercept[number_of_calibration_points],
           normalized[number_of_calibration_points],
           deviation;

int    a;

double min_ideal,max_ideal,min_measured,max_measured,min_difference,max_difference,
           da_full_scale;

textmode(C4350);
    textcolor(WHITE);
    textbackground(BLUE);

characteristic_angle[angle1]=angle1_calpoint;
    characteristic_angle[angle2]=angle2_calpoint;
    characteristic_angle[angle3]=angle3_calpoint;
    characteristic_angle[angle4]=angle4_calpoint;
    characteristic_angle[angle5]=angle5_calpoint;
    characteristic_angle[angle6]=angle6_calpoint;
    characteristic_angle[angle7]=angle7_calpoint;
    characteristic_angle[angle8]=angle8_calpoint;

calibration_point[angle1]=0x3E3;
    calibration_point[angle2]=0x42E;
    calibration_point[angle3]=0x484;
    calibration_point[angle4]=0x635;
    calibration_point[angle5]=0x7E3;
    calibration_point[angle6]=0x9A3;
    calibration_point[angle7]=0xB44;
    calibration_point[angle8]=0xCB7;

sensor_voltage[temperature2][angle1][half_reading]=1.246;
    sensor_voltage[temperature2][angle2][half_reading]=1.340;
    sensor_voltage[temperature2][angle3][half_reading]=1.441;
    sensor_voltage[temperature2][angle4][half_reading]=1.958;
    sensor_voltage[temperature2][angle5][half_reading]=2.522;
    sensor_voltage[temperature2][angle6][half_reading]=3.070;
    sensor_voltage[temperature2][angle7][half_reading]=3.594;
    sensor_voltage[temperature2][angle8][half_reading]=4.053;

clrscr();
    printf("Serial EEProm Communications:\n");

up_dac_voltage[0]=precision_read_ad();
    printf("ad=%8.3f\n",up_dac_voltage[0]);

eeprom_port_image &= 0xFF-trigger_source;

enable_calibrate_mode();

set_compout_low();
    enable_buffer1();
    enable_buffer2();

delay(10);

j=wait_for_compin_to_go_low();

if(j)
    {
        printf("\n\007\007Keyboard Break -- Microcontroller Not Responding\n");
        goto endprogram;
    }
    else if(troubleshoot) printf("Compin Has Gone Low:\n");

set_compout_high();

delay(1);
```

```
set_compout_low();

delay(1);

j=wait_for_compin_to_go_high();

if(j)
{
 printf("\n\007\007Keyboard Break -- Microcontroller Not Responding\n");
 goto endprogram;
}
else if(troubleshoot) printf("Compin Has Gone High\n");

set_compout_high();

if(troubleshoot) printf("Set Compout High - Going to read thermistor Data\n");

thermistor_voltage=read_processor_data();

if(troubleshoot) printf("Thermistor Reading = %4X\n",thermistor_voltage);

for(i=0;i<8;i++)
{
 set_calibration_angle(characteristic_angle[i]);

if(troubleshoot)
 {
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");
  printf("\n                    ");

int col,row;

getcursor(&col,&row);
  row-=10;
  setcursor(0,row);
 } set_compout_low();

if(troubleshoot) printf("Compout Set Low Waiting for Compin to Go High\n");

j=wait_for_compin_to_go_high();

if(j)
 {
  printf("\n\007\007Keyboard Break -- Microcontroller Not Responding\n");
  goto endprogram;
 }
 else if(troubleshoot) printf("Compin Has Gone High\n");

set_compout_high();

if(troubleshoot) printf("Compout Set High - Waiting for Compin to go Low\n");
 j=wait_for_compin_to_go_low();

if(j)
 {
  printf("\n\007\007Keyboard Break -- Microcontroller Not Responding\n");
  goto endprogram;
 }
 else if(troubleshoot) printf("Compin Has Gone Low\n");

set_compout_low();
 j=wait_for_compin_to_go_high();
 if(j)
 {
  printf("\n\007\007Keyboard Break -- Microcontroller Not Responding\n");
  goto endprogram;
 }
 else if(troubleshoot) printf("Compin has Gone High\n");

set_compout_high();
```

-47-

```
calibration_point[i]=read_processor_data();

vo=calibration_point[i]/4096.*5.0;
up_dac_voltage[i]=precision_read_ad();
sensor_voltage[temperature2][j][hall_reading]=vo;

locate(0,40+i);
printf("Sensor Reading #%2d = %4X A/D Reading = %6.3f D/A Reading=%6.3f\n",i+1,calibration_point[i],vo,up_dac_voltage[i]);
} place_fixture(9,0);

write_eprom;

for(a=angle1,a<number_of_calibration_points-1;a++)
{
    min_ideal=(.046528 * characteristic_angle[a]  + .155);
    max_ideal=(.046528 * characteristic_angle[a+1] + .155);
    min_measured=sensor_voltage[temperature2][a][hall_reading];
    max_measured=sensor_voltage[temperature2][a+1][hall_reading];
    min_difference=min_measured-min_ideal;
    max_difference=max_measured-max_ideal;
    if(fabs(max_measured-min_measured)>.001)
        slope[a]=(max_difference-min_difference)/(max_measured-min_measured);
    else slope[a]=0;
    y_intercept[a]=max_difference-slope[a]*max_measured;
} eeprom_port_image &= 0xFF-trigger_source;

set_compout_high();
set_eeprom_cs_high();
disable_calibrate_mode();
j=wait_for_epcs_to_go_high();

da_full_scale=4.722;

int read_data[25];
int write_data[25];
write_data[0]=thermistor_voltage;

if(j==0)
{
enable_calibrate_mode();
printf("Eprom Write Mode Entered\n");

erase_write_enable();
erase_write_enable();
eeprom_write(thermistor_address,thermistor_voltage);
    int         si,sa,yi,ia;

for(j=1;j<8;j++)
{
eeprom_write(j,calibration_point[j]);
write_data[j]=calibration_point[j];
si=(1-slope[j-1])*da_full_scale*4096+.5;
sa=(j-1)*2+7;
eeprom_write(sa,si);
write_data[sa]=si;
yi=y_intercept[j-1]*4096/da_full_scale;
ia=(j-1)*2+8;
eeprom_write(ia,yi);
write_data[ia]=yi;

if(troubleshoot) printf("\nSa=%4X Slope=%8.3f si=%4X ia=%4X yi=%4X Int=%8.3f",sa,slope[j-1],si,ia,yi,y_intercept[j-1]);
} erase_write_disable();

printf("\n");
for (j=0;j<7;j++)
{
read_data[j]=eeprom_read(j);
vo=bin/4096.*5.0;
if(troubleshoot) printf("Address = %4X Data = %4X Voltage=%6.3f\n",j,bin,vo);
} int k=0;
for(j=7;j<20;j+=2)
{
read_data[j]=eeprom_read(j);
```

```
vo=read_data[j]:4096*5.0;
if(troubleshoot) printf("Address = %4X Data = %4X Voltage = %8.3f",j,bin,vo);
if(troubleshoot) printf("Slope = %8.3f\n",slope[k]);
read_data[j+1]=eeprom_read(j+1);
vo=bin/4096*5.0;
if(troubleshoot) printf("Address = %4X Data = %4X Voltage = %8.3f",j+1,bin,vo);
if(troubleshoot) printf("Y Int = %8.3f\n",y_intercept[k]);
k++;
}
}
else
{
    printf("\n\007\007Keyboard Break - Microcontroller Not Responding\n");
    goto endprogram;
} printf("\n\n Address    Data Written    Data Read\n\n");
for(j=0;j<20;j++)
{
printf("%3d  %18X  %18X\n",j,write_data[j],read_data[j]);
}
printf("\n");

double      rdg,sl,yi;
double      product;
int         angle;
double      reading       [number_of_calibration_points+1];
            calculated[number_of_calibration_points+1],temp;

for(angle=angle1;angle<number_of_calibration_points;angle++)
{
reading[angle]=sensor_voltage[temperature2][angle][hall_reading];
if(reading[angle]<=sensor_voltage[temperature2][angle2][hall_reading])
{
  rdg=0x64B;

s:=slope[angle1]*819.2*256;
product=rdg*sl;
yi=y_intercept[angle1]*256;
if(troubleshoot) printf("vo=%8.3f m=%8.3f x=%8.3f mxb=%8.3f mxl=%8.3f\n",
    reading[angle],sl,rdg,product,slope[angle1]*reading[angle]);
if(troubleshoot) printf("yib = %8.3f mxb+yib=%8.3f\n",yi,product+yi);
deviation=slope[angle1]*reading[angle]+y_intercept[angle1];
}
else if(reading[angle]<=sensor_voltage[temperature2][angle3][hall_reading])
        deviation=slope[angle2]*reading[angle]+y_intercept[angle2];
else if(reading[angle]<=sensor_voltage[temperature2][angle4][hall_reading])
        deviation=slope[angle3]*reading[angle]+y_intercept[angle3];
else if(reading[angle]<=sensor_voltage[temperature2][angle5][hall_reading])
        deviation=slope[angle4]*reading[angle]+y_intercept[angle4];
else if(reading[angle]<=sensor_voltage[temperature2][angle6][hall_reading])
        deviation=slope[angle5]*reading[angle]+y_intercept[angle5];
else if(reading[angle]<=sensor_voltage[temperature2][angle7][hall_reading])
        deviation=slope[angle6]*reading[angle]+y_intercept[angle6];
else deviation=slope[angle7]*reading[angle]+y_intercept[angle7];
calculated[angle]=reading[angle]-deviation;
int hex_reading=calculated[angle]*4096/4.73;
if(troubleshoot) printf("calculated[%d]=%8.3f hex[%d]=%4X\n",angle,calculated[angle],angle,
            hex_reading);
} endprogram:

printf("Sensor Programming Complete - Press any Key");

getch();

disable_calibrate_mode();
disable_buffer1();
disable_buffer2();

eeprom_port_image |= 128;
outportb(eeprom_output_data_port,eeprom_port_image);
place_fixture(9.0);

} void      erase_write_enable()
{
set_eeprom_cs_high();
send_start_bit();
send_opcode(0,0);
send_eeprom_address(0x3F);
set_eeprom_cs_low();
}
```

```
void        erase_write_disable()
{
set_eeprom_cs_high();
send_start_bit();
send_opcode(0,0);
send_eeprom_address(0x00);
set_eeprom_cs_low();
} void        eeprom_write(int address,int data)
{
set_eeprom_cs_high();
send_start_bit();
send_opcode(0,1);
send_eeprom_address(address);
send_eeprom_data(data);
set_eeprom_cs_low();
} int         eeprom_read(int address)
{
set_eeprom_cs_high();
send_start_bit();
send_opcode(1,0);
send_eeprom_address(address);
int d=receive_eeprom_data();
set_eeprom_cs_low();
return(d);
} void        set_eeprom_cs_low(void)
{
eeprom_port_image |= eeprom_cs;
eeprom_port_image |= eeprom_data_out;
outportb(eeprom_output_data_port,eeprom_port_image);
delay(tdelay);
} void        set_eeprom_cs_high(void)
{
eeprom_port_image &= 0xFF-eeprom_cs;
outportb(eeprom_output_data_port,eeprom_port_image);
delay(tdelay);
} void        send_start_bit(void)
{
eeprom_port_image &= 0xFF-eeprom_data_out;
outportb(eeprom_output_data_port,eeprom_port_image);
delay(tdelay);
eeprom_port_image &= 0xFF-eeprom_clk;
outportb(eeprom_output_data_port,eeprom_port_image);
delay(tdelay);
eeprom_port_image |= eeprom_clk;
outportb(eeprom_output_data_port,eeprom_port_image);
delay(tdelay);
} void        send_opcode(int bit1,int bit2)
{
delay(tdelay);//mj
send_eeprom_bit(bit1);
delay(tdelay);//mj
send_eeprom_bit(bit2);
} void        send_eeprom_address(int address)
{
int a5,a4,a3,a2,a1,a0;
a5=0;a4=0;a3=0;a2=0;a1=0;a0=0;
if(address & 0x20) a5=1;
if(address & 0x10) a4=1;
if(address & 0x08) a3=1;
if(address & 0x04) a2=1;
if(address & 0x02) a1=1;
if(address & 0x01) a0=1;
send_eeprom_bit(a5);
delay(tdelay);//mj
send_eeprom_bit(a4);
delay(tdelay);//mj
send_eeprom_bit(a3);
delay(tdelay);//mj
send_eeprom_bit(a2);
```

```
delay(tdelay)://mj|
send_eeprom_bit(a1);
delay(tdelay)://mj|
send_eeprom_bit(a0);
} void    send_eeprom_data(int data)
{
int d[16],j;
unsigned int andbit=0x8000 for(j=0;j<16;j++)
{
if(data & andbit) send_eeprom_bit(1);
else send_eeprom_bit(0);
andbit >>= 1
}
} int     receive_eeprom_data()

{
unsigned int andbit=0x8000,j,data=0,d for(j=0;j<16;j++)
{
eeprom_port_image &= 0xFF-eeprom_clk;
outportb(eeprom_output_data_port,eeprom_port_image);
delay(rdelay);
d= inportb(eeprom_input_data_port) & eeprom_data_in;
if(d) data != andbit;
eeprom_port_image |= eeprom_clk
outportb(eeprom_output_data_port,eeprom_port_image);
delay(rdelay);
andbit>>=1
}
return(data);
} int     read_processor_data(void)
{
unsigned int andbit=0x0001,j,data=0,d for(j=0;j<12;j++)
{
eeprom_port_image &= 0xFF-eeprom_clk;
outportb(eeprom_output_data_port,eeprom_port_image);
delay(rdelay);
d=inportb(eeprom_input_data_port) & eeprom_data_in;
if(d) data |= andbit;
eeprom_port_image |= eeprom_clk
outportb(eeprom_output_data_port,eeprom_port_image);
delay(rdelay);
andbit<<=1;
}
eeprom_port_image &= 0xFF-eeprom_clk;
outportb(eeprom_output_data_port,eeprom_port_image);

for(j=0;j<100;j++);

eeprom_port_image |= eeprom_clk;
outportb(eeprom_output_data_port,eeprom_port_image);
return(data)
} void    send_eeprom_bit(int bit)
{
eeprom_port_image &= 0xFF-eeprom_data_out;
if(bit==0) eeprom_port_image |= eeprom_data_out;
outportb(eeprom_output_data_port,eeprom_port_image);
delay(tdelay);
eeprom_port_image &= 0xFF-eeprom_clk;
outportb(eeprom_output_data_port,eeprom_port_image);
delay(tdelay)
eeprom_port_image |= eeprom_clk
outportb(eeprom_output_data_port,eeprom_port_image);
delay(tdelay);
} void    enable_buffer1()
{
eeprom_port_image |= buffer1_enable;
outportb(eeprom_output_data_port,eeprom_port_image);
}
```

```
void    enable_buffer2()
{
eeprom_port_image |= buffer2_enable;
outportb(eeprom_output_data_port,eeprom_port_image);
} void    disable_buffer1()
{
eeprom_port_image &= 0xFF-buffer1_enable;
outportb(eeprom_output_data_port,eeprom_port_image);
} void    disable_buffer2(void)
{
eeprom_port_image &= 0xFF-buffer2_enable;
outportb(eeprom_output_data_port,eeprom_port_image);
} void    enable_calibrate_mode()
{
eeprom_port_image |= calibrate_enable;
outportb(eeprom_output_data_port,eeprom_port_image);
} void    disable_calibrate_mode()
{
eeprom_port_image &= 0xFF-calibrate_enable;
outportb(eeprom_output_data_port,eeprom_port_image);
} void    set_compout_high()
{
eeprom_port_image &= 0xFF-eeprom_data_out;
outportb(eeprom_output_data_port,eeprom_port_image);
} void    set_compout_low()
{
eeprom_port_image |= eeprom_data_out;
outportb(eeprom_output_data_port,eeprom_port_image);
} int     wait_for_compin_to_go_low(void)
{
if(troubleshoot) printf("Waiting for Compin to go low:n");
while((inportb(eeprom_input_data_port) & eeprom_data_in)
{
if(kbhit())
{
getch();
return(-1);
}
}
return(0);
} int     wait_for_compin_to_go_high(void)
{
if(troubleshoot) printf("Waiting for Compin to go high:n");
while((inportb(eeprom_input_data_port) & eeprom_data_in)==0)
{
if(kbhit())
{
getch();
return(-1);
}
}
return(0);
} void    set_calibration_angle(double angle)
{
// char ch;
// printf("Place Fixture at Angle Number - %4d",angle_number+1);
// getch();

precision_place_fixture(angle);
}
```

```
double     ad_gain=1.005;
double     ad_offset=.010;

double     precision_read_ad()
{
double r,vo;
int times=1000,wait;

r=0;

outportb(ad_control_port,ad_mux_enable);
for(wait=0;wait<10;wait++);

for(int i=0;i<times;i++)
{
  outportb(ad_conversion_port,ad_start_convert);
  outportb(ad_conversion_port,0);
  outportb(ad_conversion_port,ad_start_convert);
  for(wait=0;wait<20;wait++);

r+=inport(ad_reading_port);
} vo=r/times*(10./65536);

r=vo*ad_gain+ad_offset;

return(r);
} int     wait_for_epcs_to_go_high(void)
{
int j=0;

disable_buffer2();

while((j & eeprom_cs_in)==0)
{
  j=inportb(eeprom_input_data_port) & eeprom_cs_in;
  if((inportb(eeprom_input_data_port) & test_abort)==0)
  {
    enable_buffer2();
    return(-1);
  }
}
enable_buffer2();
enable_calibrate_mode();
return(0);
} void     precision_place_fixture(double desired_angle)
{
double angle;

place_fixture(desired_angle-2.0);

angle=print_angle();

if(angle+2<desired_angle)
{
  enable_motor();
  set_motor_speed(position_velocity/20);
  while(angle<desired_angle)
  {
    angle=print_angle();
    if(kbhit()) break;
  }
  set_motor_speed(position_velocity/-160);

while(angle>desired_angle)
  {
    angle=print_angle();
    if(kbhit()) break;
  }
}
else if(angle-1>desired_angle)
{
        enable_motor();
        set_motor_speed(-1*position_velocity/20);
        while(angle>desired_angle)
        {
          angle=print_angle();
          if(kbhit()) break;
        }
```

```
        set_motor_speed(position_velocity,160);
        while(angle<desired_angle)
        {
         angle=print_angle();
         if(kbhit()) break;
        }
    }
    set_motor_speed(0,0);
    disable_motor();
    print_angle();
}
```

- 54 -

```c
#include <math.h>
#include <stdlib.h>
#include "lindefs.cpp"
#include <graphics.h>
#include <string.h>
#include <conio.h>
#include "linear.h"
#include "keys.h"

extern struct text_info    b;

char    ep_parm_response[number_ep_parm_options][option_length];
        ep_parm_option   [number_ep_parm_options][option_length];

extern double angle1_calpoint,angle2_calpoint,angle3_calpoint,
              angle4_calpoint,angle5_calpoint,angle6_calpoint,
              angle7_calpoint,angle8_calpoint;

void    change_epmenu_parameters(void);

extern int   parameter_page_number void    epmenu(void)
{ char    key,option[number_epmenu_options][option_length],
        help_option[number_epmenu_options][help_length];
int     option_position,first_row,option_number=0,i,j;

closegraph();

strcpy(option[calibration_procedure_option],    "Perform Calibration Procedure");
strcpy(option[load_epmenu_parameters_option],   "Load Test Parameters From Disk");
strcpy(option[save_epmenu_parameters_option],   "Save Test Parameters To Disk");
strcpy(option[change_epmenu_parameters_option], "Define Calibration Parameters");
strcpy(option[manual_control_option],           "Use Manual Control over System Functions");
strcpy(option[return_main_menu_option],         "Return to Main Menu");

strcpy(help_option[calibration_procedure_option], "Use this option to perform the AEC proprietary calibration procedure. ");
strcat(help_option[calibration_procedure_option], "The part installed must have both the communication link and sensor ");
strcat(help_option[calibration_procedure_option], "power lines connected. The procedure will be performed as defined in ");
strcat(help_option[calibration_procedure_option], "the Define Calibration Parameters section of this program. The Hot ");
strcat(help_option[calibration_procedure_option], "Key for this option is CNTL-O which accesses this procedure from any ");
strcat(help_option[calibration_procedure_option], "point in the program.");

strcpy(help_option[load_epmenu_parameters_option], "Use this option to load a previously saved set of calibration ");
strcat(help_option[load_epmenu_parameters_option], "parameters. This allows you to operate a different set of calibration ");
strcat(help_option[load_epmenu_parameters_option], "parameters than the default values without having to manually enter those ");
strcat(help_option[load_epmenu_parameters_option], "parameters each time the procedure is performed. Use ALT_L as a hotkey to ");
strcat(help_option[load_epmenu_parameters_option], "load these parameters from within this calibration subsection.");

strcpy(help_option[save_epmenu_parameters_option], "Use this option to save the present calibration parameters. ");
strcat(help_option[save_epmenu_parameters_option], "These parameters will be saved under the file name entered on ");
strcat(help_option[save_epmenu_parameters_option], "the test name entry in the calibration parameters section. ");
strcat(help_option[save_epmenu_parameters_option], "Use ALT_S as a hotkey to save these parameters from within this ");
strcat(help_option[save_epmenu_parameters_option], "calibration subsection.");

strcpy(help_option[change_epmenu_parameters_option], "Use this option to alter the calibration procedure characteristics.");

strcpy(help_option[manual_control_option], "Use this option to obtain manual control over test system functions. ");
strcat(help_option[manual_control_option], "This mode is for troubleshooting and calibration purposes and should ");
strcat(help_option[manual_control_option], "only be used by qualified personnel.");

strcpy(help_option[return_main_menu_option], "Selecting this option returns program control to the calling ");
strcat(help_option[return_main_menu_option], "routine. Pressing the escape key has the same effect.");

menu:

textmode(C4350);
gettextinfo(&b);
window(1,1,b.screenwidth,b.screenheight);
textbackground(LIGHTGRAY);
clrscr();

print_title("E E P R O M  P R O G R A M M I N G  S U B M E N U");
print_selection_menu(option,number_epmenu_options,&option_position,&first_row);
print_help_message(help_option[option_number]);
reverse_video(option_position,first_row+option_number,
              strlen(option[option_number]));

while((key=getch())!=17)
{
 if(key==0)
 {
  key=getch();
  if(key==DN_ARROW || key==UP_ARROW)
```

- 55 -

```
{
if(key==DN_ARROW)
  down(&option_number,number_epmenu_options,option[option_number],
       option_position,first_row+option_number);
  else up(&option_number,number_epmenu_options,option[option_number],
       option_position,first_row+option_number);
  reverse_video(option_position,first_row+option_number,
       strlen(option[option_number]));
  print_help_message(help_option[option_number]);
} else switch(key)
    {
        case ALT_X:
          terminate_program();

case CNTL_O:
          obtain_data();
          closegraph();
          goto menu;

case ALT_G:
          graph_data();
          goto menu;

case PG_DN:
        case ALT_C:
          change_parameters();
          goto menu;

case ALT_O:
          obtain_data();
          closegraph();
          goto menu;

}
}
else
    {
        if(key>'0' && key<='9')
        {
          option_number=key-'1';
          key=ENTER;
        } if(key>='a' && key<='z')
        {
          option_number=key-'a'+9;
          key=ENTER;
        } if(key>='A' && key <='Z')
        {
          option_number=key-'A'+9;
          key=ENTER;
        } if(key==ENTER)
        {
            switch(option_number)
            {
                case calibration_procedure_option:
                  program_eeprom();
                  closegraph();
                  goto menu;

case change_epmenu_parameters_option:
                  change_epmenu_parameters();
                  goto menu;

case load_epmenu_parameters_option:
                  load_epmenu_parameters();
                  goto menu;

case save_epmenu_parameters_option:
                  save_epmenu_parameters();
                  goto menu;

case return_main_menu_option:
                  return;
            }
        } if(key==ESC) return;
    }
}
```

```
void      change_epmenu_parameters()
{
int parm_pos[number_ep_parm_options][2];
 z,row,col,parameter_number;

char      parameter_help[number_ep_parm_options][help_length];

getcursor(&col,&row);
int col1=col;
int row1=row;

strcpy(parameter_help[angle1_calpoint_option],   "The value entered here is the angle at which a reading is taken ");
strcat(parameter_help[angle1_calpoint_option],   "and compared against the ideal value for this point. The ");
strcat(parameter_help[angle1_calpoint_option],   "difference is calculated and sent to the DUT for correction ");
strcat(parameter_help[angle1_calpoint_option],   "under normal operating conditions.");
strcpy(parameter_help[angle2_calpoint_option],   "The value entered here is the angle at which a reading is taken ");
strcat(parameter_help[angle2_calpoint_option],   "and compared against the ideal value for this point. The ");
strcat(parameter_help[angle2_calpoint_option],   "difference is calculated and sent to the DUT for correction ");
strcat(parameter_help[angle2_calpoint_option],   "under normal operating conditions.");
strcpy(parameter_help[angle3_calpoint_option],   "The value entered here is the angle at which a reading is taken ");
strcat(parameter_help[angle3_calpoint_option],   "and compared against the ideal value for this point. The ");
strcat(parameter_help[angle3_calpoint_option],   "difference is calculated and sent to the DUT for correction ");
strcat(parameter_help[angle3_calpoint_option],   "under normal operating conditions.");
strcpy(parameter_help[angle4_calpoint_option],   "The value entered here is the angle at which a reading is taken ");
strcat(parameter_help[angle4_calpoint_option],   "and compared against the ideal value for this point. The ");
strcat(parameter_help[angle4_calpoint_option],   "difference is calculated and sent to the DUT for correction ");
strcat(parameter_help[angle4_calpoint_option],   "under normal operating conditions.");
strcpy(parameter_help[angle5_calpoint_option],   "The value entered here is the angle at which a reading is taken ");
strcat(parameter_help[angle5_calpoint_option],   "and compared against the ideal value for this point. The ");
strcat(parameter_help[angle5_calpoint_option],   "difference is calculated and sent to the DUT for correction ");
strcat(parameter_help[angle5_calpoint_option],   "under normal operating conditions.");
strcpy(parameter_help[angle6_calpoint_option],   "The value entered here is the angle at which a reading is taken ");
strcat(parameter_help[angle6_calpoint_option],   "and compared against the ideal value for this point. The ");
strcat(parameter_help[angle6_calpoint_option],   "difference is calculated and sent to the DUT for correction ");
strcat(parameter_help[angle6_calpoint_option],   "under normal operating conditions.");
strcpy(parameter_help[angle7_calpoint_option],   "The value entered here is the angle at which a reading is taken ");
strcat(parameter_help[angle7_calpoint_option],   "and compared against the ideal value for this point. The ");
strcat(parameter_help[angle7_calpoint_option],   "difference is calculated and sent to the DUT for correction ");
strcat(parameter_help[angle7_calpoint_option],   "under normal operating conditions.");
strcpy(parameter_help[angle8_calpoint_option],   "The value entered here is the angle at which a reading is taken ");
strcat(parameter_help[angle8_calpoint_option],   "and compared against the ideal value for this point. The ");
strcat(parameter_help[angle8_calpoint_option],   "difference is calculated and sent to the DUT for correction ");
strcat(parameter_help[angle8_calpoint_option],   "under normal operating conditions.");

parameter_page_number=eprom_parameter_page;

print_screen(parm_pos);
parameter_number=0;

while(parameter_number<number_ep_parm_options)
{
print_help_message(parameter_help[parameter_number]);
switch(parameter_number)
{ case angle1_calpoint_option:
   z=determine_floatval(parameter_number,parm_pos,
          ep_parm_response[parameter_number],10,
          min_angle,max_angle,1);
   angle1_calpoint=atof(ep_parm_response[parameter_number]);
   break;

case angle2_calpoint_option:
   z=determine_floatval(parameter_number,parm_pos,
          ep_parm_response[parameter_number],10,
          min_angle,max_angle,1);
   angle2_calpoint=atof(ep_parm_response[parameter_number]);
   break;

case angle3_calpoint_option:
   z=determine_floatval(parameter_number,parm_pos,
          ep_parm_response[parameter_number],10,
          min_angle,max_angle,1);
   angle3_calpoint=atof(ep_parm_response[parameter_number]);
   break;

case angle4_calpoint_option:
   z=determine_floatval(parameter_number,parm_pos,
          ep_parm_response[parameter_number],10,
          min_angle,max_angle,1);
```

```
angle4_calpoint=atof(ep_parm_response[parameter_number]);
break;

case angle5_calpoint_option:
    z=determine_floatval(parameter_number,parm_pos,
            ep_parm_response[parameter_number],10,
            min_angle,max_angle,1);
    angle5_calpoint=atof(ep_parm_response[parameter_number]);
    break;

case angle6_calpoint_option:
    z=determine_floatval(parameter_number,parm_pos,
            ep_parm_response[parameter_number],10,
            min_angle,max_angle,1);
    angle6_calpoint=atof(ep_parm_response[parameter_number]);
    break;

case angle7_calpoint_option:
    z=determine_floatval(parameter_number,parm_pos,
            ep_parm_response[parameter_number],10,
            min_angle,max_angle,1);
    angle7_calpoint=atof(ep_parm_response[parameter_number]);
    break;

case angle8_calpoint_option:
    z=determine_floatval(parameter_number,parm_pos,
            ep_parm_response[parameter_number],10,
            min_angle,max_angle,1);
    angle8_calpoint=atof(ep_parm_response[parameter_number]);
    break;

} switch(z)

{ case up_arrow:
    if(parameter_number) parameter_number-=1;
        else parameter_number=number_ep_parm_options-1;
    break;

case dn_arrow:
    if(parameter_number<number_ep_parm_options-1) parameter_number+=1;
        else parameter_number=0;
    break;

case pg_up:
case escape:
        col=col1;
        row=row1;
        return;

case enter:
        parameter_number+=1;
        break;

case pg_down:
        parameter_number=number_ep_parm_options;
        break;

case alt_s:
        save_parameters();
        print_screen(parm_pos);
        break;

case alt_l:
        load_parameters();
        print_screen(parm_pos);
        break;

case alt_x:
        terminate_program();

case alt_g:
        graph_data();
        print_screen(parm_pos);
        break;

case alt_r:
        printout_results();
        print_screen(parm_pos);
        break;

case alt_p:
        plot_data();
        print_screen(parm_pos);
        break;
```

```
case alt_o:
        obtain_data();
        print_screen(parm_pos);
        break;

case f1:
        results_to_screen();
        print_screen(parm_pos);
        break;

}                   /* end z switch */
}                       /* end parameter number while */
```

```c
#include <dos.h>
#include <dir.h>
#include <stdlib.h>
#include "ltrglobl.cpp"
#include <graphics.h>
#include <math.h>
#include "linear.h"

#define xline      50
#define yline      50
define font_size  4
define max_num_entries 1100 void    plot_spec_line(double min_ang,double max_ang,
                       double min_volt,double  max_volt,int maxx,int miny,int maxy);
void    screen_dump();
int     print_time(char *output_device);
void    results_to_screen();
void    results_to_plotter();
void    graph_transfer_function_deviation();
int     determine_floatval(int i,int np[][2],char *response,int maxlen,
                           double min,double max,int np);
void    print_validation_screen();
void    load_validation_data();
void    print_validation_report();
void    find_mv_reading(double angle,char *temperature,double *clockwise_deviation,
                       double *clockwise_deviation_per_cent, double *hysteresis);

int     dut_list[max_num_entries];
char    filename[max_num_entries][13],input_device[60];

extern struct  text_info    ti;

void    graph_data()
{
int driver=DETECT,mode,maxx,maxy,miny,x,xtick,y,ytick,pr,rn,pd;
int x0,y0,x1,y1,y2,x2;

float angle,vo;

double vs=plot_data[0][max_num_points-1];

char ch,string[option_length];

initgraph(&driver,&mode,"");

maxx=getmaxx()-20;
maxy=getmaxy();
miny=25;

if(vs<4.0 || vs>6.0) vs=5.0;

settextjustify(CENTER_TEXT,BOTTOM_TEXT);
settextstyle(TRIPLEX_FONT,HORIZ_DIR,font_size-2);
moveto(maxx/2,maxy);
outtext(parameter_response[x_title_option]);
moveto(getmaxx()-1,maxy/2);
settextjustify(RIGHT_TEXT,BOTTOM_TEXT);
settextstyle(TRIPLEX_FONT,VERT_DIR,font_size-2);
outtext(parameter_response[y_title_option]);
moveto(maxx/2,0);
settextjustify(CENTER_TEXT,TOP_TEXT);
settextstyle(TRIPLEX_FONT,HORIZ_DIR,font_size-2);
outtext(parameter_response[plot_title_option]);
settextjustify(CENTER_TEXT,TOP_TEXT);
settextstyle(SMALL_FONT,HORIZ_DIR,font_size*1.5);

for(angle=min_plotting_angle;angle<=max_plotting_angle+.001;
    angle+=(max_plotting_angle-min_plotting_angle)/(number_x_ticks-1))
{
xtick=xline+(maxx-xline)*(angle-min_plotting_angle)/(max_plotting_angle-min_plotting_angle);
line(xtick,maxy-xline,xtick,miny);
fioa(angle,8,1,string);
moveto(xtick,maxy-xline+10);
outtext(string);
} settextjustify(RIGHT_TEXT,CENTER_TEXT);
for(vo=min_plotting_voltage;vo<=max_plotting_voltage+.001;
    vo+=(max_plotting_voltage-min_plotting_voltage)/(number_y_ticks-1))
{
ytick=(maxy-xline)-(maxy-xline-miny)*(vo-min_plotting_voltage)/
      (max_plotting_voltage-min_plotting_voltage);
line(yline,ytick,maxx,ytick);
fioa(vo,8,3,string);
}
```

```
moveto(xline,ytick);
outtext(string);
} settextjustify(LEFT_TEXT,TOP_TEXT);
settextstyle(SMALL_FONT,HORIZ_DIR,font_size);
moveto(0,maxy-21);
outtext(label_response[plot_label1_option]);
setcolor(color_table[0]);
line(110,maxy-18,130,maxy-18);
setcolor(color_table[1]);
line(110,maxy-13,130,maxy-13);

setcolor(WHITE);
moveto(0,maxy-8);
outtext(label_response[plot_label2_option]);
setcolor(color_table[2]);
line(110,maxy-5,130,maxy-5);
setcolor(color_table[3]);
line(110,maxy,130,maxy);

setcolor(WHITE);
moveto(maxx-120,maxy-21);
outtext(label_response[plot_label3_option]);
setcolor(color_table[4]);
line(maxx,maxy-18,maxx-20,maxy-18);
setcolor(color_table[5]);
line(maxx,maxy-13,maxx-20,maxy-13);

setcolor(WHITE);
moveto(maxx-120,maxy-8);
outtext(label_response[plot_label4_option]);
setcolor(color_table[6]);
line(maxx,maxy-5,maxx-20,maxy-5);
setcolor(color_table[7]);
line(maxx,maxy,maxx-20,maxy);

plot_spec_line(l1_min_angle,l1_max_angle,l1_min_voltage,l1_max_voltage,
    maxx,miny,maxy);
plot_spec_line(l2_min_angle,l2_max_angle,l2_min_voltage,l2_max_voltage,
    maxx,miny,maxy);
plot_spec_line(l3_min_angle,l3_max_angle,l3_min_voltage,l3_max_voltage,
    maxx,miny,maxy);
plot_spec_line(l4_min_angle,l4_max_angle,l4_min_voltage,l4_max_voltage,
    maxx,miny,maxy);
plot_spec_line(l5_min_angle,l5_max_angle,l5_min_voltage,l5_max_voltage,
    maxx,miny,maxy);
plot_spec_line(l6_min_angle,l6_max_angle,l6_min_voltage,l6_max_voltage,
    maxx,miny,maxy);
plot_spec_line(l7_min_angle,l7_max_angle,l7_min_voltage,l7_max_voltage,
    maxx,miny,maxy);
plot_spec_line(l8_min_angle,l8_max_angle,l8_min_voltage,l8_max_voltage,
    maxx,miny,maxy);

for(pn=0;pn<number_plots;pn++)
for(rn=0;rn<=number_repeats;rn++)
{
    pd=pn*(number_repeats+1)+rn;
    setcolor(color_table[pd]);
    vs=plot_data[pd][max_num_points-1];
    if(vs<4.0 || vs>6.0) vs=5.0;
    for(x=min_plotting_angle*10;x<max_plotting_angle*10;x++)
    {
        if((plot_data[pd][x]/vs)>min_plotting_voltage && (plot_data[pd][x]/vs)<max_plotting_voltage)
        {
            x1=xline+((float)(x-min_plotting_angle*10)*(maxx-xline)/
                ((max_plotting_angle-min_plotting_angle)*10));
            y1=(maxy-xline)-(maxy-xline-miny)*(((plot_data[pd][x]/vs)-min_plotting_voltage)/
                (max_plotting_voltage-min_plotting_voltage));
            break;
        }
    }
    for(x=x;x<max_plotting_angle*10;x++)
    {
        if((plot_data[pd][x]/vs)>min_plotting_voltage && (plot_data[pd][x]/vs)<max_plotting_voltage)
        {
            y2=(maxy-xline)-(maxy-xline-miny)*(((plot_data[pd][x]/vs)-min_plotting_voltage)/
                (max_plotting_voltage-min_plotting_voltage));
            x2=xline+((float)(x-min_plotting_angle*10)*(maxx-xline)/
                ((max_plotting_angle-min_plotting_angle)*10));
            line(x1,y1,x2,y2);
            x1=x2;y1=y2;
        }
    }
}
ch=getch();
if(ch==0)
```

```
{
switch(getch())
{
case ALT_D:
  screen_dump();
  break;

case ALT_S:
  closegraph();
  save_data();
  break;

case ALT_L:
  closegraph();
  load_data();
  break;

case ALT_X:
  terminate_program();

case ALT_R:
  printout_results();
  break;

case F1:
  results_to_screen();
  break;

case ALT_P:
  results_to_plotter();
  break;

case F2:
  graph_transfer_function_deviation();
  break;

}
} closegraph();
} void    plot_spec_line(double min_ang,double max_ang
                double min_volt,double max_volt,int maxx,int miny,int maxy)
{
double slope,y_intercept,y,y1;
int x,x1,x2,y2,j=0;

if(max_ang||min_ang||min_volt||max_volt)
{
  if(max_ang-min_ang) slope=(max_volt-min_volt)/(max_ang-min_ang);
  else
  {
      y1=(maxy-yline)-(maxy-yline-miny)*min_volt/(max_plotting_voltage-min_plotting_voltage);
      y2=(maxy-yline)-(maxy-yline-miny)*max_volt/(max_plotting_voltage-min_plotting_voltage);
      x1=yline+(min_ang*10-min_plotting_angle*10)*(maxx-yline)/
         ((max_plotting_angle-min_plotting_angle)*10);
      x2=x1;
      setlinestyle(DASHED_LINE,0xFFFF,NORM_WIDTH);
      line(x1,y1,x2,y2);
      setlinestyle(SOLID_LINE,0xFFFF,NORM_WIDTH);
  }
  y_intercept=max_volt-max_ang*slope;
  for(x=min_plotting_angle*10;x<max_plotting_angle*10;x++)
  {
    if(x>min_ang*10 && x<max_ang*10)
    {
      if(++j<15)
      {
        y1=slope*(float)x/10+y_intercept;
        y=(maxy-yline)-(maxy-yline-miny)*((y1-min_plotting_voltage)/
           (max_plotting_voltage-min_plotting_voltage));
        putpixel(yline+((float)x-min_plotting_angle*10)*(maxx-yline)/
           ((max_plotting_angle-min_plotting_angle)*10),y,WHITE);
      }
      else if(j>22) j=0;
    }
  }
}
}

FILE *fptr2;

void    screen_dump()
{
unsigned int word,i,j,k,l;
```

```c
unsigned char byte,b1,b2;

char string[50];
int m[641],n[8][81];

if((fptr2=fopen("prn","w"))==NULL)
{
  printf("Can't Access Printer");
  getch();
  return;
} fprintf(fptr2,"%c%c",10,13);

for(i=0;i<60;i++)
{
  for(k=0;k<=640;k++) m[k]=0;
  fprintf(fptr2,"%c%c%c%c%c%c%c",27,'3',19,27,'L',128,2);

for(k=0;k<80;k++)
  {
    for(j=0;j<8;j++)
    {
      byte=peekb(0xA000,i*640+k+j*80);

for(i=0;i<8;i++)
      {
        outportb(0x3CE,4);
        outportb(0x3CF,0);
        outportb(0x3CE,5);
        outportb(0x3CF,0);
        byte=peekb(0xA000,i*640+k+j*80);
        if(byte & 0x80>>i) m[k*8+i]|=1<<(7-j);
        outportb(0x3CE,4);
        outportb(0x2CF,1);
        outportb(0x3CE,5);
        outportb(0x3CF,5);
        byte=peekb(0xA000,i*640+k+j*80);
        if(byte & 0x80>>i) m[k*8+i]|=1<<(7-j);
        outportb(0x3CE,4);
        outportb(0x3CF,2);
        outportb(0x3CE,5);
        outportb(0x3CF,0);
        byte=peekb(0xA000,i*640+k+j*80);
        if(byte & 0x80>>i) m[k*8+i]|=1<<(7-j);
        outportb(0x3CE,4);
        outportb(0x3CF,3);
        outportb(0x3CE,5);
        outportb(0x3CF,0);
        byte=peekb(0xA000,i*640+k+j*80);
        if(byte & 0x80>>i) m[k*8+i]|=1<<(7-j);
      }
    }
  } for(i=0;i<640;i++)
  {
    if(m[i]==26) m[i]=24;
    if(m[i]==10) m[i]=11;
    fputc(m[i],fptr2);
  } fputc(10,fptr2);
  fputc(13,fptr2);
}
fputc(12,fptr2);
fclose(fptr2);
} void      printout_results()           /* ALT-R */
{
int pn,rn,pd,error_counter;

double ideal_transfer_function,x,
       clockwise_deviation,clockwise_deviation_per_cent,
       ccw_deviation,ccw_deviation_per_cent,hysteresis;

double vs=plot_data[0][max_num_points-1];

char ch;

gettextinfo(&ti);

closegraph();
textmode(C4350);
textcolor(WHITE);
textbackground(LIGHTBLUE);
```

```
clrscr();

if(vs<1.0 || vs>9.0) vs=5.0;

printf("\n\n   Sending Transfer Function Data to Printer -- Please Wait");

for(pn=0;pn<number_plots;pn++)
{
 for(rn=0;rn<number_repeats;rn++)
 {
  fprintf(stdprn,"Part Number:  %s\n",parameter_response[plot_title_option]);
  fprintf(stdprn,"Temperature: %s\n\n",label_response[pn]);
  pd=2*(pn*number_repeats+rn);
  if(number_repeats>1) fprintf(stdprn,"Repeat Number -- %d\n",rn+1);

fprintf(stdprn,"DEGREES   TRANSFER FUNCTION   CW DEVIATION   CCW DEVIATION   HYSTERESIS\n");
  fprintf(stdprn,"          VOLTS        mv    %    mv    %       mv\n\n");

for(x=min_plotting_angle*10;x<=max_plotting_angle*10+1;x+=printout_increment*10)
  {
   if(plot_data[pd][x]>-5.0 && plot_data[pd+1][x]>-5.0 && plot_data[0][x]>-5.0 && plot_data[1][x]>-5.0)
   {
    fprintf(stdprn,"\n");
    fprintf(stdprn,"%7.1f",x/10);

if(x/10 <96.6) ideal_transfer_function=.046528*x/10+.155;
    else ideal_transfer_function=4.65;
    if(ideal_transfer_function)
    {
     if(pd>0 && pd<6 && x/10 >=14.399 && x/10 <=20.401)
     {
      clockwise_deviation_per_cent=(plot_data[pd][x]-plot_data[0][x])/vs;
      ccw_deviation_per_cent=(plot_data[pd+1][x]-plot_data[1][x])/vs;
      fprintf(stdprn,"       ");
      ccw_deviation=plot_data[pd+1][x]-plot_data[1][x];
      clockwise_deviation=plot_data[pd][x]-plot_data[0][x];
     }
     else
     {
      clockwise_deviation_per_cent=(plot_data[pd][x]-ideal_transfer_function)/vs;
      ccw_deviation_per_cent=(plot_data[pd+1][x]-ideal_transfer_function)/vs;
      ccw_deviation=plot_data[pd+1][x]-ideal_transfer_function;
      clockwise_deviation=plot_data[pd][x]-ideal_transfer_function;
      fprintf(stdprn,"%14.3f",ideal_transfer_function);
     }
    } hysteresis=fabs(plot_data[pd][x]-plot_data[pd+1][x]);
    fprintf(stdprn,"%15.1f",clockwise_deviation*1000.);
    fprintf(stdprn,"%8.2f",clockwise_deviation_per_cent*100.);

if(x/10 >=14.399 && x/10 <=20.399)
    {
     if(pd==2)
     {
      if((clockwise_deviation_per_cent>.011) || (clockwise_deviation_per_cent<-.022))
        fprintf(stdprn," *");
        else fprintf(stdprn,"  ");
     }
     if(pd==4)
     {
      if((clockwise_deviation_per_cent>.0045) || (clockwise_deviation_per_cent<-.009))
        fprintf(stdprn," *");
        else fprintf(stdprn,"  ");
     }
     if(pd==0 || pd==6)
     {
      if((clockwise_deviation_per_cent>.01) || (clockwise_deviation_per_cent<-.01))
        fprintf(stdprn," *");
        else fprintf(stdprn,"  ");
     }
    }
    if(x/10 >20.4)
    {
     if(clockwise_deviation_per_cent>=.03 || clockwise_deviation_per_cent<=-.03)
     {
      fprintf(stdprn," *");
     }
        else fprintf(stdprn,"  ");
    }
    if(x/10 <14.4)
    {
     if(clockwise_deviation_per_cent>=.03 || clockwise_deviation_per_cent<=-.03)
     {
```

```
fprintf(stdprn," ");
}
else fprintf(stdprn," ");

fprintf(stdprn,"%8.1f",ccw_deviation*1000.);
fprintf(stdprn,"%8.2f",ccw_deviation_per_cent*100.);

if(x/10.<14.4)
  if(ccw_deviation_per_cent>=.03 || ccw_deviation_per_cent<=-.03)
    fprintf(stdprn," ");
        else fprintf(stdprn," ");

if(x/10.>=14.4 && x/10.<=20.4)
{
  if(pd==2)
  {
    if(ccw_deviation_per_cent>=.011 || ccw_deviation_per_cent<=-.022))
        fprintf(stdprn," ");
           else fprintf(stdprn," ");
  }
  if(pd==4)
  {
    if(ccw_deviation_per_cent>=.0045 || (ccw_deviation_per_cent<=-.009))
        fprintf(stdprn," ");
           else fprintf(stdprn," ");
  }
  if(pd==0 || pd==6)
  {
    if(ccw_deviation_per_cent>.01) || (ccw_deviation_per_cent<-.01))
        fprintf(stdprn," ");
           else fprintf(stdprn," ");
  }
} if(x/10.>20.4)
  if(ccw_deviation_per_cent>=.03 || ccw_deviation_per_cent<=-.03)
    fprintf(stdprn," ");
        else fprintf(stdprn," ");

fprintf(stdprn,"%10.1f",hysteresis*1000.);

}
} fprintf(stdprn,"%c",0x0C);

fprintf(stdprn,"Listing of All Points outside of transfer function limits:\n\n");

fprintf(stdprn,"\nPart Number - %s:\n",parameter_response[plot_title_option]);
fprintf(stdprn,"Temperature %s :\n\n",label_response[pn]);

fprintf(stdprn,"DEGREES  TRANSFER FUNCTION   CW DEVIATION    CCW DEVIATION   HYSTERESIS\n");
fprintf(stdprn,"              VOLTS          mv     %        mv      %        mv\n\n");

error_counter=0;

for(x=min_plotting_angle*10;x<=max_plotting_angle*10+1;x++)
{
  if(plot_data[pd][x]>-5.0 && plot_data[pd+1][x]>-5.0 && plot_data[0][x]>-5.0 && plot_data[1][x]>-5.0)
  { if(x/10.<96.6) ideal_transfer_function=.046528*x/10+.155;
    else ideal_transfer_function=4.65;
    clockwise_deviation=plot_data[pd][x]-ideal_transfer_function;
    if(ideal_transfer_function)
    {
      if(pd>0 && pd<6 && x/10.>=14.399 && x/10.<=20.401)
      {
        clockwise_deviation_per_cent=(plot_data[pd][x]-plot_data[0][x])/vs;
        ccw_deviation_per_cent=(plot_data[pd+1][x]-plot_data[1][x])/vs;
        ccw_deviation=plot_data[pd+1][x]-plot_data[1][x];
        clockwise_deviation=plot_data[pd][x]-plot_data[0][x];
      }
      else
        {
          clockwise_deviation_per_cent=(plot_data[pd][x]-ideal_transfer_function)/vs;
          ccw_deviation_per_cent=(plot_data[pd+1][x]-ideal_transfer_function)/vs;
          ccw_deviation=plot_data[pd+1][x]-ideal_transfer_function;
          clockwise_deviation=plot_data[pd][x]-ideal_transfer_function;

}
```

```
}
hysteresis=fabs(plot_data[pd][x]-plot_data[pd+1][x]);

if((x/10 <14.4) || (x/10 >20.4))
{
    if((clockwise_deviation_per_cent>=.03) || (clockwise_deviation_per_cent<=-.03))// ||
    {
        error_counter++;
        fprintf(stdprn,"\n%7.1f",x/10);
        fprintf(stdprn,"%14.3f",ideal_transfer_function);
        fprintf(stdprn,"%15.1f",clockwise_deviation*1000.);
        fprintf(stdprn,"%8.2f",clockwise_deviation_per_cent*100.);

if((clockwise_deviation_per_cent>=.03) || (clockwise_deviation_per_cent<=-.03))
          fprintf(stdprn," *");
          else fprintf(stdprn,"  ");

fprintf(stdprn,"%8.1f",ccw_deviation*1000.);
        fprintf(stdprn,"%8.2f",ccw_deviation_per_cent*100.);
        if((ccw_deviation_per_cent>=.03) || (ccw_deviation_per_cent<=-.03))
          fprintf(stdprn," *");
          else fprintf(stdprn,"  ");

fprintf(stdprn,"%10.1f",hysteresis*1000.);
    }
} if(x/10 >=14.399 && x/10 <=20.399)
{ int error_flag=0;
switch(pd)
{
    case 0:
    case 6:
        if((clockwise_deviation_per_cent>=.0100) || (clockwise_deviation_per_cent<=-.0100))// ||
          error_flag++;
        break;

case 2:
        if((clockwise_deviation_per_cent>=.0110) || (clockwise_deviation_per_cent<=-.0220))// ||
          error_flag++;
        break;

case 4:
        if((clockwise_deviation_per_cent>=.0045) || (clockwise_deviation_per_cent<=-.0090))// ||
          error_flag++;
        break;
} if(error_flag)
{
    error_counter++;
    fprintf(stdprn,"\n");
    fprintf(stdprn,"%7.1f",x/10.);
    if(pd>0 && x/10 >14.399 && x/10 <20.401) fprintf(stdprn,"              ");
    else fprintf(stdprn,"%14.3f",ideal_transfer_function);
    fprintf(stdprn,"%15.1f",clockwise_deviation*1000.);
    fprintf(stdprn,"%8.2f",clockwise_deviation_per_cent*100.);

switch(pd)
    {
        case 0:
        case 6:
            if((clockwise_deviation_per_cent>=.0100) || (clockwise_deviation_per_cent<=-.0100))
              fprintf(stdprn," *");
              else fprintf(stdprn,"  ");
            break;

case 2:
            if((clockwise_deviation_per_cent>=.0110) || (clockwise_deviation_per_cent<=-.0220))
              fprintf(stdprn," *");
              else fprintf(stdprn,"  ");
            break;

case 4:
            if((clockwise_deviation_per_cent>=.0045) || (clockwise_deviation_per_cent<=-.009))
              fprintf(stdprn," *");
              else fprintf(stdprn,"  ");
            break;

default:
            fprintf(stdprn,"  ");
            break;
    }
```

```
          fprintf(stdprn,"%8.1f",ccw_deviation*1000.);
          fprintf(stdprn,"%8.2f",ccw_deviation_per_cent*100.);

switch(pd)
          {
           case 0:
           case 6:
            if((ccw_deviation_per_cent>=.0100) || (ccw_deviation_per_cent<=-.0100))
             fprintf(stdprn,"*");
             else fprintf(stdprn," ");
            break;

case 2:
            if((ccw_deviation_per_cent>=.0110) || (ccw_deviation_per_cent<=-.0220))
             fprintf(stdprn,"*");
             else fprintf(stdprn," ");
            break;

case 4:
            if((ccw_deviation_per_cent>=.0045) || (ccw_deviation_per_cent<=-.0090))
             fprintf(stdprn,"*");
             else fprintf(stdprn," ");
            break;

default:
            fprintf(stdprn," ");
            break;

} fprintf(stdprn,"%10.1f",hysteresis*1000.);
       }
      }
     }
    }
   }
   if(error_counter==0)
   {
    fprintf(stdprn,"\n\n   No points found outside of transfer function.");
   } fprintf(stdprn,"%c",0x0C);

if(kbhit())
   {
    ch=getch();
    if(ch==ESC)
    {
     fclose(fp2);
     return;
    }
    if(ch==0)
    {
     ch=getch();
     if(ch==ALT_X) terminate_program();
    }
   }
  }
 } void     results_to_screen()       /* F1 */
 {
  int pn,rn,pd,j,line_counter=0,max_lines,error_counter;

double ideal_transfer_function,x,
         clockwise_deviation,clockwise_deviation_per_cent,
         ccw_deviation,ccw_deviation_per_cent,hysteresis;

double vs=plot_data[0][max_num_points-1];

char ch;

gettextinfo(&ti);
  max_lines=ti.screenheight-8;

closegraph();
  textmode(C4350);
  textcolor(WHITE);
  textbackground(LIGHTBLUE);
  clrscr();
```

```
if(vs<1.0 || vs>9.0) vs=5.0;
locate(0,0);
printf("DEGREES  TRANSFER FUNCTION  CW DEVIATION  CCW DEVIATION  HYSTERESIS\n");
printf("         VOLTS         mv    %    mv    %    mv\n\n");

line_counter=0;

for(pn=0;pn<number_plots;pn++)
{
window(1,1,b.screenwidth,b.screenheight);
locate(20,3);
printf("                 ");
for(rn=0;rn<number_repeats;rn++)
{
locate(0,3);
printf("Temperature  %s",label_response[pn]);
pd=2*(pn*number_repeats+rn);
if(number_repeats>1)
{
locate(40,3);
printf("Repeat Number   %d\n",rn+1);
} window(1,5,b.screenwidth,b.screenheight);
clrscr();
locate(0,5);

line_counter=0;

for(x=min_plotting_angle*10;x<=max_plotting_angle*10+1;x+=printout_increment*10)
{
if(plot_data[pd][x]>-5.0 && plot_data[pd+1][x]>-5.0 && plot_data[0][x]>-5.0 && plot_data[1][x]>-5.0)
{
printf("\n");
line_counter++;
if(line_counter>=max_lines)
{
ch=getch();
if(ch==ESC) return;
if(ch==0) ch=getch();
if(ch==ALT_X) terminate_program();
line_counter=0;
clrscr();
locate(0,5);
}
printf("%7.1f",x/10);

if(x/10 <96.6) ideal_transfer_function= .046528*x/10+ 1.55;
else ideal_transfer_function=4.65;
if(ideal_transfer_function)
{
if(pd>0 && pd<6 && x/10 >=14.399 && x/10 <=20.401)
{
clockwise_deviation_per_cent=(plot_data[pd][x]-plot_data[0][x])/vs;
ccw_deviation_per_cent=(plot_data[pd+1][x]-plot_data[1][x])/vs;
printf("         ");
ccw_deviation=plot_data[pd+1][x]-plot_data[1][x];
clockwise_deviation=plot_data[pd][x]-plot_data[0][x];
}
else
        {
        clockwise_deviation_per_cent=(plot_data[pd][x]-ideal_transfer_function)/vs;
        ccw_deviation_per_cent=(plot_data[pd+1][x]-ideal_transfer_function)/vs;
        ccw_deviation=plot_data[pd+1][x]-ideal_transfer_function;
        clockwise_deviation=plot_data[pd][x]-ideal_transfer_function;
        printf("%14.3f",ideal_transfer_function);
        }
} hysteresis=fabs(plot_data[pd][x]-plot_data[pd+1][x]);
printf("%+15.1f",clockwise_deviation*1000.);
printf("%+8.2f",clockwise_deviation_per_cent*100.);

if(x/10 >=14.399 && (x/10 <=20.399))
{
if(pd==2)
{
if((clockwise_deviation_per_cent>.011) || (clockwise_deviation_per_cent<-.022))
        printf(" *");
        else printf("  ");
} if(pd==4)
{
if((clockwise_deviation_per_cent>.0045) || (clockwise_deviation_per_cent<-.009))
        printf(" *");
        else printf("  ");
}
```

```
if(pd==0 || pd==6)
{
  if((clockwise_deviation_per_cent>.01) || (clockwise_deviation_per_cent<-.01))
        printf("*");
            else printf(" ");
}
}
if(x/10 >20.4)
  if(clockwise_deviation_per_cent>=.03 || clockwise_deviation_per_cent<=-.03)
  {
  printf("*");
  }
        else printf(" ");
if(x/10 <14.4)
  if(clockwise_deviation_per_cent>=.03 || clockwise_deviation_per_cent<=-.03)
  {
  printf("*");
  }
  else printf(" ");

printf("%8.1f",ccw_deviation*1000.);
printf("%8.2f",ccw_deviation_per_cent*100.);

if(x/10 <14.4)
  if(ccw_deviation_per_cent>=.03 || ccw_deviation_per_cent<=-.03)
    printf("*");
            else printf(" ");
if(x/10 >=14.4 && x/10 <=20.4)
{
  if(pd==2)
  {
    if((ccw_deviation_per_cent>=.011) || (ccw_deviation_per_cent<=-.022))
        printf("*");
            else printf(" ");
  }
  if(pd==4)
  {
    if((ccw_deviation_per_cent>=.0045) || (ccw_deviation_per_cent<=-.009))
        printf("*");
            else printf(" ");
  }
  if(pd==0 || pd==6)
  {
    if((ccw_deviation_per_cent>.01) || (ccw_deviation_per_cent<-.01))
        printf("*");
            else printf(" ");
  }
} if(x/10 >20.4)
  if(ccw_deviation_per_cent>=.03 || ccw_deviation_per_cent<=-.03)
    printf("*");
            else printf(" ");

printf("%10.1f",hysteresis*1000.);

}
} ch=getch();
if(ch==ESC) return;
if(ch==0) ch=getch();
if(ch==ALT_X) terminate_program();

window(1,1,b.screenwidth,b.screenheight);

line_counter=0;

locate(40,3);
printf("Points outside of transfer function:");

error_counter=0;

window(1,5,b.screenwidth,b.screenheight);
clrscr();
line_counter=0;

for(x=min_plotting_angle*10;x<max_plotting_angle*10+1;x++)
```

```
{
if(p>0) data[pd][x]>-5.0 && pot_data[pd+1][x]>-5.0 && plot_data[0][x]>-5.0 && plot_data[1][x]>-5.0)
{ if(x/10 <96.6) ideal_transfer_function=.046528*x/10+1.55;
  else ideal_transfer_function=4.65;
  clockwise_deviation=plot_data[pd][x]-ideal_transfer_function;
  if(ideal_transfer_function)
  {
    if(pd>0 && pd<6 && x/10 >=14.399 && x/10 <=20.401)
    {
      clockwise_deviation_per_cent=(plot_data[pd][x]-plot_data[0][x])/vs;
      ccw_deviation_per_cent=(plot_data[pd+1][x]-plot_data[1][x])/vs;
      ccw_deviation=plot_data[pd+1][x]-plot_data[1][x];
      clockwise_deviation=plot_data[pd][x]-plot_data[0][x];
    }
    else
    {
      clockwise_deviation_per_cent=(plot_data[pd][x]-ideal_transfer_function)/vs;
      ccw_deviation_per_cent=(plot_data[pd+1][x]-ideal_transfer_function)/vs;
      ccw_deviation=plot_data[pd+1][x]-ideal_transfer_function;
      clockwise_deviation=plot_data[pd][x]-ideal_transfer_function;
    }
  }
}
hysteresis=fabs(plot_data[pd][x]-plot_data[pd+1][x]);

if((x/10 <14.4) || (x/10 >20.4))
{
  if((clockwise_deviation_per_cent>=.03) || (clockwise_deviation_per_cent<=-.03))//||
     (ccw_deviation_per_cent>=.03)    || (ccw_deviation_per_cent<=-.03))
  {
    error_counter++;
    line_counter++;
    if(line_counter>=max_lines)
    {
      ch=getch();
      if(ch==ESC) return;
      if(ch==0) getch();
      if(ch==ALT_X) terminate_program();
      line_counter=0;
      clrscr();
      locate(0,5);
    }
    printf("\n%7.1f",x/10);
    printf("%14.3f",ideal_transfer_function);
    printf("%15.1f",clockwise_deviation*1000.);
    printf("%8.2f",clockwise_deviation_per_cent*100.);

if((clockwise_deviation_per_cent>=.03) || (clockwise_deviation_per_cent<=-.03))
      printf("  *");
    else printf("   ");

printf("%8.1f",ccw_deviation*1000.);
    printf("%8.2f",ccw_deviation_per_cent*100.);
    if((ccw_deviation_per_cent>=.03) || (ccw_deviation_per_cent<=-.03))
      printf("  *");
    else printf("   ");

printf("%10.1f",hysteresis*1000.);
  }
}
if(x/10 >=14.399 && x/10 <=20.399)
{
  int error_flag=0;
  switch(pd)
  {
    case 0:
    case 6:
      if((clockwise_deviation_per_cent>=.0100) || (clockwise_deviation_per_cent<=-.0100))//||
         (ccw_deviation_per_cent>=  .0100) || (ccw_deviation_per_cent<= -.0100))
        error_flag++;
      break;

case 2:
      if((clockwise_deviation_per_cent>=.0110) || (clockwise_deviation_per_cent<=-.0220))//||
         (ccw_deviation_per_cent>=  .0110) || (ccw_deviation_per_cent<= -.0220))
        error_flag++;
      break;

case 4:
      if((clockwise_deviation_per_cent>=.0045) || (clockwise_deviation_per_cent<=-.0090))//||
         (ccw_deviation_per_cent>=  .0045) || (ccw_deviation_per_cent<= -.0090))
        error_flag++;
      break;
```

```
}
if(error_flag)
{
    error_counter++;
    line_counter++;
    if(line_counter>=max_lines)
    {
        ch=getch();
        if(ch==ESC) return;
        if(ch==0) getch();
        if(ch==ALT_X) terminate_program();
        line_counter=0;
        clrscr();
        locate(0,5);
    }
    printf("\n");
    printf("%7.1f",x/10 );
    if(pd>0 && x/10 >14.399 && x/10 <20.401) printf("        ");
    else printf("%14.3f",ideal_transfer_function);
    printf("%15.1f",clockwise_deviation*1000 );
    printf("%8.2f",clockwise_deviation_per_cent*100 );

switch(pd)
    {
    case 0:
    case 6:
        if((clockwise_deviation_per_cent>=.0100) || (clockwise_deviation_per_cent<=-.0100))
         printf("*");
         else printf(" ");
        break;

case 2:
        if((clockwise_deviation_per_cent>=.0110) || (clockwise_deviation_per_cent<=-.0220))
         printf("*");
         else printf(" ");
        break;

case 4:
        if((clockwise_deviation_per_cent>=.0045) || (clockwise_deviation_per_cent<=-.009))
         printf("*");
         else printf(" ");
        break;

default:
         printf(" ");
        break;

} printf("%8.1f",ccw_deviation*1000 );
    printf("%8.2f",ccw_deviation_per_cent*100 );

switch(pd)
    {
    case 0:
    case 6:
        if((ccw_deviation_per_cent>=.0100) || (ccw_deviation_per_cent<=-.0100))
         printf("*");
         else printf(" ");
        break;

case 2:
        if((ccw_deviation_per_cent>=.0110) || (ccw_deviation_per_cent<=-.0220))
         printf("*");
         else printf(" ");
        break;

case 4:
        if((ccw_deviation_per_cent>=.0045) || (ccw_deviation_per_cent<=-.0090))
         printf("*");
         else printf(" ");
        break;

default:
         printf(" ");
        break;

} printf("%10.1f",hysteresis*1000 );

}
}
}
}
```

```c
if(error_counter==0)
{
locate(15,10);
printf("No points found outside of transfer function.");
} ch=getch();
if(ch==ESC) return;
if(ch==0) ch=getch();
if(ch==Alt_T_X) terminate_program();

}
}

FILE *fp4;

void     save_data()
{
int row1,col1,j;
char temp[50],string[40],ch,output_device[50],od[50];

gettextinfo(&ti);
window(1,1,ti.screenwidth,ti.screenheight);

row1=row;col1=col;
clrscr();

if(strcmp(parameter_response[plotname_option],"Untitled")==0)
{
while(strcmp(parameter_response[plotname_option],"Untitled")==0)
{
printf("Enter Output Path- ");
i=gets(output_device);
printf("\n");
if(i)
{
locate(col1,row1);
return;
}
else if(output_device[0]==0)
        {
        printf("\007     Data Not SAVED!!");
        printf("\n    Legal File Name Must Be Entered\n");
        } else strcpy(parameter_response[plotname_option],output_device);
}
strcpy(parameter_response[plotname_option],output_device);
}
else strcpy(output_device,parameter_response[plotname_option]);

p=strchr(' ',output_device);
if(p) output_device[j]=0;

strcat(output_device,".plt");

if((fp4=fopen(output_device,"r"))!=NULL)
{
fclose(fp4);
while(1)
{
printf("Access Code-- ");
j=0;temp[j]=0;
while(((ch=getch())!=13) && j<13)
{
if(ch==ESC)
{
locate(col1,row1);
return;
}
temp[j++]=ch;
temp[j]=0;
}
if(temp[0]==0)
{
locate(col1,row1);
return;
}
strupr(temp);
if(strcmp(temp,"BJW")==0) break;
puts("Illegal Access Code");
}
}
printf("\nSending Data to %s",output_device);
if(print_time(output_device))
```

```
{
locate(col1,row1);
return;
} if((fp4=fopen(output_device,"a"))==NULL)
{
putch(7);
printf("Can't Access %s",output_device);
getch();
locate(col1,row1);
return;
} fprintf(fp4,"%s\n",parameter_response[operator_initials_option]);

for(i=0;i<number_plot_options;i++)
 for(j=0;j<max_num_points;j++)
  fprintf(fp4,"%f\n",plot_data[i][j]);

fprintf(fp4,"%s\n",parameter_response[plot_title_option]);

fclose(fp4);
locate(col1,row1);
}                         /* end send data to output device */ void     load_data()
{
char temp[13],pathname[60],ip[60];
struct ffblk ffblk;
int j=0,done,k,numentry,entry,new_page,z,pagnum,row,col,on,an,in;
unsigned char ch,string[80],time_date[80];

gettextinfo(&ti);
window(1,1,ti.screenwidth,ti.screenheight);

textcolor(BLACK);
textbackground(GREEN);
clrscr()

getcursor(&col,&row);

printf("Enter Input Path-- ");
i=getin(input_device);
if(i)
{
locate(col,row);
return;
} strcpy(ip,input_device);

j=inchar('\\',ip);
if(i) ip[j]=0;

if(ip[0]) strcat(ip,"\\*.plt");
else strcpy(ip,"*.plt");
done=findfirst(ip,&ffblk,0);

if(done)
{
printf("No data available in %s ",input_device);
getch();
locate(col,row);
return;
} while(!done)
{
strcpy(filename[j++],ffblk.ff_name);
done=findnext(&ffblk);
filename[j][0]=0;
}

/* ALPHABETIZE THE LISTING */ numentry=j;
j=0;
while(filename[j+1][0]!=0)
{
k=j+1;
while(filename[k][0]!=0)
{
if(strcmp(filename[j],filename[k])>0)
{
strcpy(temp,filename[j]);
strcpy(filename[j],filename[k]);
strcpy(filename[k],temp);
```

```
}
k+=1;
}
j+=1;
}
k=0;
pagnum=0;

while(k<numentry)
{
j=0;
col=0;
row=0;
clrscr();
while(j<92 && k<numentry)
{
    setcursor(col,row);
    printf("%s",filename[k++]);
    j+=1;
    col+=20;
    if(col>60)
    {
        col=0;
        row+=1;
    }
}
new_page=0;
col=0;
row=0;
entry=pagnum*92;
reverse_video(col,row,13);

while(new_page==0)
{
ch=bkey();
z=test_for_jump(ch);
switch(z)
{
case enter:
    clrscr();
    strcpy(pathname,input_device);
    if(input_device[0]) strcat(pathname,":\\");
    strcat(pathname,filename[entry]);
    if((fp4=fopen(pathname,"r"))==NULL)
    {
        printf("Can't Open %s\n",pathname);
        getch();
        locate(col,row);
        return;
    }
    printf("Loading %s from disk\n",filename[entry]);
    strcpy(parameter_response[plotname_option],filename[entry]);
    j=rnchar('.',parameter_response[plotname_option]);
    if(j) parameter_response[plotname_option][j-1]=0;

fgets(time_date,80,fp4);
    fgets(parameter_response[operator_initials_option],80,fp4);
    parameter_response[operator_initials_option]
            [strlen(parameter_response[operator_initials_option])-1]=0;

for(i=0;i<number_plot_options;i++)
      for(j=0;j<max_num_points;j++)
      {
         fgets(string,80,fp4);
         plot_data[i][j]=atof(string);
      } if(feof(fp4)==0)
    {
      fgets(parameter_response[plot_title_option],80,fp4);
      if(parameter_response[plot_title_option][0]<'A' ||
           parameter_response[plot_title_option][0]>'z')
            strcpy(parameter_response[plot_title_option],"Untitled");
      if(parameter_response[plot_title_option]
                     [strlen(parameter_response[plot_title_option])-1]<26)
         parameter_response[plot_title_option]
                     [strlen(parameter_response[plot_title_option])-1]=0;
    }
    else strcpy(parameter_response[plot_title_option],"Untitled");

fclose(fp4);
    locate(col,row);
    if(plot_data[0][max_num_points-1]<4.9 || plot_data[0][max_num_points-1]>5.1)
      plot_data[0][max_num_points-1]=5.0;

return;

case pg_down:
```

```
if(numentry>k)
{
 pagnum+=1;
 new_page+=1;
}
break;

case pg_up:
 if(pagnum)
 {
  pagnum-=1;
  k=pagnum*92;
  entry=pagnum*92;
  new_page+=1;
 }
 break;

case up_arrow:
 if(row)
 {
  reverse_video(col,row,13);
  entry-=4;
  row-=1;
  reverse_video(col,row,13);
 }
 break;

case escape:
 locate(col,row);
 return;

case dn_arrow:
 if(entry+4<numentry && entry+4<(pagnum+1)*92)
 {
  reverse_video(col,row,13);
  entry+=4;
  row+=1;
  reverse_video(col,row,13);
 }
 break;

case l_arrow:
 if(col>19)
 {
  reverse_video(col,row,13);
  col-=20;
  entry-=1;
  reverse_video(col,row,13);
 }
 else if(entry+4<=numentry)
        {
         reverse_video(col,row,13);
         col+=60;
         entry+=3;
         reverse_video(col,row,13);
        }
 else if(entry+3<=numentry)
        {
         reverse_video(col,row,13);
         col+=40;
         entry+=2;
         reverse_video(col,row,13);
        }
 else if(entry+2<=numentry)
        {
         reverse_video(col,row,13);
         col+=20;
         entry+=1;
         reverse_video(col,row,13);
        }
 break;

case r_arrow:
 if(col<60 && numentry>entry+1)
 {
  reverse_video(col,row,13);
  col+=20;
  entry+=1;
  reverse_video(col,row,13);
 }
 else if(col>59)
        {
         reverse_video(col,row,13);
         col=0;
         entry-=3;
         reverse_video(col,row,13);
        }
 else if(col>39)
        {
```

```
                reverse_video(col,row,13);
                col=0;
                entry-=2;
                reverse_video(col,row,13);
                }
        else if(col>19)
                {
                reverse_video(col,row,13);
                col=0;
                entry-=1;
                reverse_video(col,row,13);
                }
        break;

}       /* end switch */
    }           /* test for new page */
  }             /* end test selection */
}               /* end load parameters function */ int     print_time(char *output_device)     /* sends current time to printer */
{
FILE *fptr2;
char year[10],month[10],day[10],hour[10],min[10];
struct date today;
struct time now;

if((fptr2=fopen(output_device,"w"))==NULL)
{
putch(7);
printf("Can't access %s",output_device);
getch();
return(-1);
}
else
    {
        gettime(&now);
        getdate(&today);
        itoa(today.da_mon,month,10);
        itoa(today.da_year,year,10);
        itoa(today.da_day,day,10);
        itoa(now.ti_hour,hour,10);
        if(now.ti_min<10)
        {
            min[0]='0';
            itoa(now.ti_min,&min[1],10);
        }
        else itoa(now.ti_min,min,10);
        fputs(month,fptr2);
        putc('-',fptr2);
        fputs(day,fptr2);
        putc('-',fptr2);
        fputs(year,fptr2);
        putc(' ',fptr2);
        putc(' ',fptr2);
        fputs(hour,fptr2);
        putc(':',fptr2);
        fputs(min,fptr2);
        putc('\n',fptr2);
        fclose(fptr2);
    }
return(0);
} void    results_to_plotter()
{ double   angle;
int      xtick,ytick,miny=25;
char     string[50];
int      maxx=10300;
int      maxy=7800;

fprintf(stdprn,":IN;SP1;PU;PA0,0;");
fprintf(stdprn,"SP1;");

fprintf(stdprn,"PU;PA%d,%d;",maxx/2,maxy);
fprintf(stdprn,"LB%s%c",parameter_response[x_title_option],3);
fprintf(stdprn,"PU;PA%d,%d;",maxx,maxy/2);
fprintf(stdprn,"DI0,1;LB%s%c",parameter_response[y_title_option],3);

fprintf(stdprn,"PU;PA%d,%d;",maxx/2,0);
fprintf(stdprn,"DI1,0;LB%s%c",parameter_response[plot_title_option],3);

for(angle=min_plotting_angle;angle<=max_plotting_angle+.001;
angle+=(max_plotting_angle-min_plotting_angle)/(number_x_ticks-1))
{
xtick=yline+(maxx-yline)*(angle-min_plotting_angle)/(max_plotting_angle-min_plotting_angle);
```

```
fprintf(stdprn,"PU;PA%d,%d;",xtick,maxy-xline);
fprintf(stdprn,"PD;PA%d,%d;",xtick,miny);
ftoa(angle,8,1,string);
fprintf(stdprn,"PU;PA%d,%d;",xtick,maxy-xline+10);
fprintf(stdprn,"LB%s%c",string,3);
} fprintf(stdprn,"PU;PA0,0;");
fprintf(stdprn,"SP0;");
} void       graph_transfer_function_deviation()        /* graph deviation from ideal transfer function */
{ int driver=DETECT,mode,maxx,maxy,miny,x,xtick,y,ytick,pn,m,pd;
int        x1,y1,x2,y2;

double     angle,vo,deviation,ideal_transfer_function,deviation_per_cent;
double     vs=plot_data[0][max_num_points-1];

char       string[81];

double     min_plotting_deviation=-3.,max_plotting_deviation=3.;
int        number_y_deviation_ticks=7;

initgraph(&driver,&mode,"");

maxx=getmaxx()-20;
maxy=getmaxy();
miny=25;

if(vs<4.0 || vs>6.0) vs=5.0;

settextjustify(CENTER_TEXT,BOTTOM_TEXT);
settextstyle(TRIPLEX_FONT,HORIZ_DIR,font_size/2);
moveto(maxx/2,maxy);
outtext(parameter_response[x_title_option]);
moveto(getmaxx()-1,maxy/2);
settextjustify(RIGHT_TEXT,BOTTOM_TEXT);
settextstyle(TRIPLEX_FONT,VERT_DIR,font_size/2);
outtext(parameter_response[y_title_option]);
moveto(maxx/2,0);
settextjustify(CENTER_TEXT,TOP_TEXT);
settextstyle(TRIPLEX_FONT,HORIZ_DIR,font_size/2);
outtext(parameter_response[plot_title_option]);
settextjustify(CENTER_TEXT,TOP_TEXT);
settextstyle(SMALL_FONT,HORIZ_DIR,font_size*1.5);

for(angle=min_plotting_angle;angle<=max_plotting_angle+.001;
    angle+=(max_plotting_angle-min_plotting_angle)/(number_x_ticks-1))
{
xtick=yline+(maxx-yline)*(angle-min_plotting_angle)/(max_plotting_angle-min_plotting_angle);
line(xtick,maxy-xline,xtick,miny);
ftoa(angle,6,1,string);
moveto(xtick,maxy-xline+10);
outtext(string);
} settextjustify(RIGHT_TEXT,CENTER_TEXT);
for(deviation=min_plotting_deviation;deviation<=max_plotting_deviation+.001;
    deviation+=(max_plotting_deviation-min_plotting_deviation)/(number_y_deviation_ticks-1))
{
ytick=(maxy-xline)-(maxy-xline-miny)*(deviation-min_plotting_deviation)/
    (max_plotting_deviation-min_plotting_deviation);
line(yline,ytick,maxx,ytick);
ftoa(deviation,8,2,string);
moveto(yline,ytick);
outtext(string);
} settextjustify(LEFT_TEXT,TOP_TEXT);
settextstyle(SMALL_FONT,HORIZ_DIR,font_size);
moveto(0,maxy-21);
outtext(label_response[plot_label1_option]);
setcolor(color_table[0]);
line(110,maxy-18,130,maxy-18);
setcolor(color_table[1]);
line(110,maxy-13,130,maxy-13);

setcolor(WHITE);
moveto(0,maxy-8);
outtext(label_response[plot_label2_option]);
setcolor(color_table[2]);
line(110,maxy-5,130,maxy-5);
setcolor(color_table[3]);
```

```
line(110,maxy,130,maxy);

setcolor(WHITE);
moveto(maxx-120,maxy-21);
outtext(label_response(plot_label3_option));
setcolor(color_table[4]);
line(maxx-18,maxy-18,maxx-20,maxy-18);
setcolor(color_table[5]);
line(maxx,maxy-13,maxx-20,maxy-13);

setcolor(WHITE);
moveto(maxx-120,maxy-8);
outtext(label_response(plot_label4_option));
setcolor(color_table[6]);
line(maxx,maxy-5,maxx-20,maxy-5);
setcolor(color_table[7]);
line(maxx,maxy,maxx-20,maxy);

#define  pre_idle      0
#define  idle          1
#define  mid_region    2
define  clip_region   3 define  temp25        0
define  temp150       2
define  tempm40       4 int      zone;

for(pn=0;pn<number_plots;pn++)
 for(rn=0;rn<=number_repeats;rn++)
 {
  pd=pn*(number_repeats+1)+rn;

vs=plot_data[pd][max_num_points-1];
  if(vs<4.0 || vs>6.0) vs=5.0;
  setcolor(color_table[pd]);

x=min_plotting_angle;
  while(x<max_plotting_angle*10+.001)
  {
   int first_point_not_graphable=1;
   while(first_point_not_graphable && x<max_plotting_angle*10+.001)
   {
    deviation_per_cent=-100.0;
    if(x/10 <=14.401) zone=pre_idle;
    if(x/10 >=14.399 && x/10 <=20.399) zone=idle;
    if(x/10 >=20.401 && x/10 <=96.6) zone=mid_region;
    if(x/10 >=96.6) zone=clip_region;

switch(zone)
    {
     case   pre_idle:
     case   idle:
     case   mid_region:
         ideal_transfer_function= 046528*x/10+ 155;
         break;

case   clip_region:
         ideal_transfer_function=4.65/vs*5 ;
         break;
    } switch(pd)
    {
     case   temp25:
     case   temp25+1:
         deviation_per_cent=(plot_data[pd][x]-ideal_transfer_function)/vs;
         break;

case   temp150:
     case   temp150+1:
     case   tempm40:
     case   tempm40+1:
         switch(zone)
         {
          case    idle:
            if(rn) deviation_per_cent=(plot_data[pd][x]-plot_data[1][x])/vs;
            else   deviation_per_cent=(plot_data[pd][x]-plot_data[0][x])/vs;
            break;

case    pre_idle:
          case    mid_region:
          case    clip_region:
            deviation_per_cent=(plot_data[pd][x]-ideal_transfer_function)/vs;
            break;
```

```
        }
    break;
    } deviation_per_cent=100;
    if(deviation_per_cent>=min_plotting_deviation && deviation_per_cent<=max_plotting_deviation)
        first_point_not_graphable=0;
    x++;
} x1=yline+((float)x-min_plotting_angle*10.)*(maxx-yline)/
    ((max_plotting_angle-min_plotting_angle)*10);
y1=(maxy-xline)-(maxy-xline-miny)*((deviation_per_cent-min_plotting_deviation)/
    (max_plotting_deviation-min_plotting_deviation));

while(x<max_plotting_angle*10)
{
    int second_point_not_graphable=1;

while(second_point_not_graphable && x<max_plotting_angle*10)
    {
        if(x/10 <=14.401) zone=pre_idle;
        if(x/10 >=14.399 && x/10 <=20.399) zone=idle;
        if(x/10 >=20.401 && x/10 <=96.6) zone=mid_region;
        if(x/10 >=96.6) zone=clip_region;

switch(zone)
        {
            case   pre_idle:
            case   idle:
            case   mid_region:
                ideal_transfer_function= .046528*x/10+.155;
                break;

case   clip_region:
                ideal_transfer_function=4.65;
                break;
        } switch(pd)
        {
            case   temp25:
            case   temp25+1:
                deviation_per_cent=(plot_data[pd][x]-ideal_transfer_function)/vs;
                break;

case   temp150:
            case   temp150+1:
            case   tempm40:
            case   tempm40+1:
                switch(zone)
                {
                    case   idle:
                        if(rn) deviation_per_cent=(plot_data[pd][x]-plot_data[1][x])/vs;
                        else deviation_per_cent=(plot_data[pd][x]-plot_data[0][x])/vs;
                        break;

case   pre_idle:
                    case   mid_region:
                    case   clip_region:
                        deviation_per_cent=(plot_data[pd][x]-ideal_transfer_function)/vs;
                        break;

}
                break;
        }
        deviation_per_cent*=100.0;
        if(deviation_per_cent>min_plotting_deviation && deviation_per_cent<max_plotting_deviation)
            second_point_not_graphable=0;
        x++;
    }  // end while second point not graphable y2=(maxy-xline)-(maxy-xline-miny)*((deviation_per_cent-min_plotting_deviation)/
        (max_plotting_deviation-min_plotting_deviation));
    x2=yline+((float)x-min_plotting_angle*10)*(maxx-yline)/
        ((max_plotting_angle-min_plotting_angle)*10);
    if(x1>0 && x1<640 && x2>0 && x2<640 && y1>0 && y1<480 && y2>0 && y2<480)
        line(x1,y1,x2,y2);
    x1=x2;y1=y2;

}   //end while second x < max plotting angle
}   //end while first  x < max plotting angle
```

```
}                    //end repeat number getch();
closegraph();
} extern double validation_angle1,validation_angle2,validation_angle3,
              validation_angle4,validation_angle5;

char    validation_response[number_validation_options][option_length];

void    validation_report()
{ int z,validation_pos[number_validation_options][2],temperature_number=plot_label1_option char    validation_option[number_validation_options][option_length];
            validation_help[help_length];

unsigned char ch;

input_device[0]=0;
    for(int i=0;i<max_num_entries;i++) dut_list[i]=0;

strcpy(validation_option[part_number_option],      "Part Number------------");
    strcpy(validation_option[spec_number_option],      "Specification Number-");
    strcpy(validation_option[test_number_option],      "Test Number----------");
    strcpy(validation_option[technician_option],       "Technician-----------");
    strcpy(validation_option[report_name_option],      "Test Name------------");
    strcpy(validation_option[temperature_option],      "Temperature----------");
    strcpy(validation_option[load_option],             "Load-----------------");
    strcpy(validation_option[angle1_option], "Angle 1--------------");
    strcpy(validation_option[angle2_option], "Angle 2--------------");
    strcpy(validation_option[angle3_option], "Angle 3--------------");
    strcpy(validation_option[angle4_option], "Angle 4--------------");
    strcpy(validation_option[angle5_option], "Angle 5--------------");

strcpy(validation_help,  "To Select Files to print press ALT_F to display available Files. ");
    strcat(validation_help,  "Press ALT_T to tag which files are to be displayed  ALT_U will untag ");
    strcat(validation_help,  "the selected file  ALT_P will then print the selected data on the screen  ");
    strcat(validation_help,  "To change temperatures, highlight the temperature option and press the left ");
    strcat(validation_help,  "or right cursor buttons  ESC returns control to the main menu.");

int validation_number=0;

newscreen;

clrscr();

textmode(C4350);

gettextinfo(&t);
    textbackground(LIGHTGRAY);
    window(1,1,t.screenwidth,t.screenheight);
    clrscr();

print_title("DESIGN VALIDATION PARAMETERS MENU");
    print_parameter_menu(validation_pos,validation_option,validation_response,
                  number_validation_options);
    print_help_message(validation_help);

while(validation_number<number_validation_options)
    {
    switch(validation_number)
    {
    case part_number_option:
      z=determine_string(validation_number,validation_pos,
                validation_response[validation_number],30);
      break;

case spec_number_option:
      z=determine_string(validation_number,validation_pos,
                validation_response[validation_number],30);
      break;

case test_number_option:
      z=determine_string(validation_number,validation_pos,
                validation_response[validation_number],30);
      break;

case technician_option:
      z=determine_string(validation_number,validation_pos,
                validation_response[validation_number],30);
      break;

case report_name_option:
```

```
z=determine_string(validation_number,validation_pos,
        validation_response[validation_number],30);
break;

case temperature_option:
z=0;
while(z==0)
{
 int k=validation_pos[temperature_option][0];
 int l=validation_pos[temperature_option][1];
 locate(k,l);
 int len=strlen(validation_response[validation_number]);
 reverse_video(k,l,len);
 ch=bkey();
 z=test_for_jump(ch);
 if(z==l_arrow || z==r_arrow)
 {
  int npo=0;
  while(strlen(label_response[npo]) && npo<number_plot_options) npo++;
  locate(k,l);
  reverse_video(k,l,len)
  for(int y=0;y<len;y++) printf("%c",32);
  locate(k,l);
  if(z==l_arrow)
  {
   if(!temperature_number) temperature_number=1;
        else temperature_number=npo-1;
  }
  else if(temperature_number<npo-1) temperature_number+=1;
   else temperature_number=0;
  z=0;
  reverse_video(k,l,strlen(label_response[temperature_number]));
 }
 strcpy(validation_response[validation_number],label_response[temperature_number]);
 locate(k,l);
 printf("%s",validation_response[validation_number]);
 reverse_video(k,l,strlen(validation_response[validation_number]));
}
break;

case load_option:
z=0;
while(z==0)
{
 int k=validation_pos[load_option][0];
 int l=validation_pos[load_option][1];
 int len=strlen(validation_response[validation_number]);
 reverse_video(k,l,len);
 ch=bkey();
 z=test_for_jump(ch);
 if(z==l_arrow || z==r_arrow)
 {
  reverse_video(k,l,len);
  locate(k,l);
  for(int y=0;y<len;y++) printf("%c",32);
  locate(k,l);
  if(strcmp(validation_response[load_option],"Off")==0)
   strcpy(validation_response[load_option],"On");
        else strcpy(validation_response[load_option],"Off");
  z=0;
  reverse_video(k,l,strlen(validation_response[validation_number]));
 }
 locate(k,l);
 printf("%s",validation_response[validation_number]);
 reverse_video(k,l,strlen(validation_response[validation_number]));
}
break;

case angle1_option:
z=determine_floatval(validation_number,validation_pos,
        validation_response[validation_number],10,
        min_angle,max_angle,1);
validation_angle1=atof(validation_response[validation_number]);
break;

case angle2_option:
z=determine_floatval(validation_number,validation_pos,
        validation_response[validation_number],10,
        min_angle,max_angle,1);
validation_angle2=atof(validation_response[validation_number]);
break;

case angle3_option:
z=determine_floatval(validation_number,validation_pos,
        validation_response[validation_number],10,
        min_angle,max_angle,1);
validation_angle3=atof(validation_response[validation_number]);
break;
```

```
case angle4_option:
  z=determine_floatval(validation_number,validation_pos,
          validation_response[validation_number],10,
          min_angle,max_angle,1);
  validation_angle4=atof(validation_response[validation_number]);
  break;

case angle5_option:
  z=determine_floatval(validation_number,validation_pos,
          validation_response[validation_number],10,
          min_angle,max_angle,1);
  validation_angle5=atof(validation_response[validation_number]);
  break;
} switch(z)
{
case up_arrow:
  if(validation_number) validation_number-=1;
  else validation_number=number_validation_options-1;
  break;

case dn_arrow:
  if(validation_number<number_validation_options-1) validation_number+=1;
  else validation_number=0;
  break;

case enter:
  validation_number+=1;
  break;

case escape:
case pg_up:
case pg_down:
  return;

case f1:
  print_validation_screen();
  goto newscreen;

case alt_x:
  terminate_program();

case alt_l:
  load_validation_data();
  goto newscreen;

case alt_p:
  print_validation_report();
  goto newscreen;
}
}
} void      print_validation_screen()
{
char   string[81];
struct date d;
double   clockwise_deviation,clockwise_deviation_per_cent,hysteresis;
char     pathname[60];

window(1,1,h.screenwidth,h.screenheight);
textbackground(LIGHTBLUE);
textcolor(WHITE);
clrscr();
strcpy(string,"AMERICAN ELECTRONIC COMPONENTS");
locate(40-strlen(string)/2,1);
printf("%s",string);
strcpy(string,"Quality Assurance Laboratory");
locate(40-strlen(string)/2,3);
printf("%s",string);
strcpy(string,"Ford Primary Throttle Position Sensor");
locate(40-strlen(string)/2,4);
printf("%s",string);
strcpy(string,"Design Validation Test Report");
locate(40-strlen(string)/2,5);
printf("%s",string);

define dvrrow    15 locate(1,8);
printf("Date");
getdate(&d);
```

```
locate(dvrrow,8);
printf("%d-%d-%d",d.da_mon,d.da_day,d.da_year);
locate(1,9);
printf("Part #");
locate(dvrrow,9);
printf("%s",validation_response[part_number_option]);
locate(1,10);
printf("Spec #");
locate(dvrrow,10);
printf("%s",validation_response[spec_number_option]);
locate(1,11);
printf("Test #");
locate(dvrrow,11);
printf("%s",validation_response[test_number_option]);
locate(1,12);
printf("Technician");
locate(dvrrow,12);
printf("%s",validation_response[technician_option]);
locate(1,13);
printf("Test Name");
locate(dvrrow,13);
printf("%s",validation_response[report_name_option]);
locate(1,14);
printf("Load");
locate(dvrrow,14);
printf("%s",validation_response[load_option]);
locate(1,15);
printf("Temperature");
locate(dvrrow,15);
printf("%s",validation_response[temperature_option]);

define angle_row   17 locate(1,angle_row);
printf("%18.1f deg %13.1f deg %13.1f deg %13.1f deg\n",validation_angle1,
        validation_angle2,validation_angle3,validation_angle4);
printf("     CW   DEV HYST  CW   DEV HYST  CW   DEV HYST  CW   DEV HYST");
printf(" DUT #  mV  045  mV   mV  045  mV   mV  045  mV   mV  045  mV\n\n");

window(1,angle_row+5,ti.screenwidth,ti.screenheight);
cirscr();

for(int entry=0;entry<max_num_entries;entry++)
{
 if(dut_list[entry])
 {
  strcpy(pathname,input_device);
  if(input_device[0]) strcat(pathname,":");
  strcat(pathname,filename[entry]);

if((fp4=fopen(pathname,"r"))==NULL)
  {
   printf("Can't Open %s\n",pathname);
   getch();
   locate(col,row);
   return;
  } strcpy(parameter_response[plotname_option],filename[entry]);
  int j=inchar(' ',parameter_response[plotname_option]);
  if(j) parameter_response[plotname_option][j-1]=0;
  fgets(string,80,fp4);
  fgets(string,80,fp4);

for(int i=0;i<number_plot_options;i++)
   for(j=0;j<max_num_points;j++)
   {
    fgets(string,80,fp4);
    plot_data[i][j]=atof(string);
   } fclose(fp4);
  if(plot_data[0][max_num_points-1]<4.9 || plot_data[0][max_num_points-1]>5.1)
   plot_data[0][max_num_points-1]=5.0;

cprintf("%8s",parameter_response[plotname_option]);
  find_mv_reading(validation_angle1,validation_response[temperature_option],
                  &clockwise_deviation,&clockwise_deviation_per_cent,
                  &hysteresis);
  cprintf("%6.1f %5.2f %5.1f",clockwise_deviation,clockwise_deviation_per_cent,
                              hysteresis);
  find_mv_reading(validation_angle2,validation_response[temperature_option],
                  &clockwise_deviation,&clockwise_deviation_per_cent,
                  &hysteresis);
  cprintf("%6.1f %5.2f %5.1f",clockwise_deviation,clockwise_deviation_per_cent,
                              hysteresis);
  find_mv_reading(validation_angle3,validation_response[temperature_option],
                  &clockwise_deviation,&clockwise_deviation_per_cent,
                  &hysteresis);
```

```
cprintf("%6.1f %5.2f %5.1f",clockwise_deviation,clockwise_deviation_per_cent,
                                                hysteresis);
find_mv_reading(validation_angle4,validation_response[temperature_option],
                            &clockwise_deviation,&clockwise_deviation_per_cent,
                            &hysteresis);
cprintf("%6.1f %5.2f %5.1f",clockwise_deviation,clockwise_deviation_per_cent,
                                                hysteresis);

cprintf("\n");

}
}
printf(" Listing Complete");
getch();
} void    find_mv_reading(double angle,char *temperature,double *clockwise_deviation,
                                    double *clockwise_deviation_per_cent, double *hysteresis)
{
int:    x,index,pd;
double ideal_transfer_function;

for(int i=plot_label1_option;i<number_plot_options;i++)
    if(strcmp(temperature,label_response[i])==0) pd=i*(number_repeats+1);
double vs=plot_data[pd][max_num_points-1];
if(vs<2.5) vs=5.0;
x=angle*10.0001;
index=0;
while(index==0)
{
    if(plot_data[pd][x]>-5.0 && plot_data[pd+1][x]> 5.0 && plot_data[0][x]>-5.0 && plot_data[1][x]> 5.0)
        index=x;
    else
    {
        if(x==174)
        {
            x++;
            while(index==0)
            if(plot_data[pd][x]>-5.0 && plot_data[pd+1][x]>-5.0 && plot_data[0][x]> 5.0 && plot_data[1][x]> 5.0)
                index=x;
            else
            {
                x++;
            }
        }
        else
        {
            if(x<174) x++;
            else x--;
        }
    }
}
if(x/10 <96.6) ideal_transfer_function=.046528*x/10 + .155;
else ideal_transfer_function=4.65;
if(ideal_transfer_function)
{
if(pd>0 && pd<6 && x/10.>14.399 && x/10.<20.401)
    {
    *clockwise_deviation=1000.*(plot_data[pd][x]-plot_data[0][x]);
    *clockwise_deviation_per_cent=100.*(plot_data[pd][x]-plot_data[0][x])/vs;
    }
else
    {
    *clockwise_deviation=1000.*(plot_data[pd][x]-ideal_transfer_function);
    *clockwise_deviation_per_cent=100.*(plot_data[pd][x]-ideal_transfer_function)/vs;
    }
*hysteresis=fabs(plot_data[pd][x]-plot_data[pd+1][x])*1000.;
}
} void    load_validation_data()
{
char    temp[13],pathname[60],rp[60];
struct ffblk ffblk;
int     j=0,done,k,numentry,entry,new_page,z,pagnum,row,col,pn,sn,ln;
unsigned char ch,string[80],time_date[80];
char    load_validation_help[help_length];

strcpy(load_validation_help,  "Pressing ALT-T will tag the highlighted file.  ");
strcat(load_validation_help,  "Tagged Files are indicated with a '*'. To untag a ");
strcat(load_validation_help,  "file press ALT-U. Subsequent Pages of data can be ");
strcat(load_validation_help,  "accessed using the page up and page down keys.  ");
strcat(load_validation_help,  "Pressing <ESC> or <ENTER> ends the file tagging session.");
```

```
gettextinfo(&ti);
window(1,1,ti.screenwidth,ti.screenheight);

textcolor(BLACK);
textbackground(GREEN);
clrscr();

getcursor(&col,&row);

printf("Enter Input Path-- ");
i=getlin(input_device);
if(!i)
{
  locate(col,row);
  return;
} strcpy(ip,input_device)

j=inchar('.',ip);
if(j) ip[j]=0;

if(ip[0]) strcat(ip,":\*.plf");
  else strcpy(ip,"*.plf");
done=findfirst(ip,&ffblk,0);

if(done)
{
  printf("No data available in %s ",input_device);
  getch();
  locate(col,row)
  return;
} while(!done)
{
  strcpy(filename[j++],ffblk.ff_name);
  done=findnext(&ffblk);
  filename[j][0]=0
}

/* ALPHABETIZE THE LISTING */ numentry=j;
j=0;
while(filename[j+1][0]!=0)
{
  k=j+1;
  while(filename[k][0]!=0)
  {
    if(strcmp(filename[j],filename[k])>0)
    {
      strcpy(temp,filename[j]);
      strcpy(filename[j],filename[k]);
      strcpy(filename[k],temp);
    }
    k+=1;
  }
  j+=1;
}
k=0;
pagnum=0;

while(k<numentry)
{
  gettextinfo(&ti);
  window(1,1,ti.screenwidth,ti.screenheight);

textcolor(BLACK);
  textbackground(GREEN);
  clrscr();

j=0;
  col=0;
  row=0;

print_help_message(load_validation_help);

while(j<92 && k<numentry)
  {
    setcursor(col,row);
    printf("%s",filename[k++]);
    if(dul_list[k-1])
    {
      locate(col+12,row);
```

```
printf("");
}
j+=1;
col+=20;
if(col>60)
{
 col=0;
 row+=1;
}
}
new_page=0;
col=0;
row=0;
entry=pagnum*92;
reverse_video(col,row,13);

while(new_page==0)
{
ch=bkey();
z=test_for_jump(ch);
switch(z)
{
    case pg_down:
     if(numentry>k)
     {
      pagnum+=1;
      new_page+=1;
     }
     break;

case pg_up:
     if(pagnum)
     {
      pagnum-=1;
      k=pagnum*92;
      entry=pagnum*92;
      new_page+=1
     }
     break;

case up_arrow:
     if(row)
     {
      reverse_video(col,row,13);
      entry-=4;
      row-=1;
      reverse_video(col,row,13);
     }
     break;

case escape:
    case enter:
     locate(col,row);
     return;

case dn_arrow:
     if(entry+4<numentry && entry+4<(pagnum+1)*92)
     {
      reverse_video(col,row,13);
      entry+=4;
      row+=1;
      reverse_video(col,row,13);
     }
     break;

case l_arrow:
     if(col>19)
     {
      reverse_video(col,row,13);
      col-=20;
      entry-=1;
      reverse_video(col,row,13);
     }
     else if(entry+4<=numentry)
            {
             reverse_video(col,row,13);
             col+=60;
             entry+=3;
             reverse_video(col,row,13);
            }
     else if(entry+3<=numentry)
            {
             reverse_video(col,row,13);
             col+=40;
             entry+=2;
             reverse_video(col,row,13);
            }
     else if(entry+2<=numentry)
            {
```

```
                reverse_video(col,row,13);
                col+=20;
                entry+=1;
                reverse_video(col,row,13);
                }
        break;

case r_arrow:
        if(col<60 && numentry>entry+1)
        {
         reverse_video(col,row,13);
         col+=20;
         entry+=1;
         reverse_video(col,row,13);
        }
        else if(col>59)
                {
                reverse_video(col,row,13);
                col=0;
                entry-=3;
                reverse_video(col,row,13);
                } else if(col>39)
                {
                reverse_video(col,row,13);
                col=0;
                entry-=2;
                reverse_video(col,row,13);
                } else if(col>19)
                {
                reverse_video(col,row,13);
                col=0;
                entry-=1;
                reverse_video(col,row,13);
                }
        break;

case alt_t:
        locate(col+12,row);
        printf(" ");
        du_t_ist[entry]=1;
        break;

case alt_u:
        locate(col+12,row);
        printf(" ");
        du_t_ist[entry]=0;
        break;

}        /* end switch */
        }        /* test for new page */
        }        /* end test selection */
        }        /* end load parameters function */ void    print_validation_report()          /* ALT-P
{
char    string[81];
struct date d;
double  clockwise_deviation,clockwise_deviation_per_cent,hysteresis;
char    pathname[60];
int     j;

window(1,1,screenwidth,screenheight);
textbackground(LIGHTBLUE);
textcolor(WHITE);
clrscr();

printf("          Sending Data to Printer\n");

fprintf(stdprn,"%c%c%c",15,27,'0');
strcpy(string,"AMERICAN ELECTRONIC COMPONENTS");
for(j=0;j<68-strlen(string)/2;j++) fprintf(stdprn," ");
fprintf(stdprn,"%s\n",string);
strcpy(string,"Quality Assurance Laboratory");
for(j=0;j<68-strlen(string)/2;j++) fprintf(stdprn," ");
fprintf(stdprn,"%s\n",string);
strcpy(string,"Ford Primary Throttle Position Sensor");
for(j=0;j<68-strlen(string)/2;j++) fprintf(stdprn," ");
fprintf(stdprn,"%s\n",string);
strcpy(string,"Design Validation Test Report");
for(j=0;j<68-strlen(string)/2;j++) fprintf(stdprn," ");
fprintf(stdprn,"%s\n",string);

fprintf(stdprn,"\n");
```

– 89 –

```c
fprintf(stdprn,"Date     ");
getdate(&d);
fprintf(stdprn,"%d-%d-%d\n",d.da_mon,d.da_day,d.da_year);
fprintf(stdprn,"Part #   ");
fprintf(stdprn,"%s\n",validation_response[part_number_option]);
fprintf(stdprn,"Spec #   ");
fprintf(stdprn,"%s\n",validation_response[spec_number_option]);
fprintf(stdprn,"Test #   ");
fprintf(stdprn,"%s\n",validation_response[test_number_option]);
fprintf(stdprn,"Technician ");
fprintf(stdprn,"%s\n",validation_response[technician_option]);
fprintf(stdprn,"Test Name ");
fprintf(stdprn,"%s\n",validation_response[report_name_option]);
fprintf(stdprn,"Load     ");
fprintf(stdprn,"%s\n",validation_response[load_option]);
fprintf(stdprn,"Temperature ");
fprintf(stdprn,"%s\n",validation_response[temperature_option]);

fprintf(stdprn,"\n");

fprintf(stdprn,"%23.1f deg %19.1f deg %19.1f deg %19.1f deg %19.1f deg\n",validation_angle1,
             validation_angle2,validation_angle3,validation_angle4,validation_angle5);
fprintf(stdprn,"         CW   DEV  HYST    CW   DEV  HYST    CW   DEV  HYST    CW   DEV  HYST    CW   DEV  HYST\n");
fprintf(stdprn," DUT #   mV   \\045  mV     mV   \\045  mV     mV   \\045  mV     mV   \\045  mV     mV   \\045  mV\n\n");

for(int entry=0;entry<max_num_entries;entry++)
{
    if(dut_list[entry])
    {
        strcpy(pathname,input_device);
        if(input_device[0]) strcat(pathname,"\\");
        strcat(pathname,filename[entry]);

if((fp4=fopen(pathname,"r"))==NULL)
        {
            printf("Can't Open %s\n",pathname);
            getch();
            locate(col,row);
            return;
        } printf("Opening File %s\n",pathname);

strcpy(parameter_response[plotname_option],filename[entry]);
        int j=inchar(' ',parameter_response[plotname_option]);
        if(j) parameter_response[plotname_option][j-1]=0;
        fgets(string,80,fp4);
        fgets(string,80,fp4);

for(int i=0;i<number_plot_options;i++)
            for(j=0;j<max_num_points;j++)
            {
                fgets(string,80,fp4);
                plot_data[i][j]=atof(string);
            } fclose(fp4);
        if(plot_data[0][max_num_points-1]<4.9 || plot_data[0][max_num_points-1]>5.1)
            plot_data[0][max_num_points-1]=5.0;

fprintf(stdprn,"%8s",parameter_response[plotname_option]);
        find_mv_reading(validation_angle1,validation_response[temperature_option],
                        &clockwise_deviation,&clockwise_deviation_per_cent,
                        &hysteresis);
        fprintf(stdprn,"%10.1f %6.2f %6.1f",clockwise_deviation,clockwise_deviation_per_cent,
                                             hysteresis);
        find_mv_reading(validation_angle2,validation_response[temperature_option],
                        &clockwise_deviation,&clockwise_deviation_per_cent,
                        &hysteresis);
        fprintf(stdprn,"%10.1f %6.2f %6.1f",clockwise_deviation,clockwise_deviation_per_cent,
                                             hysteresis);
        find_mv_reading(validation_angle3,validation_response[temperature_option],
                        &clockwise_deviation,&clockwise_deviation_per_cent,
                        &hysteresis);
        fprintf(stdprn,"%10.1f %6.2f %6.1f",clockwise_deviation,clockwise_deviation_per_cent,
                                             hysteresis);
        find_mv_reading(validation_angle4,validation_response[temperature_option],
                        &clockwise_deviation,&clockwise_deviation_per_cent,
                        &hysteresis);
        fprintf(stdprn,"%10.1f %6.2f %6.1f",clockwise_deviation,clockwise_deviation_per_cent,
                                             hysteresis);
        find_mv_reading(validation_angle5,validation_response[temperature_option],
                        &clockwise_deviation,&clockwise_deviation_per_cent,
                        &hysteresis);
        fprintf(stdprn,"%10.1f %6.2f %6.1f",clockwise_deviation,clockwise_deviation_per_cent,
                                             hysteresis);

fprintf(stdprn,"\n\n");
```

- 80 -

```
    }
 )
 fprintf(stdprn,"%c",12);
 printf("\n          Listing Complete");
 getch();
}
```

```cpp
#include "tpglobl.cpp"
#include "linear.h"
include <dos.h> void        angletest();
void        test_motor_speed();
void        position_motor();
void        test_voltages();
void        dvmtest();
void        ieeeio();
void        dactest();
double      print_angle();
int         graytobin(int graycode);
void        setrfvoltage(int voltage);
void        rlab_on();
void        setdac(int cn,int dacval);
void        adctest();
void        angle_voltage_check();

extern struct text_info ti;

#define measure_angle_option            0
#define measure_motor_velocity_option   1
#define position_fixture_option         2
#define enable_supply_voltages_option   3
#define read_dvm_option                 4
#define communicate_over_IEEE_option    5
#define set_dac_voltages_option         6
#define read_adc_voltages_option        7
#define angle_voltage_check_option      8
#define return_main_menu_option         9
define number_calmode_options          10 void    calmenu()
{
char key,option[number_calmode_options][option_length];

int j,option_number=0;

strcpy(option[measure_angle_option],            "Measure Angle Displacement");
strcpy(option[measure_motor_velocity_option],   "Measure Motor Velocity");
strcpy(option[position_fixture_option],         "Position Fixturing");
strcpy(option[enable_supply_voltages_option],   "Enable DUT Power Supply");
strcpy(option[read_dvm_option],                 "Read DVM");
strcpy(option[communicate_over_IEEE_option],    "Communicate over IEEE Port");
strcpy(option[read_adc_voltages_option],        "Read 16 Bit A/D Voltages.");
strcpy(option[set_dac_voltages_option], "Set DAC Voltages");
strcpy(option[angle_voltage_check_option],      "Compare Angles and Voltages");
strcpy(option[return_main_menu_option],         "Return to Main Menu");

define first_row       4 menu:

col=2;
gettextinfo(&ti);
window(1,1,ti.screenwidth,ti.screenheight);
textcolor(RED);
textbackground(LIGHTGRAY);
clrscr();
puts("  THROTTLE POSITION SENSOR CALIBRATION");
puts("\n Select Desired Option:\n");
for(j=0;j<number_calmode_options;j++)
 printf("  %s\n",option[j]);
row=option_number+first_row;
reverse_video(col,row,strlen(option[option_number]));

while((key=getch())!=17)
{
if(key==0)
{
switch(getch())
{
case DN_ARROW:
    down(&option_number,number_calmode_options,option[option_number],col,row);
    row=option_number+first_row;
    reverse_video(col,row,strlen(option[option_number]));
    break;

case UP_ARROW:
    up(&option_number,number_calmode_options,option[option_number],col,row);
    row=option_number+first_row;
    reverse_video(col,row,strlen(option[option_number]));
    break;

case ALT_X:
    terminate_program();
```

```
                        /* end extended key switch */
    }                   /* end extended key check */
    else if(key==ESC)
    {
        MOTOR_IMAGE=0;
        outport(MOTOR_PORT,MOTOR_IMAGE);
        goto endcal;
    }
    else if(key==ENTER)
    {
        switch(option_number)
        {
            case measure_angle_option:
                angletest();
                goto menu;

case measure_motor_velocity_option:
                test_motor_speed();
                goto menu;

case position_fixture_option:
                position_motor();
                goto menu;

case enable_supply_voltages_option:
                test_voltages();
                goto menu;

case read_dvm_option:
                dvmtest();
                goto menu;

case communicate_over_IEEE_option:
                ieeetst();
                goto menu;

case set_dac_voltages_option:
                dactest();
                goto menu;

case read_adc_voltages_option:
                adctest();
                goto menu;

case angle_voltage_check_option:
                angle_voltage_check();
                goto menu;

case return_main_menu_option:
                MOTOR_IMAGE=0;
                outport(MOTOR_PORT,MOTOR_IMAGE);
                goto endcal;
        }                       /* end ENTER switch */
    }                           /* end ENTER check */
} endcal:
place_fixture(9.0);
}                               /* end calmenu */ define set_manual_zero_option     0
define set_auto_zero_option       1
#define leave_angletest_option     2
#define preset_angle_option        3
define number_angletest_options   4 void    angletest()
{
    char key,option[number_angletest_options][option_length];
    int j,option_number=0,row1;
    char cmnd[40];

float p1,p2,angle;

strcpy(option[set_manual_zero_option],"Set Encoder Readings to Zero");
    strcpy(option[set_auto_zero_option],"Perform Auto Zero");
    strcpy(option[preset_angle_option],"Preset Angle");
    strcpy(option[leave_angletest_option],"Return To Calibration Menu");
    cursor_off();

atmenu:

col=2;
```

```
clrscr();
puts(" THROTTLE POSITION SENSOR ANGLETEST MENU\n");
puts(" Select Desired Option \n");
for(j=0;j<number_angletest_options;j++)
 printf(" %s\n",option[j]);
row1=option_number+first_row;
reverse_video(col,row,strlen(option[option_number]));

locate(ax,10,ay);
printf("ANGLE:");

while(1)
{
 print_angle();

if(kbhit())
 {
  key=getch();
  if(key==0)
  {
   switch(getch())
   {
    case DN_ARROW:

locate(2,row1);
     down(&option_number,number_angletest_options,option[option_number].col,row);
     row1=option_number+first_row;
     locate(col,row1);
     row=row1;
     reverse_video(col,row,strlen(option[option_number]));
     break;

case UP_ARROW:
     locate(2,row1);
     up(&option_number,number_angletest_options,option[option_number].col,row);
     row1=option_number+first_row;
     row=row1;
     locate(col,row1);
     reverse_video(col,row,strlen(option[option_number]));
     break;

case ALT_X:
     terminate_program();
   }                    /* end extended key switch */
  }                     /* end extended key check */
  else if(key==ESC)
  {
   cursor_on();
   return;
  }
  else if(key==ENTER)
  {
   switch(option_number)
   {
    case set_manual_zero_option:
     if((fp1=fopen("zerofile.pn1","w"))==NULL)
     {
      printf("Can't Open Zerofile\n");
      getch();
     }
     else
     {
      zeropoint=graytoang(inport(encadr));
      fprintf(fp1,"%fn",zeropoint);
      fclose(fp1);
     }
     break;

case preset_angle_option:
     locate(10,20);
     printf("Enter Preset Angle- ");
     =getln(cmnd);
     if(!f[ cmnd[0]==0) return;
     angle=atof(cmnd);
     zeropoint=graytoang(inport(encadr))-angle;
     locate(10,20);
     printf("                    ");
     if((fp1=fopen("zerofile.pn1","w"))==NULL)
     {
      printf("Can't Open Zerofile\n");
      getch();
     }
     else
     {
      fprintf(fp1,"%fn",zeropoint);
```

```c
                    fclose(fp1);
                }
                break;

case set_auto_zero_option:
                enable_motor();
                set_motor_speed(-2.0);
                do
                {
                    p1=print_angle();
                    delay(0);
                    delay(100);
                    p2=print_angle();
                }
                while(p1>p2);

delay(0);
                delay(100);

if((fp1=fopen("zerofile.pnt","w"))==NULL)
                {
                    printf("Can't Open Zerofile\n");
                    getch();
                }
                else
                {
                    zeropoint=graytoang(inport(encadr));
                    fprintf(fp1,"%f\n",zeropoint);
                    fclose(fp1);
                }
                disable_motor();
                break;

case leave_angletest_option:
                cursor_on();
                return;

}           /* end enter key switch */
    }               /* end enter key check */

}                 /* end if kbhit */
 }                  /* end infinite while */
}                   /* end calmenu */ define numbits 13 double      graytoang(int graycode)
{
    double angle;

angle=graytobin(graycode);
    return(angle*180/(1<<numbits-1));
} int         graytobin(int graycode)
{
    unsigned int andbit,prsbit,binary;

andbit=1<<numbits-1;
    prsbit=graycode & andbit;
    binary=prsbit;
    while(andbit>>=1)
    {
        prsbit>>=1;
        prsbit|=((graycode & andbit) ^ prsbit);
        if(prsbit) binary=binary | andbit;
    }
    return(binary);
} double      print_angle()
{
    double angle;

locate(ax,ay);
    angle=getangle();
    printf("%8.2f ",angle);
    return(angle);
} double getangle()
{
    double angle;
    int j2,j1;

do
    {
        j1=inport(encadr);
        j2=inport(encadr);
    }
```

```
while(!21=j1);

angle=graytoang(j1)-zeropoint;
if(angle>=180) angle-=360;
else if(angle<-180) angle+=360;
return(angle);
} void    test_voltages()
{
int r,v1;
char cmnd[40];
clrscr();
while(1)
 {
 printf("Voltage (0,5,8,24): ");
 r=getlin(cmnd);
 if(r || cmnd[0]==0) return;
 puts("");
 v1=atoi(cmnd);
 if(v1==0) setrfvoltage(v1);
  else if(v1==5) setrfvoltage(volt05);
  else if(v1==8) setrfvoltage(volt08);
  else if(v1==12) setrfvoltage(volt12);
  else if(v1==24) setrfvoltage(volt24);
  else printf("invalid voltage request\n");
 }
} void    setrfvoltage(int voltage)
{
rfotrm=rfotrm & (0xFFFF-volt12-volt05-volt08-volt24) | voltage;
outport(rfout,rfotrm);
rfab_on();
} void    set_voltage(char *v)
{
float vo;

vo=atof(v);
if(vo>4 && vo<7) setrfvoltage(volt05);
 else if(vo>7 && vo<9) setrfvoltage(volt08);
 else if(vo>11 && vo<13) setrfvoltage(volt12);
 else if(vo>23 && vo<25) setrfvoltage(volt24);
 else setrfvoltage(0);
} void    rfab_on()
{
svmtptrm=svmtptrm | rfab_select;
outport(svmtport,svmtptrm);
rfotrm=rfotrm | hal_state_enable;
outport(rfout,rfotrm);
} void    dactest()
{
double voltage;
int cn,r,dacval;
char ch,cmnd[40];

clrscr();
while(1)
 {
 do
  {
  printf("Channel number (0,2): ");
  r=getlin(cmnd);
  if(r || cmnd[0]==0) return;
  puts("");
  cn=atoi(cmnd);
  if(cn<0 || cn>2) puts("Invalid Channel Number\n");
  }
 while(cn<0 || cn>2);
 do
  {
  printf("Voltage (-10 to +10): ");
  r=getlin(cmnd);
  if(r) return;
  puts("");
  if(cmnd[0]!=0)
   {
   voltage=atof(cmnd);
   if(voltage>-9.99985 && voltage<9.99985)
    {
            dacval=(voltage+10)*3276.8;
```

```
            setdac(ch,dacval);
        }
        else puts("Voltage out of Range\n");
    }
}
while(cmnd[0]!=0);
} void     setdac(int ch,int dacval)
{
unsigned char hi,lo;
int h1;
h1=dacval&0xFF00;
h=h1/256;
lo=dacval-256*hi;
outportb(dabase+ch*2,hi);
outportb(dabase+ch*2+1,lo);
} void    test_motor_speed()
{
double speed,maxpos,maxneg,angle,initial_time,dist;
int x1,y1,x2,y2,x3,y3,x4,y4,i,p1,p2;
char cmnd[40];

clrscr();
locate(10,18);
printf("Desired Motor Speed (Deg/Sec)-- ");
x1=wherex()-1;y1=wherey()-1;
locate(10,20);
printf("Maximum Positive Angle-- ");
x2=wherex()-1;y2=wherey()-1;
locate(10,22);
printf("Minimum Negative Angle-- ");
x3=wherex()-1;y3=wherey()-1;
locate(10,14);
printf("Measured Motor Speed (Deg/Sec)-- ");
x4=wherex()-1;y4=wherey()-1;
while(1)
{
  do
  {
    locate(x1,y1);
    printf("            ");
    locate(x1,y1);
    i=getlin(cmnd);
    if(i || cmnd[0]==0) return;
     else speed=atof(cmnd);
    if(speed<0) speed*=-1;
    if(speed>max_speed) putch(7);
  }
  while(speed>max_speed);

do
  {
    locate(x2,y2);
    printf("            ");
    locate(x2,y2);
    i=getlin(cmnd);
    if(i || cmnd[0]==0) return;
     else maxpos=atof(cmnd);
    if((maxpos>=180) || (maxpos<-180)) putch(7);
  }
  while((maxpos>=180) || (maxpos<-180));

do
  {
    locate(x3,y3);
    printf("            ");
    locate(x3,y3);
    i=getlin(cmnd);
    if(i || cmnd[0]==0) return;
     else maxneg=atof(cmnd);
    if((maxneg>=180) || (maxneg<-180)) putch(7);
  }
  while((maxneg>=180) || (maxneg<-180));

enable_motor();

while(kbhit()==0)
  {
    set_motor_speed(speed);
    initial_time=getseconds();
    p1=inport(encadr);

do
    {
      if(kbhit()) break;
```

```
if(getseconds()-initial_time>=1.0)
{
    p2=inport(encadr);
    dist=graytoang(p2)-graytoang(p1);
    if(dist>=180.0) dist-=360;
        else if(dist<-180) dist+=360;
    locate(x4,y4);
    printf("%4.1f ",dist);
    initial_time=getseconds();
    p1=inport(encadr);
} locate(20,10);
angle=graytoang(inport(encadr))-zeropoint;
if(angle>=180) angle-=360;
    else if(angle<-180) angle+=360;
printf("%8.2f",angle);
}
while(angle<maxpos);

set_motor_speed(-1*speed);

do
{
    if(kbhit()) break;

if(getseconds()-initial_time>=2.0)
    {
        p2=inport(encadr);
        dist=graytoang(p2)-graytoang(p1);
        if(dist>=180.0) dist-=360;
            else if(dist<-180) dist+=360;
        locate(x4,y4);
        printf("%4.1f ",dist/2);
        initial_time=getseconds();
        p1=inport(encadr);
    } locate(20,10);
    angle=graytoang(inport(encadr))-zeropoint;
    if(angle>=180) angle-=360;
        else if(angle<-180) angle+=360;
    printf("%8.2f",angle);
}
while(angle>maxneg);

} /* end motion loop */
disable_motor();
}
} void    enable_motor()
{
extern int MOTOR_IMAGE;

MOTOR_IMAGE |= motor_enable;
outport(MOTOR_PORT,MOTOR_IMAGE);
set_motor_speed(0.0);
} void    disable_motor()
{
extern int MOTOR_IMAGE;

MOTOR_IMAGE &=(0xFFFF-motor_enable);
outport(MOTOR_PORT,MOTOR_IMAGE);
set_motor_speed(0.0);
} void    set_motor_speed(double speed)
{
int dacval;

speed*=-1;              /* orientation for reverse fixturing in tps */ dacval=((speed+max_speed)/2)*65536/max_speed;
setdac(motorchan,dacval);
} void    position_motor()
{
double angle,desired_angle;
int x,y;
char cmnd[40];

clrscr();
locate(10,18);
printf("Desired Location: ");
x=wherex()-1;y=wherey()-1;
```

```
while(1)
{
do
{
  locate(x,y);
  printf("           ");
  locate(x,y);
  r=getkh(cmnd);
  if(r || cmnd[0]==0) return;
  else desired_angle=atof(cmnd);
  if((desired_angle>=180) || (desired_angle<-180)) putch(7);
}
while((desired_angle>=180) || (desired_angle<-180));

place_fixture(desired_angle);
}
}
void     place_fixture(double desired_angle)
{
double angle;

angle=print_angle();

if(angle+.2<desired_angle)
{
enable_motor();
set_motor_speed(position_velocity/2);
while(angle<desired_angle)
{
angle=print_angle();
if(kbhit()) break;
}
set_motor_speed(position_velocity/-40);

while(angle>desired_angle)
{
angle=print_angle();
if(kbhit()) break;
}
}
else if(angle-.1>desired_angle)
     {
        enable_motor();
        set_motor_speed(-1*position_velocity/2);
        while(angle>desired_angle)
        {
        angle=print_angle();
        if(kbhit()) break;
        }
        set_motor_speed(position_velocity/40);

while(angle<desired_angle)
        {
        angle=print_angle();
        if(kbhit()) break;
        }
     }
set_motor_speed(0,0);
disable_motor();
print_angle();
}
void     place_fixture_no_print(double desired_angle)
{
double angle;

angle=getangle();

if(angle+.2<desired_angle)
{
enable_motor();
set_motor_speed(position_velocity);
while(angle<desired_angle)
{
angle=getangle();
if(kbhit()) break;
}
set_motor_speed(position_velocity/-10);

while(angle>desired_angle)
{
angle=getangle();
if(kbhit()) break;
}
}
```

```
else if(angle-1>desired_angle)
    {
        enable_motor();
        set_motor_speed(-1*position_velocity);
        while(angle>desired_angle)
        {
            angle=getangle();
            if(kbhit()) break;
        }
        set_motor_speed(position_velocity/10);

while(angle<desired_angle)
        {
            angle=getangle();
            if(kbhit()) break;
        }
    }
set_motor_speed(0.0);
disable_motor();
} void     dvmtest()
{
int j;
char string[50];
clrscr();
gotoxy(32,1);
puts("D V M   T E S T");
puts("\n     This test reads AC and DC voltages present on DVM terminals.");
puts("\n                Press ESC to abort test.");
gotoxy(45,10);
puts("DC VOLTS FRONT");
gotoxy(45,12);
puts("AC VOLTS FRONT");
gotoxy(45,15);
puts("DC VOLTS REAR ");
gotoxy(45,17);
puts("AC VOLTS REAR ");

while(1)
{
    j=output(DVM,"TERM 1");
    if(j) break;
    j=output(DVM,"DCV 5, 1");
    if(j) break;
    j=input(DVM,string);
    gotoxy(25,10);
    if(j) break;
     else printf("%s",string);
    j=output(DVM,"ACV 2, 1");
    if(j) break;
    j=input(DVM,string);
    gotoxy(25,12);
    if(j) break;
     else printf("%s",string);
    j=output(DVM,"TERM 2");
    if(j) break;
    j=output(DVM,"DCV 5, 1");
    if(j) break;
    j=input(DVM,string);
    gotoxy(25,15);
    if(j) break;
     else printf("%s",string);
    j=output(DVM,"ACV 2, 1");
    if(j) break;
    j=input(DVM,string);
    gotoxy(25,17);
    if(j) break;
     else printf("%s",string);

}
putch(7);
getch();
} void     adctest()
{
int j;
char string[50];
double adc_voltage,differential;
clrscr();
gotoxy(32,1);
puts("D V M   T E S T");
puts("\n     This test reads AC and DC voltages present on DVM terminals.");
puts("\n                Press ESC to abort test.");
gotoxy(45,10);
puts("DVM VOLTS");
```

```c
gotoxy(45,15);
puts("ADC VOLTS");
j=output(DVM,"DCV 5, 1");
while(j==0)
{
    j=input(DVM,string);
    gotoxy(25,10);
    if(...) break;
    else printf("%s",string);
    gotoxy(25,15);
    adc_voltage=read_ad();
    printf("%8.3f",adc_voltage);
    gotoxy(25,20);
    differential=atof(string)-adc_voltage;
    printf("%8.3f",differential);
}
putch(7);
getch();
} double    read_ad()
{
    double r,vo;
    int times=60,wait;

r=0;

outportb(ad_control_port,ad_mux_enable);
    for(wait=0;wait<10;wait++)

for(int t=0;t<times;t++)
    {
        outportb(ad_conversion_port,ad_start_convert);
        outportb(ad_conversion_port,0);
        outportb(ad_conversion_port,ad_start_convert);
        for(wait=0;wait<20;wait++)

r+=inport(ad_reading_port);
    } vo=r/times*(10./65536);

r=vo*1.0+.001;

return(r);
} void    angle_voltage_check()
{
    double    first_angle=17.6;
    double    mid_angle  =50.0;
    double    end_angle  =85.0;
    double vo1,vo2,vo3,ideal1,ideal2,ideal3,calculated;

clrscr();

locate(10,5);
    printf("Temperature  Angle  Measured  Ideal  Calculated");

place_fixture(first_angle);
    vo1=read_ad();
    if(first_angle<96.6) ideal1=.046528*first_angle+.155;
    else ideal1=4.65;

locate(20,7);

printf("%8.2f %8.2f",first_angle,vo1,ideal1);

place_fixture(mid_angle);
    vo2=read_ad();
    if(mid_angle<96.6) ideal2=.046528*mid_angle+.155;
    else ideal2=4.65;

locate(20,9);
    printf("%8.2f %8.2f",mid_angle,vo2,ideal2);

place_fixture(end_angle);
    vo3=read_ad();
    if(end_angle<96.6) ideal3=.046528*end_angle+.155;
    else ideal3=4.65;

locate(20,11);
    printf("%8.2f %8.2f",end_angle,vo3,ideal3);

getch();
}
```

```c
#include <string.h>
#include <dos.h>
#include <stdio.h>
#include <conio.h>
#include <stdlib.h>
#include <math.h>
#include "lindefs.cpp"
#include "linear.h"
#include "keys.h"

extern    union    REGS    regs;
define VIDEO    0x10 void     ftoa(double f,int maxlen,int ndp,char *string) /* convert floating point to ascii */
{
int j;
char string2[10],string3[10];

strcpy(string2,"00000000");
strcpy(string3,"000000000");
if(ndp>9) ndp=9;
f*=pow(10,-1*(ndp+1));
gcvt(f,maxlen,string);
j=inchar('.',string);
if(j)
{
strcat(string,string3);
string[j+ndp]=0;
}
else
{
string2[ndp+1]=0;
strcat(string,string2);
}
} int     inchar(char ch,char *string)        /* searches string for occurrence of ch */
{
int i=0;
while(string[i])
if(ch==string[i++]) return(i);
return(0);
} void print_title(char *title)
{
struct text_info t;

gettextinfo(&t);
if(t.screenheight>25)
{
window(3,7,79,7);
textbackground(BLACK);
clrscr();
window(79,3,79,7);
clrscr();
window(2,2,78,6);
textcolor(YELLOW);
textbackground(MAGENTA);
clrscr();

locate(t.screenwidth/2-strlen(title)/2,3);
printf("%s",title);
}
} void print_selection_menu(char option[][option_length],int number_items,
int *position,int *f)
{
struct text_info t;

gettextinfo(&t);
int top=t.screenheight/2-number_items/2-1;
int bottom=t.screenheight/2+number_items/2;
int maxlen=0;
for(int j=0;j<number_items;j++)
if(strlen(option[j])>maxlen) maxlen=strlen(option[j]);
int left=t.screenwidth/2-maxlen/2-5;
int right=t.screenwidth/2+maxlen/2+5;
*position=left+6;
*f=top;

window(left+1,bottom+1,right+1,bottom+1);
textbackground(BLACK);
clrscr();
```

```
window(right+1,top+1,right+1,bottom+1);
clrscr()

window(left,top,right,bottom);
textcolor(CYAN);
textbackground(LIGHTBLUE);
clrscr();

for(j=0;j<number_items;j++)
{
  locate(left+3,top+j);
  if(j<9) printf("%d. %s",j+1,option[j]);
  else printf("%c. %s",j-9+'A',option[j]);
}
} void print_help_message(char *message)
{
  char m[10][81];
  int      last_blank,first_char,j,row_number=0,optimum_line_length,
           number_rows,len,ip,ic[10];
  struct text_info b;

gettextinfo(&b);

if(b.screenheight>25)
  {
    int top=b.screenheight-10;
    int bottom=b.screenheight-2;
    int tr=top+2;
    int tr=bottom-2;
    int left=2;
    int right=78;
    textbackground(BLACK);
    window(left+1,bottom+1,right+1,bottom+1);
    clrscr();
    window(right+1,top+1,right+1,bottom+1);
    clrscr();

window(left,top,right,bottom);
    textcolor(WHITE);
    textbackground(RED);
    clrscr();

printf("\303");
    for(i=0;i<t.screenwidth/2-5;i++) printf("\304");
    printf(" Help ");
    for(i=0;i<t.screenwidth/2-6;i++) printf("\304");
    printf("\264");
    locate(2,bottom-1);
    printf("  Press .030-031 to change selections");
    printf("  <ENTER> To Select Highlighted Option");

number_rows=tr-tr+1;
    len=strlen(message);
    optimum_line_length=len/number_rows;

if(len>75)
    {
      last_blank=0;
      first_char=0;
      j=0;
      row_number=0;
      ip=0;

while(row_number<number_rows && j<len)
      {
        if(message[j]==32)
        {
          if(ip>optimum_line_length)
          {
            if(ip>80) ic[row_number]=last_blank;
            else
            {
              if(optimum_line_length-last_blank<ip-optimum_line_length &&
                 row_number<number_rows-1)
              {
                ic[row_number]=last_blank;
                j-=(ip-last_blank);
              }
              else ic[row_number]=ip;
            }
            strcpy(m[row_number],&message[first_char]);
            if(row_number<number_rows-1) m[row_number][ic[row_number]]=0;
            strcpy(m[row_number+1],&message[first_char+ic[row_number]]);
            row_number++;
            first_char=j+1;
```

```
        tp=0;
        last_blank=0;
        }
        else last_blank=j-first_char;
    }
    j+=1;
    lp+=1;
    } for(j=0;j<number_rows;j++)
    {
    locate((screenwidth/2-strlen(m[j])/2,lr+j+1);
    printf("%s",m[j]);
    }
    }
    else
    {
            locate((screenwidth/2-len/2,(lr+lr+1)/2);
            printf("%s",message);
    }
    }
} void    setcursor(int col,int row)
{
regs.h.ah=2;
regs.h.dl=col;
regs.h.dh=row;
regs.h.bh=0;
int86(VIDEO,®s,®s);
} void getcursor(int *col,int *row)
{
regs.h.ah=0x03;
regs.h.bh=0x00;
int86(VIDEO,®s,®s);
*col=regs.h.dl;
*row=regs.h.dh;
} void    cursor_on()
{
regs.h.ch=6;
regs.h.cl=7;
regs.h.ah=1;
int86(VIDEO,®s,®s);
} void    cursor_off()
{
regs.h.ch=32;
regs.h.ah=1;
int86(VIDEO,®s,®s);
} void locate(int col, int row)
{ regs.h.ah=0x02;
regs.h.bh=0x00;
regs.h.dh=row;
regs.h.dl=col;
int86(VIDEO,®s,®s);

} void    reverse_video(int col,int row,int length)
{
int far *fptr;

int     j,k,l,l1,l2,l3;

fptr=(int far *)0xB8000000;
for(j=0;j<length;j++)
{
k=*(fptr+row*80+col+j);
l1=k&0xF000;
l1=l1>>4;
l1=l1&0x0F00;
l2=k&0x0F00;
l2=l2<<4;
```

```
l3=h&0x00FF;
l=l1*2+l3;
*((ptr+row*80+col+j)=l;
      }
    } void    down(int *option_number,int number_options,char *menu,int col,int row)
{
reverse_video(col,row,strlen(menu));
if(*option_number<number_options-1) *option_number+=1;
else *option_number=0;
} void    up(int *option_number,int number_options,char *menu,int col,int row)
{
reverse_video(col,row,strlen(menu));
if(*option_number) *option_number-=1;
else *option_number=number_options-1;
} void    print_spaces(int number_spaces)
{
for(int i=0;i<number_spaces;i++) printf(" ");
} unsigned char bkey()
{
unsigned char ch;
  while(kbhit()==0)
  {
  if((inport(rfin) & print_switch)==0) return(ALT_P | 128);
  if((inport(rfin) & reset_switch)==0) return(ALT_G | 128);
  };
ch=getch();
if(ch==0) ch=getch()|128;
return(ch);
} int     test_for_jump(unsigned char ch)
{
if(ch & 128)
  {
  ch=ch&0x7F;
  switch(ch)
    {
    case UP_ARROW return(up_arrow);
    case DOWN_ARROW return(dn_arrow);
    case PG_DN return(pg_down);
    case PG_UP return(pg_up);
    case LEFT_ARROW return(l_arrow);
    case RIGHT_ARROW return(r_arrow);
    case ALT_G return(alt_g);
    case ALT_C return(alt_c);
    case ALT_P return(alt_p);
    case ALT_S return(alt_s);
    case ALT_L return(alt_l);
    case ALT_D return(alt_d);
    case ALT_X return(alt_x);
    case ALT_O return(alt_o);
    case ALT_H return(alt_h);
    case ALT_R return(alt_r);
    case ALT_T return(alt_t);
    case ALT_U return(alt_u);
    case ALT_F return(alt_f);
    case F1 return(f1);
    case F2 return(f2);
    case F3 return(f3);
    case F4 return(f4);
    case F5 return(f5);
    case DEL return(del);
    default return(ch | 128);
    }
  }
switch(ch)
  {
  case ESC return(escape);
  case ENTER return(enter);
  }
if(ch>31 && ch<128) return(0);
  else return(ch);
}
```

- 103 -
- 105 -

```c
int     getcmd(char *cmnd,unsigned char ch)
{
int y,z=0,ic=cmnd[0];
int col,row;

getcursor(&col,&row);
for(y=0;y<ic;y++) printf("%c",32);
setcursor(col,row);
y=0 while(z<32 || z==l_arrow || z==r_arrow)
{
 if(ch==21)
 {
  while(y>0)
  {
   y-=1;
   cmnd[y]=0;
   printf("%c%c%c",8,32,8);
   col-=1;
  }
 }
 if(ch==8 && y)
 {
  reverse_video(col-1,row,1);
  y-=1;
  cmnd[y]=0;
  printf("%c%c%c",8,32,8);
  col-=1;
 }
 if((ch>31) && (ch<=127) && (y<ic-1))
 {
  printf("%c",ch);
  reverse_video(col,row,1);
  col+=1;
  cmnd[y]=ch;
  cmnd[y+1]=0;
  y+=1;
 }
 ch=bkey();
 z=test_for_jump(ch);
}
return(z);
} int     getin(char *cmnd)
{
int i=0;
char ch;
do
 {
  ch=getch();
  if(ch!=0)
  {
   if(ch==ESC) return(1);
   else if(ch==8 && i)
            {
             printf("%c%c%c",ch,32,ch);
             i-=1;
            }
   else if(ch==24)
            {
             while(i)
             {
              putch(8);
              putch(32);
              putch(8);
              i-=1;
             }
            }
   else if(ch!=8 && ch!=ENTER && i<40)
            {
             putch(ch);
             cmnd[i++]=ch;
            }
  }
  else getch();
 }
while(ch!=ENTER);
cmnd[i]=0
putch(13);
putch(10);
return(0);
} int     determine_string(int *int rp[][2],char *response,int maxlen)
{
```

```
int z,j,k=rp[i][0],l=rp[i][1];
char ch,cmnd[50];
float f;

locate(k,l);
reverse_video(k,l,strlen(response));
ch=bkey();
z=test_for_jump(ch);
if(z==0)
{
  cmnd[0]=maxlen;
  reverse_video(k,l,strlen(response));
  z=getcmd(cmnd,ch);
  reverse_video(k,l,strlen(cmnd));
  locate(k,l);
  for(j=0;j<maxlen;j++) printf("\040");
  locate(k,l);
  strcpy(response,cmnd);
  printf("%s",response);
  reverse_video(k,l,strlen(response));
}
reverse_video(k,l,strlen(response));
return(z);
} int     determine_integer(int i,int rp[][2],char *response,int maxlen,
                          int min,int max)
{
int z,j,k=rp[i][0],l=rp[i][1];
char ch,cmnd[50];
int value;

locate(k,l);
reverse_video(k,l,strlen(response));
ch=bkey();
z=test_for_jump(ch);
if(z==0)
{
  cmnd[0]=maxlen;
  reverse_video(k,l,strlen(response));
  z=getcmd(cmnd,ch);
  reverse_video(k,l,strlen(cmnd));
  value=atoi(cmnd);
  if((value>=min) && value<=max) itoa(value,response,10);
  locate(k,l);
  for(j=0;j<maxlen-k;j++);
   printf("\040");
  locate(k,l);
  printf("%s",response);
  reverse_video(k,l,strlen(response));
}
reverse_video(k,l,strlen(response));
return(z);
} double   getseconds()
{
struct time now;
struct date today;
double seconds,s2;

do
 {
  getdate(&today);
  gettime(&now);
  seconds=24*3600*today.da_day+3600*now.ti_hour+60*now.ti_min+now.ti_sec+now.ti_hund/100;
  gettime(&now);
  s2=24*3600*today.da_day+3600*now.ti_hour+60*now.ti_min+now.ti_sec+now.ti_hund/100;
 }
while(seconds>s2);

return(s2);
}
```

```
#include "lindefs.cpp"

char    spec_option[number_spec_options][option_length],
        spec_response[number_spec_options][option_length],
        spec_option2[number_spec_options][option_length],
        spec_response2[number_spec_options][option_length];

char parameter_option[number_parameter_options][option_length],
    parameter_response[number_parameter_options][option_length],
    label_option[number_plot_options][option_length],
    label_response[number_plot_options][option_length],
    testpath[short_option_length];
```

−106−

```c
#define DAV 1
#define NRFD 2
#define NDAC 4
#define ATTN 8
#define IFC 16
#define SRQ 32
#define REN 64
#define EOI 128
#define DTAOUT 0x2E0
#define DATAIN 0x2E0
#define CMDOUT 0x2E1
#define CMDIN 0x2E1
#define INVALID_ADDRESS 1
#define NO_LISTENERS 2
#define NOT_ACCEPTING_DATA 3
#define DATA_NOT_RECEIVED 4
#define NOT_SENDING_DATA 5
#define BUFFER_OVERFLOW 6
#include "bios.h"
#include "stdio.h"
#include "stdlib.h"
#include "dos.h"
#include "conio.h"
#include "keys.h"
include <string.h> void    get_command(int adrs);
void    interface_clear();
int     input(int adrs,char *string);
int     output(int adrs,char *string);
int     command_out(char *cmd);
int     data_out(char *string);
int     data_in(char *string);
int     byte_out(unsigned char byte);

int cmdimg;

void    ieeebb()
{
char ch,string[50],listen[4],talk[4],cmd[4];
int adrs=50,i;
extern int cmdimg;
textcolor(RED);
textbackground(GREEN);
while(1)
  {
  clrscr();
  while(adrs<0 || adrs>30 || adrs==21)
    {
    printf("Enter HPIB Address (0-30) ");
    i=0;
    do
      {
      ch=getch();
      if(ch!=0)
        {
        if(ch==ESC) return;
            else if(ch==8 && i)
                {
                putch(ch);
                putch(32);
                putch(ch);
                i-=1;
                }
            else if(ch!=8 && ch!=ENTER)
                {
                putch(ch);
                string[i++]=ch;
                }
        }
        else getch();
      }
    while(ch!=ENTER);
    s[i] string[i]=0;
    else return;
    puts("");
    adrs=atoi(string);
    if(adrs>30 || adrs<0) puts ("Invalid Address");
    if(adrs==21) puts("Controller Address  Not Available");
    } /* end address loop */
  get_command(adrs);
  adrs=50;
  } /* loop forever */
} /* end main */ void    get_command(int adrs)
{
char ch,string[50];
int i,j;
```

```
clrscr();
interface_clear();
printf("Enter the Command you wish to send to device #-- %d\n\n",adrs);
printf("Enter ALT_R to read device\n\n");
printf("Enter ALT_A to change address\n\n");
ch=0;
while(ch!=ALT_A)
{
gotoxy(1,7);
printf("                                       ");
gotoxy(1,7);
printf("Command - ");
i=0;
ch=0;
while((ch!=ENTER) && (ch!=ALT_R))
{
  ch=getch();
  if (ch==0)
  {
    ch=getch();
    if(ch==ALT_A) return;
    else if(ch==ALT_R)
    {
      gotoxy(1,9);
      printf("Input Data--                          ");
      gotoxy(1,9);
      j=input(adrs,string);
      if(j==0) printf("Input Data-- %s\n",string);
      else
      {
        putch(7);
        getch();
        gotoxy(1,9);
        printf("                                    ");
      }
    } /* end ALT_R */
  } /* end extended key check */
  else if(ch==ESC) return;
  else if(ch==8 && i)
  {
    putch(ch);
    putch(32);
    putch(ch);
    i-=1;
  }
  else if(ch!=8)
  {
    putch(ch);
    string[i++]=ch;
  }
} /* Enter pressed after inputting command */
if(ch==ENTER)
{
  string[i]=0;
  j=output(adrs,string);
  if(j)
  {
    putch(7);
    getch();
  }
} /* end output sequence */
} /* end keyboard input */
} /* end get_command */ int     output(int adrs,char *string)
{
char cmd[4];
int j=0;
cmd[0]='?';cmd[1]='U';
if(adrs<32 && adrs>=0) cmd[2]=adrs+32;
else
{
  puts("Invalid GPIB address");
  return(INVALID_ADDRESS);
}
cmd[3]=0;
j=command_out(cmd);
if(j) return(j);
j=data_out(string);
return(j);
} int     input(int adrs,char *string)
{
char cmd[4];int j=0;
cmd[0]='?';cmd[1]='5';
if(adrs<32 && adrs>=0) cmd[2]=adrs+64;
else
  {
```

```
      puts("Invalid GPIB address");
      return(INVALID_ADDRESS);
   }
   cmd[3]=0;
   j=command_out(cmd);
   if(j) return(j);
   j=data_in(string);
   return(j);
} int      command_out(char *cmd)
{
   extern int cmdimg;
   int i,j;
   cmdimg=ATTN+REN;
   outportb(CMDOUT,cmdimg);
   for(i=0;i<strlen(cmd);i++)
   {
      j=byte_out(cmd[i]);
      if(j) return(j);
   }
   j=byte_out(13);
   return(j);
} /* end command_out */ int      byte_out(unsigned char byte)
{
   extern int cmdimg;
   int i;
   char ch;
   while(inportb(CMDIN) & NDAC)
      if(bioskey(1))
      {
         ch=getch();
         if(ch==ESC)
         {
            puts("No Listeners on Bus");
            return(NO_LISTENERS);
         }
      }
   while((inportb(CMDIN) & NRFD)==0)
      if(bioskey(1))
      {
         ch=getch();
         if(ch==ESC)
         {
            puts("No listeners on bus");
            return(NO_LISTENERS);
         }
      }
   outportb(DTAOUT,byte);
   for(i=0;i<5;i++);
   if(byte==10) cmdimg+=EOI;
   cmdimg+=DAV;
   outportb(CMDOUT,cmdimg);
   while((inportb(CMDIN) & NDAC)==0)
      if(bioskey(1))
      {
         ch=getch();
         if(ch==ESC)
         {
            puts("Not Accepting Data");
            return(NOT_ACCEPTING_DATA);
         }
      }
   while(inportb(CMDIN) & NRFD)
      if(bioskey(1))
      {
         ch=getch();
         if(ch==ESC)
         {
            puts("Not accepting data");
            return(NOT_ACCEPTING_DATA);
         }
      }
   cmdimg-=DAV;
   outportb(CMDOUT,cmdimg);
   return(0);
} int      data_out(char *string)
{
   int i,j;
   extern int cmdimg;
   cmdimg=REN;
   outportb(CMDOUT,cmdimg);
   for(i=0;i<strlen(string);i++)
   {
      j=byte_out(string[i]);
      if(j) return(j);
   }
   j=byte_out(13);
   if(j) return(j);
   j=byte_out(10);
```

```
return(j);
}
int		data_in(char *string)
{
extern int cmdmg;
int i,j=0;
unsigned char ch,d_in,c_in;
cmdmg=NDAC;
outportb(CMDOUT,cmdmg);
outportb(DTAOUT,0);
do
{
  do
  {
    c_in=inportb(CMDIN);
    if(bioskey(1))
    {
        ch=getch();
        if(ch==0) ch=getch();
        if(ch==ESC)
        {
          puts("Data Not Received");
          string[j]=0;
          return(DATA_NOT_RECEIVED);
        }
    }
    if((c_in & EOI)==0)
    {
        string[j]=0;
        return(0);
    } /* end EOI check */
  } /* end DAV check */
  while(c_in & DAV);
  d_in=inportb(DATAIN);
  d_in=~d_in;
  if (j<49) string[j++]=d_in;
  else
        {
          printf("BUFFER OVERFLOW");
          return(BUFFER_OVERFLOW);
        }
  cmdmg=(cmdmg & (255-NDAC) | NRFD);
  i=0;
  do
  {
    outportb(CMDOUT,cmdmg);
    c_in=inportb(CMDIN);
    i+=1;
    if(bioskey(1))
    {
        ch=getch();
        if(ch==0) ch=getch();
        if(ch==ESC)
        {
          puts("Device Not Accepting Data - input");
          return(NOT_ACCEPTING_DATA);
        } /* end escape */
    } /* end bioskey check */
  } /* end DAV check */
  while ( c_in & DAV && i<5);
  cmdmg=(cmdmg & (255-NRFD) | NDAC);
  outportb(CMDOUT,cmdmg);
} /* end EOL check */
while (d_in !=10);
string[j]=0;
return(0);
} /* end data_in */ void		interface_clear()
{
outportb(CMDOUT,IFC);
outportb(DTAOUT,7);
}
```

```
#include <dos.h>
#include "tinglobl.cpp"
#include <graphics.h>
#include "linear.h"

#define xline      50
#define yline      50
define font_size  4 void       obtain_data()
{
int driver=DETECT,mode,maxx,maxy,miny,j,x,xtick,y,ytick,repeat_number,pn,i;
float angle,vo;
double     vs;

char ch,string[option_length],string1[option_length];

initgraph(&driver,&mode,"");

maxx=getmaxx()-20;
maxy=getmaxy();
miny=25;

settextjustify(CENTER_TEXT,BOTTOM_TEXT);
settextstyle(TRIPLEX_FONT,HORIZ_DIR,font_size/2);
moveto(maxx/2,maxy);
outtext(parameter_response[x_title_option]);
moveto(getmaxx()-1,maxy/2);
settextjustify(RIGHT_TEXT,BOTTOM_TEXT);
settextstyle(TRIPLEX_FONT,VERT_DIR,font_size/2);
outtext(parameter_response[y_title_option]);
moveto(maxx/2,0);
settextjustify(CENTER_TEXT,TOP_TEXT);
settextstyle(TRIPLEX_FONT,HORIZ_DIR,font_size/2);
outtext(parameter_response[plot_title_option]);

settextjustify(CENTER_TEXT,TOP_TEXT);
settextstyle(SMALL_FONT,HORIZ_DIR,font_size*1.5);

for(angle=min_plotting_angle;angle<=max_plotting_angle+.001;
    angle+=(max_plotting_angle-min_plotting_angle)/(number_x_ticks-1))
{
xtick=yline+(maxx-yline)*(angle-min_plotting_angle)/(max_plotting_angle-min_plotting_angle);
line(xtick,maxy-xline,xtick,miny);
fcvt(angle,6,1,string);
moveto(xtick,maxy-xline+10);
outtext(string);
} settextjustify(RIGHT_TEXT,CENTER_TEXT);
for(vo=min_plotting_voltage;vo<=max_plotting_voltage+.001;
    vo+=(max_plotting_voltage-min_plotting_voltage)/(number_y_ticks-1))
{
ytick=(maxy-xline)-(maxy-xline-miny)*(vo-min_plotting_voltage)/
      (max_plotting_voltage-min_plotting_voltage);
line(yline,ytick,maxx,ytick);
fcvt(vo,6,2,string);
moveto(yline,ytick);
outtext(string);
} j=output(DVM,"DCV 5, 1");
if(j) goto endauto;
j=output(DVM,"TERM 2");
if(j) goto endauto;
j=input(DVM,string);
if(j) goto endauto;
for(i=0;i<10;i++)
{
j=input(DVM,string);
if(j) goto endauto;
vs=atof(string);
if(vs>4.995 && vs<5.005) break;
} if(vs>5.1 || vs<4.9)
{
printf("\0007 Warning VS out of Spec %6.3f",vs);
ch=getch();
if(ch==ESC) goto endauto;
if(ch==0) ch=getch();
}
```

```
if(ch==ALT_X) terminate_program();
} output(DVM,"TERM 1");
output(DVM,"RESET");
output(DVM,"LOCK ON");
output(DVM,"NPLC .02");
output(DVM,"AZERO 0");
output(DVM,"MEM FIFO");
output(DVM,"DELAY 0");
output(DVM,"TIMER 500E-5");
output(DVM,"NDIG 4");

strcpy(string,"DCV ");
hoa(max_plotting_voltage+1,12,1,string1);
strcat(string,string1);

for(repeat_number=0;repeat_number<=number_repeats;repeat_number++)
{
  pn=plot_number*(number_repeats+1)+repeat_number;
  printf("pn=%d",pn);
  for(x=0;x<max_num_points;x++)
  {
    plot_data[pn][x]=-500.0;
    plot_data[pn+1][x]=-500.0;
  } plot_data[pn][max_num_points-1]=vs;
  plot_data[pn+1][max_num_points-1]=vs;
  place_fixture(min_testing_angle-1);
  enable_motor();
  set_motor_speed(motor_speed);

angle=getangle();

while(angle<max_testing_angle)
  {
    if(kbhit())
    {
      ch=getch();
      if(ch==ESC) goto endauto;
      if(ch==0)
      {
        ch=getch();
        if(ch==ALT_X) terminate_program();
      }
    } vo=read_ad();
    angle=getangle();
    x=angle*10-position_velocity*load_circuit_delay;
    plot_data[pn][x]=vo;
    y=(maxy-xline-miny)*((plot_data[pn][x]vs-min_plotting_voltage)/
      (max_plotting_voltage-min_plotting_voltage));
    putpixel(xline+((float)x-min_plotting_angle*10)*(maxx-yline)/
      ((max_plotting_angle-min_plotting_angle)*10),y,color_table[pn]);
  } disable_motor();

enable_motor();

// delay(750);

set_motor_speed(-1*motor_speed);

angle=getangle();

if(repeat_number<number_repeats)
  {
    repeat_number++;
    while(angle>min_testing_angle)
    {
      if(kbhit())
      {
        ch=getch();
        if(ch==ESC) goto endauto;
        if(ch==0)
        {
          ch=getch();
          if(ch==ALT_X) terminate_program();
        }
      }
//    i=input(DVM,string);
//    if(i) goto endauto;
/*    Receive(0,DVM,string,100L,STOPend);
      if(bsta & ERR) goto endauto;*/
//    vo=atof(string);
      vo=read_ad();
      angle=getangle();
```

```
x=angle*10+position_velocity*load_circuit_delay;
plot_data[pn+1][x]=vo;
y=(maxy-yline)-(maxy-yline-miny)*((plot_data[pn+1][x]/vs-min_plotting_voltage)/
    (max_plotting_voltage-min_plotting_voltage));
putpixel(yline+((float)x-min_plotting_angle*10)*(maxx-yline)/
    ((max_plotting_angle-min_plotting_angle)*10),y,color_table[pn+1]);
    }
  }
} enable_motor();
moveto(600,13);
outtext("TEST COMPLETE");

endauto:

output(DVM,"DISP ON");
output(DVM,"LOCK OFF");

/* Send(0,DVM,"DISP ON",100L,STOPend);
Send(0,DVM,"LOCK OFF",100L,STOPend);*/ disableio();
delay(500);
disable_motor();
ch=getch();
if(ch==0)
  switch(getch())
  {
   case ALT_G:
    closegraph();
    graph_data();
    break;

case ALT_X:
    terminate_program();

case F1:
    closegraph();
    results_to_screen();
    break;
  }
closegraph();
}
```

```
#include <conio.h>
#include <stdlib.h>
#include <stdio.h>
include <string.h> include "lindefs.cpp"
include "keys.h"

extern char parameter_option[number_parameter_options][option_length],
            parameter_response[number_parameter_options][option_length],
            label_option[number_plot_options][option_length],
            label_response[number_plot_options][option_length],
            spec_option[][option_length],
            spec_response[][option_length],
            spec_option2[][option_length],
            spec_response2[][option_length],
            testpath[short_option_length];

extern int row,col,parameter_page_number,number_x_ticks,number_y_ticks,
           dvm_digits,number_plots,number_repeats,plot_number,
           voltage,color_table[],ax,ay,MOTOR_IMAGE,rlotim,svmtptim,
           reverse_plot_active;

extern double min_testing_angle,max_testing_angle,
              min_plotting_angle,max_plotting_angle,
              min_plotting_voltage,max_plotting_voltage,
              motor_speed,test_voltage,load_circuit_delay,
              zeropoint,position_velocity,printout_increment,
              l1_min_angle,l1_max_angle,l1_min_voltage,l1_max_voltage,
              l2_min_angle,l2_max_angle,l2_min_voltage,l2_max_voltage,
              l3_min_angle,l3_max_angle,l3_min_voltage,l3_max_voltage,
              l4_min_angle,l4_max_angle,l4_min_voltage,l4_max_voltage,
              l5_min_angle,l5_max_angle,l5_min_voltage,l5_max_voltage,
              l6_min_angle,l6_max_angle,l6_min_voltage,l6_max_voltage,
              l7_min_angle,l7_max_angle,l7_min_voltage,l7_max_voltage,
              l8_min_angle,l8_max_angle,l8_min_voltage,l8_max_voltage;

extern float plot_data[][max_num_points];

extern FILE *fp1,*fp2;

extern char     ep_parm_option    [number_ep_parm_options][option_length],
                ep_parm_response[number_ep_parm_options][option_length];

extern double   angle1_calpoint,angle2_calpoint,angle3_calpoint,
                angle4_calpoint,angle5_calpoint,angle6_calpoint,
                angle7_calpoint,angle8_calpoint;
```

```c
#include <conio.h>
#include <process.h>
#include <stdlib.h>
#include <string.h>
#include <graphics.h>
#include <math.h>
#include <stdio.h>
#include <dos.h>
#include "keys.h"
#include "lindefs.cpp"
#include "linear.h"

extern unsigned _stklen=0xB000;

extern char    spec_option[][option_length],
               spec_response[][option_length],
               spec_option2[][option_length],
               spec_response2[][option_length];

extern char    parameter_option[number_parameter_options][option_length],
               parameter_response[number_parameter_options][option_length],
               label_option[number_plot_options][option_length],
               label_response[number_plot_options][option_length],
               testpath[short_option_length];

extern char    validation_response[number_validation_options][option_length];

extern char    ep_parm_response[number_ep_parm_options][option_length],
               ep_parm_option    [number_ep_parm_options][option_length];

int row,col,parameter_page_number,color_table[number_plot_options],ax=32,
    ay=8,reverse_plot_active=1;

double   min_testing_angle=7.90,max_testing_angle=105.,
         min_plotting_angle=7.90,max_plotting_angle=105.,
         min_plotting_voltage=0.0,max_plotting_voltage=1.0,
         motor_speed=60.0,test_voltage=5.0,zeropoint_position_velocity=30,
         printout_increment=2.0,load_circuit_delay=.000,
  l1_min_angle=20.4,l1_max_angle=96.6,l1_min_voltage=.190,l1_max_voltage=.900,
  l2_min_angle=20.4,l2_max_angle=96.6,l2_min_voltage=.250,l2_max_voltage=.960,
  l3_min_angle=96.6,l3_max_angle=110,l3_min_voltage=.900,l3_max_voltage=.900,
  l4_min_angle=96.6,l4_max_angle=110,l4_min_voltage=.960,l4_max_voltage=.960,
  l5_min_angle=14.4,l5_max_angle=20.4,l5_min_voltage=.155,l5_max_voltage=.211,
  l6_min_angle=14.4,l6_max_angle=20.4,l6_min_voltage=.175,l6_max_voltage=.231,
  l7_min_angle=0.00,l7_max_angle=0.00,l7_min_voltage=0.00,l7_max_voltage=0.00,
  l8_min_angle=0.l8_max_angle=.0,l8_min_voltage=.0,l8_max_voltage=0;

int      number_x_ticks=11,number_y_ticks=26,number_plots=4,number_repeats=1,
         plot_number=0,dvm_digits=3,voltage=volt05,MOTOR_IMAGE=0,rlotm=0,
         svmtpt.m=0;

float    plot_data[number_plot_options][max_num_points];

double   validation_angle1=14.4,validation_angle2=17.4,validation_angle3=20.4,
         validation_angle4=91.0,validation_angle5=101.;

double   angle1_calpoint=14.4,angle2_calpoint=17.4,angle3_calpoint=20.4,
         angle4_calpoint=34.8,angle5_calpoint=49.2,angle6_calpoint=63.6
         angle7_calpoint=78.0,angle8_calpoint=92.4;

FILE *fp1,*fp2;

union    REGS    regs;
struct   text_info  t;

void     main()
{
  char key,zf[30],option[number_main_options][option_length],
       help_option[number_main_options][help_length];
  int  option_position,first_row,option_number=0,i,j;

closegraph();
/* registerbgdriver(EGAVGA_driver);*/
registerbgfont(small_font);
registerbgfont(triplex_font);
registerbgfont(sansserif_font);

outport(MOTOR_PORT,MOTOR_IMAGE);
outportb(rlout,rfoam);

color_table[0]=YELLOW;
color_table[1]=CYAN;
```

```
color_table[2]=LIGHTGRAY;
color_table[3]=LIGHTRED;
color_table[4]=LIGHTMAGENTA;
color_table[5]=LIGHTBLUE;
color_table[6]=BROWN;
color_table[7]=RED;

if((fp1=fopen("zerofile.pnt","r"))==NULL)
{
  printf("Can't open zerofile\n");
  getch();
}
else
{
  fgets(zf,40,fp1);
  zeropoint=atof(zf);
} strcpy(option[obtain_sensor_data_option],     "Obtain Sensor Data");
strcpy(option[save_data_option],              "Save Plot Data To Disk");
strcpy(option[load_data_option],              "Load Plot Data From Disk");
strcpy(option[plot_data_option],              "Send Plotter Data to Plotter");
strcpy(option[load_parameters_option],        "Load Test Parameters From Disk");
strcpy(option[save_parameters_option],        "Save Test Parameters To Disk");
strcpy(option[results_to_screen_option],      "List Results to Screen");
strcpy(option[results_to_printer_option],     "List Results to Printer");
strcpy(option[deviation_to_screen_option],    "Plot Deviation from Ideal");
strcpy(option[change_parameters_option],      "Change Test Parameters");
strcpy(option[calibration_option],            "Enter Calibration Mode");
strcpy(option[eprom_configuration_option],    "Configure Device Eprom");
strcpy(option[summary_option],                "Print Product Summary");
strcpy(option[dos_shell_option],              "Exit to DOS Shell");
strcpy(option[exit_program_option],           "Exit TPS Program");

strcpy(help_option[obtain_sensor_data_option], "Use this option to begin automatically collecting data on the ");
strcat(help_option[obtain_sensor_data_option], "device mounted in the test fixture. The data will be collected ");
strcat(help_option[obtain_sensor_data_option], "as the output voltage referenced to the angle read on the encoder. ");
strcat(help_option[obtain_sensor_data_option], "The test will follow the parameters currently located in the change ");
strcat(help_option[obtain_sensor_data_option], "parameters section of the program. Use ALT-O as a hot key to obtain ");
strcat(help_option[obtain_sensor_data_option], "sensor data from anywhere in the program.");
strcpy(help_option[save_data_option],          "Use this option to save plotted data to a disk in order to archive ");
strcat(help_option[save_data_option],          "the data. Data most recently collected will be the data saved. ");
strcpy(help_option[load_data_option],          "Use this option to load previously stored data back into the computer ");
strcat(help_option[load_data_option],          "for analysis and inspection.");
strcpy(help_option[plot_data_option],          "Use this option to display the data in a graphic plot of angle ");
strcat(help_option[plot_data_option],          "position versus output voltage. Plot characteristics may be modified ");
strcat(help_option[plot_data_option],          "in the change parameters section of the program. Use the hot-key ");
strcat(help_option[plot_data_option],          "combination ALT-G from anywhere in the program to plot the data.");
strcpy(help_option[load_parameters_option],    "Use this option to load previously stored parameter data from disk. ");
strcat(help_option[load_parameters_option],    "File names used to retrieve data are the testname parameter option, ");
strcat(help_option[load_parameters_option],    "located in the change parameters section of the program ");
strcpy(help_option[save_parameters_option],    "This option is used to save the current set of parameters found in the ");
strcat(help_option[save_parameters_option],    "change parameters section of the program.");
strcpy(help_option[change_parameters_option],  "Use this option to change parameters or characteristics of test ");
strcat(help_option[change_parameters_option],  "method, output and display format. Use ALT-C to enter the change ");
strcat(help_option[change_parameters_option],  "parameters section of the program from any other section of the program.");
strcpy(help_option[results_to_screen_option],  "Use this option to list the results by deviation from the ideal transfer ");
strcat(help_option[results_to_screen_option],  "function for each of the given plots. Use F1 to enter the list results ");
strcat(help_option[results_to_screen_option],  "from any other section of the program. Parameters used in this section ");
strcat(help_option[results_to_screen_option],  "are min plotting angle, max plotting angle and printout increment.");
strcpy(help_option[results_to_printer_option], "Use this option to list the results by deviation from the ideal transfer ");
strcat(help_option[results_to_printer_option], "function for each of the given plots. Use ALT-R to enter the list results ");
strcat(help_option[results_to_printer_option], "from any other section of the program. Parameters used in this section ");
strcat(help_option[results_to_printer_option], "are min plotting angle, max plotting angle and printout increment.");
strcpy(help_option[deviation_to_screen_option],"Use this option to graphically display the percentage deviation of the ");
strcat(help_option[deviation_to_screen_option],"plot versus angle on the screen. Use F2 as a hotkey to display the graph ");
strcat(help_option[deviation_to_screen_option],"to the screen. Parameters used in this section are: min plotting angle, ");
strcat(help_option[deviation_to_screen_option],"max plotting angle, min and max plotting deviation percentages.");
strcpy(help_option[calibration_option],        "Use this option to gain manual control over several of the tester's ");
strcat(help_option[calibration_option],        "data acquisition capabilities. Items which can be individually monitored ");
strcat(help_option[calibration_option],        "include encoder output, DVM readings, motor speed and DAC control ");
strcpy(help_option[eprom_configuration_option],"Use this option to set calibration points, determine slope and y intercepts ");
strcat(help_option[eprom_configuration_option],"for the self learning device in the fixture.");
strcpy(help_option[dos_shell_option],          "Use this option to temporarily enter the DOS shell in order to perform ");
strcpy(help_option[summary_option],            "Use this option to output the Design Validation Test Report. Use ALT V ");
strcat(help_option[summary_option],            "as a hotkey to access this function.");
strcat(help_option[dos_shell_option],          "such functions as copying files and changing directories.");
strcpy(help_option[exit_program_option],       "Select this option when you are finished with the TPS program.");

strcpy(parameter_option[min_testing_angle_option],   "Min Testing Angle         ");
strcpy(parameter_option[max_testing_angle_option],   "Max Testing Angle         ");
strcpy(parameter_option[min_plotting_angle_option],  "Min Plotting Angle        ");
strcpy(parameter_option[max_plotting_angle_option],  "Max Plotting Angle        ");
strcpy(parameter_option[min_plotting_voltage_option],"Min Plotting Voltage      ");
strcpy(parameter_option[max_plotting_voltage_option],"Max Plotting Voltage      ");
strcpy(parameter_option[number_x_ticks_option],      "Number of X Ticks         ");
strcpy(parameter_option[number_y_ticks_option],      "Number of Y Ticks         ");
```

```
strcpy(parameter_option[x_title_option],        "X Title------------------");
strcpy(parameter_option[y_title_option],        "Y Title------------------");
strcpy(parameter_option[plot_title_option],                 "Plot Title--------------");
strcpy(parameter_option[number_plots_option],              "Number Of Plots---------");
strcpy(parameter_option[number_repeats_option], "Number of Repeats----------");
strcpy(parameter_option[motor_speed_option],               "Motor Test Speed (Deg/Sec)--");
strcpy(parameter_option[testname_option],                   "Test Name---------------");
strcpy(parameter_option[plotname_option],                   "Plot File Name-----------");
strcpy(parameter_option[operator_initials_option], "Operator Initials-----------");
strcpy(parameter_option[printout_increment_option],"Printout Increment---------");
strcpy(parameter_option[load_circuit_delay_option],"Load Circuit Delay---------");

strcpy(spec_option[l1_min_angle_option],        "Line #1 Min Angle----");
strcpy(spec_option[l1_max_angle_option],        "Line #1 Max Angle----");
strcpy(spec_option[l1_min_voltage_option],      "Line #1 Min Voltage--");
strcpy(spec_option[l1_max_voltage_option],      "Line #1 Max Voltage--");
strcpy(spec_option[l2_min_angle_option],        "Line #2 Min Angle----");
strcpy(spec_option[l2_max_angle_option],        "Line #2 Max Angle----");
strcpy(spec_option[l2_min_voltage_option],      "Line #2 Min Voltage--");
strcpy(spec_option[l2_max_voltage_option],      "Line #2 Max Voltage--");
strcpy(spec_option[l3_min_angle_option],        "Line #3 Min Angle----");
strcpy(spec_option[l3_max_angle_option],        "Line #3 Max Angle----");
strcpy(spec_option[l3_min_voltage_option],      "Line #3 Min Voltage--");
strcpy(spec_option[l3_max_voltage_option],      "Line #3 Max Voltage--");
strcpy(spec_option[l4_min_angle_option],        "Line #4 Min Angle----");
strcpy(spec_option[l4_max_angle_option],        "Line #4 Max Angle----");
strcpy(spec_option[l4_min_voltage_option],      "Line #4 Min Voltage--");
strcpy(spec_option[l4_max_voltage_option],      "Line #4 Max Voltage--");

strcpy(spec_option2[l5_min_angle_option],       "Line #5 Min Angle----");
strcpy(spec_option2[l5_max_angle_option],       "Line #5 Max Angle----");
strcpy(spec_option2[l5_min_voltage_option],     "Line #5 Min Voltage--");
strcpy(spec_option2[l5_max_voltage_option],     "Line #5 Max Voltage--");
strcpy(spec_option2[l6_min_angle_option],       "Line #6 Min Angle----");
strcpy(spec_option2[l6_max_angle_option],       "Line #6 Max Angle----");
strcpy(spec_option2[l6_min_voltage_option],     "Line #6 Min Voltage--");
strcpy(spec_option2[l6_max_voltage_option],     "Line #6 Max Voltage--");
strcpy(spec_option2[l7_min_angle_option],       "Line #7 Min Angle----");
strcpy(spec_option2[l7_max_angle_option],       "Line #7 Max Angle----");
strcpy(spec_option2[l7_min_voltage_option],     "Line #7 Min Voltage--");
strcpy(spec_option2[l7_max_voltage_option],     "Line #7 Max Voltage--");
strcpy(spec_option2[l8_min_angle_option],       "Line #8 Min Angle----");
strcpy(spec_option2[l8_max_angle_option],       "Line #8 Max Angle----");
strcpy(spec_option2[l8_min_voltage_option],     "Line #8 Min Voltage--");
strcpy(spec_option2[l8_max_voltage_option],     "Line #8 Max Voltage--");

strcpy(ep_parm_option  [angle1_calpoint_option], "Angle #1 Calibration Point-----");
strcpy(ep_parm_option  [angle2_calpoint_option], "Angle #2 Calibration Point-----");
strcpy(ep_parm_option  [angle3_calpoint_option], "Angle #3 Calibration Point-----");
strcpy(ep_parm_option  [angle4_calpoint_option], "Angle #4 Calibration Point-----");
strcpy(ep_parm_option  [angle5_calpoint_option], "Angle #5 Calibration Point-----");
strcpy(ep_parm_option  [angle6_calpoint_option], "Angle #6 Calibration Point-----");
strcpy(ep_parm_option  [angle7_calpoint_option], "Angle #7 Calibration Point-----");
strcpy(ep_parm_option  [angle8_calpoint_option], "Angle #8 Calibration Point-----");

copy_in();

strcpy(parameter_response[x_title_option],"DEGREES");
strcpy(parameter_response[y_title_option],"VOVS");
strcpy(parameter_response[plot_title_option],"Throttle Position Sensor");
strcpy(parameter_response[testname_option],"TPS");
strcpy(parameter_response[plotname_option],"AEC");
strcpy(parameter_response[operator_initials_option],"RJW");

strcpy(label_option[plot_label1_option],"Plot #1 Title--");
strcpy(label_option[plot_label2_option],"Plot #2 Title--");
strcpy(label_option[plot_label3_option],"Plot #3 Title--");
strcpy(label_option[plot_label4_option],"Plot #4 Title--");
strcpy(label_option[plot_label5_option],"Plot #5 Title--");
strcpy(label_option[plot_label6_option],"Plot #6 Title--");
strcpy(label_option[plot_label7_option],"Plot #7 Title--");
strcpy(label_option[plot_label8_option],"Plot #8 Title--");

strcpy(label_response[plot_label1_option],"025 Deg C Initial");
strcpy(label_response[plot_label2_option],"135 Deg C");
strcpy(label_response[plot_label3_option],"-20 Deg C");
strcpy(label_response[plot_label4_option],"025 Deg C Final");
strcpy(label_response[plot_label5_option],"");
strcpy(label_response[plot_label6_option],"");
strcpy(label_response[plot_label7_option],"");
strcpy(label_response[plot_label8_option],"");

strcpy(testpath,"d:\\tps\\parambrs");

ftoa(validation_angle1,12,1,validation_response[angle1_option]);
ftoa(validation_angle2,12,1,validation_response[angle2_option]);
ftoa(validation_angle3,12,1,validation_response[angle3_option]);
ftoa(validation_angle4,12,1,validation_response[angle4_option]);
ftoa(validation_angle5,12,1,validation_response[angle5_option]);
```

```
strcpy(validation_response[part_number_option],   "DD1180");
strcpy(validation_response[spec_number_option],   "ES-F6CF-9F928-AA");
strcpy(validation_response[test_number_option],   "3.3SB");
strcpy(validation_response[technician_option],    "DEM");
strcpy(validation_response[report_name_option],   "Humidity Post Test - Transfer Function");
strcpy(validation_response[temperature_option],   label_response[plot_label1_option]);
strcpy(validation_response[load_option],          "Off");

/* disable blinking in text mode for 16 background colors */ define disable_blink   0x00
define enable_blink    0x01
define VIDEO           0x10 regs.h.ah=0x10;
regs.h.al=0x03;
regs.h.bl=disable_blink;
int86(VIDEO,®s,®s);

textmode(C4350);

regs.h.bl=255;
int86(VIDEO,®s,®s);

menu:

textmode(C4350);
gettextinfo(&ti);
window(1,1,ti.screenwidth,ti.screenheight);
textbackground(LIGHTGRAY);
clrscr();

print_title("THROTTLE POSITION SENSOR MAIN MENU");
print_selection_menu(option,number_main_options,&option_position,&first_row);
print_help_message(help_option[option_number]);
reverse_video(option_position,first_row+option_number,
              strlen(option[option_number]));

while((key=getch())!=17)
{
  if(key==0)
  {
    key=getch();
    if(key==DN_ARROW || key==UP_ARROW)
    {
      if(key==DN_ARROW)
        down(&option_number,number_main_options,option[option_number],
             option_position,first_row+option_number);
      else up(&option_number,number_main_options,option[option_number],
             option_position,first_row+option_number);
      reverse_video(option_position,first_row+option_number,
                    strlen(option[option_number]));
      print_help_message(help_option[option_number]);
    }
    else switch(key)
    {
        case ALT_X:
          terminate_program();

case ALT_O:
          obtain_data();
          goto menu;

case ALT_G:
          graph_data();
          goto menu;

case ALT_R:
          printout_results();
          goto menu;

case ALT_V:
          validation_report();
          goto menu;

case ALT_L:
          switch(option_number)
          {
            case obtain_sensor_data_option:
            case load_parameters_option:
            case save_parameters_option:
            case calibration_option:
            case dos_shell_option:
            case exit_program_option:
```

```c
        load_parameters();
        goto menu;

case save_data_option:
    case load_data_option:
    case plot_data_option:
        load_data();
        goto menu;
    }
    break;

case ALT_S:
    switch(option_number)
    {
    case obtain_sensor_data_option:
    case load_parameters_option:
    case save_parameters_option:
    case calibration_option:
    case dos_shell_option:
    case exit_program_option:
        save_parameters();
        goto menu;

case save_data_option:
    case load_data_option:
    case plot_data_option:
        save_data();
        goto menu;
    } case PG_DN:
case ALT_C:
    change_parameters();
    goto menu;

case F1:
    results_to_screen();
    goto menu;

case F2:
    graph_transfer_function_deviation();
    goto menu;

}
}
else
{
    if(key>'0' && key<='9')
    {
        option_number=key-'1';
        key=ENTER;
    } if(key>='a' && key<='z')
    {
        option_number=key-'a'+9;
        key=ENTER;
    } if(key>='A' && key <='Z')
    {
        option_number=key-'A'+9;
        key=ENTER;
    } if(key==ENTER)
    {
        switch(option_number)
        { case obtain_sensor_data_option:
            obtain_data();
            closegraph();
            goto menu;

case load_data_option:
            load_data();
            goto menu;

case save_data_option:
            save_data();
            goto menu;

case plot_data_option:
            plot_data();*/
            goto menu;

case change_parameters_option:
            change_parameters();
```

```
            goto menu;

case load_parameters_option:
            load_parameters();
            goto menu;

case save_parameters_option:
            save_parameters();
            goto menu;

case results_to_screen_option:
            results_to_screen();
            goto menu;

case results_to_printer_option:
            printout_results();
            goto menu;

case calibrator_option:
            calmenu();
            goto menu;

case summary_option:
            validation_report();
            goto menu;

case eprom_configuration_option:
            epmenu();
            goto menu;

case dos_shell_option:
            gettextinfo(&b);
            window(1,1,b.screenwidth,b.screenheight);
            clrscr();
            puts("Type Exit to Return to TPS Program\n");
            system("command.com");
            goto menu;

case exit_program_option:
            terminate_program();

}
    }
  }
} void terminate_program()
{
    disableio();
    closegraph();
    window(1,1,80,25);
    regs.h.ah=0x10;
    regs.h.al=0x03;
    regs.h.bl=enable_blink;
    int86(VIDEO,®s,®s);
    textmode(C80);
    textbackground(BLACK);
    textcolor(WHITE);
    clrscr();
    exit(1);
} void      disableio()
{
    MOTOR_IMAGE=0;
    outport(MOTOR_PORT,MOTOR_IMAGE);
    rlotm=0;
    outportb(rlout,rlotm);
    svmtpstm=0;
    outport(svmtport,svmtpstm);
}
```

APPENDIX 2

© DURAKOOL, INC 1995

```
$BASE   10T                     ;Set decimal as default # base

* Register Equates
PORTA   EQU   $00               ;I/O port A
EXCLK   EQU   7                 ;Bit 7 of port A : external clock
DADIN   EQU   6                 ;Bit 6 of port A : DAC data in
DADOUT  EQU   5                 ;Bit 5 of port A : DAC data out
DACS    EQU   4                 ;Bit 4 of port A : DAC chip select
SCLK    EQU   3                 ;Bit 3 of port A : serial clock
ADDIN   EQU   2                 ;Bit 2 of port A : ADC data in
ADCS    EQU   1                 ;Bit 1 of port A : ADC chip select
ADDOUT  EQU   0                 ;Bit 0 of port A : ADC data out PORTB   EQU   $01               ;I/O port B
EPDOUT  EQU   5                 ;Bit 5 of port B : EEPROM data out
EPDIN   EQU   4                 ;Bit 4 of port B : EEPROM data in
CALIB   EQU   3                 ;Bit 3 of port B : Calibrate
PB2     EQU   2                 ;Bit 2 of port B : NOT USED
PB1     EQU   1                 ;Bit 1 of port B : NOT USED
EPCS    EQU   0                 ;Bit 0 of port B : EEPROM CS DDRA    EQU   $04               ;Data direction of port A
DDRA7   EQU   7                 ;Bit 7 of port A DDR
DDRA6   EQU   6                 ;Bit 6 of port A DDR
DDRA5   EQU   5                 ;Bit 5 of port A DDR
DDRA4   EQU   4                 ;Bit 4 of port A DDR
DDRA3   EQU   3                 ;Bit 3 of port A DDR
DDRA2   EQU   2                 ;Bit 2 of port A DDR
DDRA1   EQU   1                 ;Bit 1 of port A DDR
DDRA0   EQU   0                 ;Bit 0 of port A DDR DDRB    EQU   $05               ;Data direction of port B
DDRB7   EQU   7                 ;Bit 7 of port B DDR
DDRB6   EQU   6                 ;Bit 6 of port B DDR
DDRB5   EQU   5                 ;Bit 5 of port B DDR
DDRB4   EQU   4                 ;Bit 4 of port B DDR
DDRB3   EQU   3                 ;Bit 3 of port B DDR
DDRB2   EQU   2                 ;Bit 2 of port B DDR
DDRB1   EQU   1                 ;Bit 1 of port B DDR
DDRB0   EQU   0                 ;Bit 0 of port B DDR REGA7   EQU   7                 ;Bit 7 of register A
REGA6   EQU   6                 ;Bit 6 of register A
REGA5   EQU   5                 ;Bit 5 of register A
REGA4   EQU   4                 ;Bit 4 of register A
REGA3   EQU   3                 ;Bit 3 of register A
REGA2   EQU   2                 ;Bit 2 of register A
REGA1   EQU   1                 ;Bit 1 of register A
REGA0   EQU   0                 ;Bit 0 of register A
```

```
* Serial EEPROM Instruction Equates
    EWEN    EQU    $9F             ;Erase/Write enable
    EWDS    EQU    $80             ;Erase/Write disable
    ERAL    EQU    $90             ;Erase all

* Constant Equates
    INIT1   EQU    $92             ;PORTA initial data
    INIT2   EQU    $5E             ;DDRA initialize
    INIT3   EQU    $EE             ;PORTB initial data
    INIT4   EQU    $E6             ;DDRB initialize
    INIT5   EQU    $00             ;EEPROM starting address
    COUNT1  EQU    $0C             ;data size
    COUNT2  EQU    $09             ;Calibration points + thermistor
    COUNT3  EQU    $0E             ;slope and intercept data
    COUNT4  EQU    $04             ;ADC upper byte count
    COUNT5  EQU    $10             ;DAC and serial EEPROM counter, 16 bits
    COUNT6  EQU    $15             ;Calibration data count from EEPROM
    COUNT7  EQU    $06             ;serial EEPROM address bits counter
    COUNT8  EQU    $08             ;ADC lower byte count
    COUNT9  EQU    $05             ;Multiply result adjust

* RAM Location Equates

ORG    $90             ;Beginning of RAM in 705J2
    DUMMYH  RMB    1               ;EEPROM address count location
    DUMMYL  RMB    1               ;Temporarily inserted to test cal mode
    SNSRH   RMB    1               ;Hall sensor voltage upper 4 bits
    SNSRL   RMB    1               ;Hall sensor voltage lower 8 bits
    MULTH   RMB    1               ;high byte of slope
    MULTL   RMB    1               ;low byte of slope
    RESULT1 RMB    1               ;multiplication result storage
    RESULTH RMB    1               ;multiplication result storage
    RESULTL RMB    1               ;multiplication result storage
    RESULT4 RMB    1               ;multiplication result storage
    THRMSTH RMB    1               ;thermistor voltage upper 4 bits
    THRMSTL RMB    1               ;thermistor voltage lower 8 bits
    REGA    RMB    1               ;register A
    INDEX1  RMB    1               ;Data point offset index
    CNT1    RMB    1               ;Counter #1
    CNT2    RMB    1               ;Counter #2
    CNT3    RMB    1               ;Counter #3
    CNT4    RMB    1               ;Counter #4
    CNT5    RMB    1               ;Counter #5
    TMPAH   RMB    1               ;High byte of data to D/A
    TMPAL   RMB    1               ;Low byte of data to D/A
    EEADDR  RMB    1               ;Serial EEPROM address
    EEDATI  RMB    3               ;Serial EEPROM address in
    EEDATO  RMB    1               ;EEPROM shift address out location
    EEDOUTH RMB    1               ;upper byte of data from EEPROM
    EEDOUTL RMB    1               ;lower byte if data from EEPROM
    EERAM   RMB    2               ;Thermistor calibration data
    CALDAT1 RMB    2               ;Calibration point #1
    CALDAT2 RMB    2               ;Calibration point #2
    CALDAT3 RMB    2               ;Calibration point #3
    CALDAT4 RMB    2               ;Calibration point #4
    CALDAT5 RMB    2               ;Calibration point #5
    CALDAT6 RMB    2               ;Calibration point #6
    MDATA1  RMB    4               ;Slope intercept data pt. #1
    MDATA2  RMB    4               ;Slope intercept data pt. #2
    MDATA3  RMB    4               ;Slope intercept data pt. #3
    MDATA4  RMB    4               ;Slope intercept data pt. #4
    MDATA5  RMB    4               ;Slope intercept data pt. #5
    MDATA6  RMB    4               ;Slope intercept data pt. #6
    MDATA7  RMB    4               ;Slope intercept data pt. #7
    EECNTR  RMB    1               ;counter for serial EEPROM
    CALC    RMB    1               ;storage for intercept determination
```

```
************************************************************
*                     MAIN PROGRAM                          *
************************************************************

ORG     $700                :Start of EPROM
* Initialize Data Direction Registers
START   JSR     INITREG             :Initialize registers
* Check if calibration mode requested.
CALTST  BRCLR   CALIB.PORTB.CALMOD  :Calibrate mode [CALIB = Low]??
        JMP     NORMAL

************************************************************
* Calibration Mode - Determine constants for sensor & write *
*                    conversion data to serial EEPROM.      *
************************************************************
* Read sensor voltage at cal pts.

CALMOD  BSET    DDRB5.DDRB          :Set COMPIN (EPDout) as output
        BSET    DDRB0.DDRB          :Set EPCS as output
        BCLR    EPDOUT.PORTB        :Clear bit PB5
        BCLR    EPCS.PORTB          :Clear bit PB0
        BCLR    DDRB4.DDRB          :Set COMPOUT (EPDIN) as input
        BCLR    DDRA7.DDRA          :Set EXCLK to input
        LDA     #COUNT2             :Initialize cal pt counter
        STA     CNT2                : CNT2 = 9
        JSR     DELAY
        BRSET   CALIB.PORTB.SHORT   : Check if EEPROM loading
READCHK BRSET   EPDIN.PORTB.TEMPI   :Check for signal to take reading
        BRSET   CALIB.PORTB.SHORT   : Check if EEPROM loading
        BRA     READCHK
TEMPI   JSR     TEMP                :Read thermistor voltage
        LDA     THRMSTH
        STA     TMPAH               :Copy to DAC location - upper 4 bits
        LDA     THRMSTL
        STA     TMPAL               :Copy to DAC location - lower 8 bits
        JSR     DAOUT               :Output reading
        BSET    EPDOUT.PORTB        :Vout is ready to be read
LOOK    BRCLR   EPDIN.PORTB.SEND1
        BRSET   CALIB.PORTB.SHORT   : Check if calibrate signal high
        BRA     LOOK
SEND1   BRSET   EPDIN.PORTB.TEMPII  :Check for signal to send data
        BRSET   CALIB.PORTB.SHORT   : Check if calibrate signal high
        BRA     SEND1
TEMPII  LDX     #THRMSTH            :Upper 4 bit location of data
        LDA     #COUNT1             :Initialize data size
        STA     CNT1
NEXTT   ROR     0.X                 :Rotate right into carry
        ROR     1.X
        BCC     OUTT                :Carry bit set??
        BSET    EPDOUT.PORTB        :Output data bit = 1
TST1T   BRCLR   EXCLK.PORTA.TST2T   :EXCLK = 0?
        BRSET   CALIB.PORTB.SHORT   : Check if calibrate signal high
        BRA     TST1T
TST2T   BRSET   EXCLK.PORTA.TST3T   :EXCLK = 1?
        BRSET   CALIB.PORTB.SHORT   : Check if calibrate signal high
        BRA     TST2T
OUTT    BCLR    EPDOUT.PORTB        :Output data bit = 0
        BRA     TST1T
TST3T   DEC     CNT1
        BNE     NEXTT
        BCLR    EPDOUT.PORTB        :EPDout low at end of reading
* End of temperature reading
        DEC     CNT2
LOOK2   BRCLR   EPDIN.PORTB.BYTE    :Check EPDin goes low
```

```
        BRSET   CALIB.PORTB.SHORT   : Check if calibrate signal high
        BRA     LOOK2
SHORT   BRA     LDEE            :gets rid of parameter out of range
BYTE    BSET    EPDOUT.PORTB    :EPDout high
SELF    BRSET   EPDIN.PORTB.TMFIN   :Check for signal to take reading
        BRSET   CALIB.PORTB.SHORT   : Check if calibrate signal high
        BRA     SELF
TMFIN   BCLR    EPDOUT.PORTB        :EPDout low
LOOK3   BRCLR   EPDIN.PORTB.SEND2   :Check EPDin goes low
        BRSET   CALIB.PORTB.SHORT   : Check if calibrate signal high
        BRA     LOOK3
SEND2   JSR     SENSOR              ;Get sensor voltage
        CLR     DUMMYH
        CLR     DUMMYL
        LDA     SNSPH
        STA     DUMMYH
        STA     TMPAH               ;Copy to DAC location - upper 4 bits
        LDA     SNSRL
        STA     DUMMYL
        STA     TMPAL               :Copy to DAC location - lower 8 bits
        JSR     DAOUT               ;Output reading
        CLR     DUMMYH
        CLR     DUMMYL
        LDA     SNSRH
        STA     DUMMYH
        STA     TMPAH               :Copy to DAC location - upper 4 bits
        LDA     SNSRL
        STA     DUMMYL
        STA     TMPAL               :Copy to DAC location - lower 8 bits
        JSR     DAOUT               :Output reading
        BSET    EPDOUT.PORTB        :Indicate ready to send
SELF3   BRSET   EPDIN.PORTB.TMFOUT  :Check for signal to send data
        BRSET   CALIB.PORTB.SHORT   : Check if calibrate signal high
        BRA     SELF1
TMFOUT  LDX     #SNSRH
        LDA     #COUNT1             :initialize data size
        STA     CNT1
NEXT    ROR     0.X                 :Rotate right into carry
        ROR     1.X
        BCC     OUT                 :Carry bit set??
        BSET    EPDOUT.PORTB        :Output data bit = 1
TST1    BRCLR   EXCLK.PORTA.TST2    :EXCLK = 0?
        BRSET   CALIB.PORTB.SHORT   : Check if calibrate signal high
        BRA     TST1
TST2    BRSET   EXCLK.PORTA.TST3    :EXCLK = 1?
        BRSET   CALIB.PORTB.SHORT   : Check if calibrate signal high
        BRA     TST2
TST3    DEC     CNT1
        BNE     NEXT
        BCLR    EPDOUT.PORTB        :EPDout low at end of reading
        BRA     LOOK2

OUT     BCLR    EPDOUT.PORTB        ;Output data bit = 0
        BRA     TST1

CALM1   JMP     CALMOD

*****************************************************************
* DELAY - Routine to delay for approximately 50.5 milliseconds   *
*****************************************************************
DELAY   LDA     #$09
DLY     DECA
        BNE     DLY
        RTS

*****************************************************************
```

```
* LDEE - Serial EEPROM selected for loading
*****************************************************************
LDEE      BRSET   EPDIN,PORTB,EERD
EERD      BCLR    DDRB5,DDRB         ;Set COMPIN (EPDOUT) to input
          BCLR    DDRB0,DDRB         ;Set EFCS to input
          LDA     #$FF
STLOOP    DECA
          BNE     STLOOP
EEFIN     BRSET   CALIB,PORTB,NORMAL ;Return to normal mode
          BRA     EEFIN

*****************************************************************
* Continuation of MAIN program after calibration mode check.     *
*****************************************************************
NORMAL    BSET    DDRB0,DDRB         ;Set EFCS to output
          BSET    DDRB4,DDRB         ;Set COMPOUT (EPDIN) to output
          BCLR    DDRB5,DDRB         ;Set COMPIN (EPDOUT) to input
          BSET    DDRA7,DDRA         ;Set EXCLK to output
          JSR     LDRAM              ;Load RAM with EEPROM cal data
          CLR     RESULT4
          CLR     RESULTL
          JMP     V_OUT
DEC19     JSR     TEMP               ;Read thermistor voltage
          BRCLR   CALIB,PORTB,CALM1  ;Calibrate mode (CALIB = Low)?
          JSR     SENSOR             ;Read hall effect sensor
*****************************************************************
* Slope/Intercept constants - Determine slope and intercept values *
*****************************************************************
          CLR     INDEX1
          LDX     INDEX1             ;offset address of cal. data
          LDA     SNSRH              ;Read upper 4 bits sensor data
          AND     #$0F               ;mask out upper 4 bits
          CMP     CALDAT1,X          ;Compare upper 4 bits of input data
          BHS     CHK1               ;Branch if higher or same
          LDX     #MDATA1            ;Use slope/intercept data #1
          STX     CALC               ; 1/12/95
          JSR     CNVRT              ;Determine required voltage
          JMP     V_OUT              ;Jump to output voltage routine CHK1      BHI     CHK2               ;Branch if higher
          LDA     SNSRL
          INCX
          CMP     CALDAT1,X          ;Compare lower 8 bits sensor data
          BHS     CHK3
          LDX     #MDATA1            ;Use slope/intercept data #1
          STX     CALC
          JSR     CNVRT              ;Determine required voltage
*         LDA     RESULTL
*         CMPA    0
*         BEQ     OUTPUT1            ;Check if overflow occurred
*         LDA     #$FF               ;set to output highest reading
*         SUB     RESULT4
*         STA     RESULT4
*         LDA     #$FF
*         SBC     RESULTL
*         STA     RESULTL
OUTPUT1   JMP     V_OUT              ;Jump to output voltage routine CHK3      LDX     #MDATA2            ;Use slope/intercept data #2
          STX     CALC
          JSR     CNVRT              ;Determine required voltage
          JMP     V_OUT              ;Jump to output voltage routine CHK2      CLR     INDEX1
          LDX     INDEX1             ;offset address of cal. data
          CMP     CALDAT2,X          ;Compare upper 4 bits of input data
```

```
          BHS     CHK4            ;Branch if higher or same
          LDX     #MDATA2         ;Use slope/intercept data #2
          STX     CALC
          JSR     CNVRT           ;Determine required voltage
          JMP     V_OUT           ;Jump to output voltage routine CHK4      BHI     CHK5            ;Branch if higher
          LDA     SNSRL
          INCX
          CMP     CALDAT2,X       ;Compare lower 8 bits sensor data
          BHS     CHK6
          LDX     #MDATA2         ;Use slope/intercept data #2
          STX     CALC
          JSR     CNVRT           ;Determine required voltage
          JMP     V_OUT           ;Jump to output voltage routine CHK6      LDX     #MDATA3         ;Use slope/intercept data #3
          STX     CALC
          JSR     CNVRT           ;Determine required voltage
          JMP     V_OUT           ;Jump to output voltage routine CHK5      CLR     INDEX1
          LDX     INDEX1          ;offset address of cal. data
          CMP     CALDAT3,X       ;Compare upper 4 bits of input data
          BHS     CHK7            ;Branch if higher or same
          LDX     #MDATA3         ;Use slope/intercept data #3
          STX     CALC
          JSR     CNVRT           ;Determine required voltage
          JMP     V_OUT           ;Jump to output voltage routine CHK7      BHI     CHK8            ;Branch if higher
          LDA     SNSRL
          INCX
          CMP     CALDAT3,X       ;Compare lower 8 bits sensor data
          BHS     CHK9
          LDX     #MDATA3         ;Use slope/intercept data #3
          STX     CALC
          JSR     CNVRT           ;Determine required voltage
          JMP     V_OUT           ;Jump to output voltage routine CHK9      LDX     #MDATA4         ;Use slope/intercept data #4
          STX     CALC
          JSR     CNVRT           ;Determine required voltage
          JMP     V_OUT           ;Jump to output voltage routine CHK8      CLR     INDEX1
          LDX     INDEX1          ;offset address of cal. data
          STX     CALC
          CMP     CALDAT4,X       ;Compare upper 4 bits of input data
          BHS     CHK10           ;Branch if higher or same
          LDX     #MDATA4         ;Use slope/intercept data #4
          STX     CALC
          JSR     CNVRT           ;Determine required voltage
          JMP     V_OUT           ;Jump to output voltage routine CHK10     BHI     CHK11           ;Branch if higher
          LDA     SNSRL
          INCX
          CMP     CALDAT4,X       ;Compare lower 8 bits sensor data
          BHS     CHK12
          LDX     #MDATA4         ;Use slope/intercept data #4
          STX     CALC
          JSR     CNVRT           ;Determine required voltage
          JMP     V_OUT           ;Jump to output voltage routine CHK12     LDX     #MDATA5         ;Use slope/intercept data #5
```

```
          STX     CALC
          JSR     CNVRT           ;Determine required voltage
          JMP     V_OUT           ;Jump to output voltage routine CHK11     CLR     INDEX1
          LDX     INDEX1          ;offset address of cal. data
          CMP     CALDAT5,X       ;Compare upper 4 bits of input data
          BHS     CHK13           ;Branch if higher or same
          LDX     #MDATA5         ;Use slope/intercept data #5
          STX     CALC
          JSR     CNVRT           ;Determine required voltage
          JMP     V_OUT           ;Jump to output voltage routine CHK13     BHI     CHK14           ;Branch if higher
          LDA     SNSRL
          INCX
          CMP     CALDAT5,X       ;Compare lower 8 bits sensor data
          BHS     CHK15
          LDX     #MDATA5         ;Use slope/intercept data #5
          STX     CALC
          JSR     CNVRT           ;Determine required voltage
          JMP     V_OUT           ;Jump to output voltage routine CHK15     LDX     #MDATA6         ;Use slope/intercept data #6
          STX     CALC
          JSR     CNVRT           ;Determine required voltage
          JMP     V_OUT           ;Jump to output voltage routine CHK14     CLR     INDEX1
          LDX     INDEX1          ;offset address of cal. data
          CMP     CALDAT6,X       ;Compare upper 4 bits of input data
          BHS     CHK16           ;Branch if higher or same
          LDX     #MDATA6         ;Use slope/intercept data #6
          STX     CALC
          JSR     CNVRT           ;Determine required voltage
          JMP     V_OUT           ;Jump to output voltage routine CHK16     BHI     CHK17           ;Branch if higher
          LDA     SNSRL
          INCX
          CMP     CALDAT6,X       ;Compare lower 8 bits sensor data
          BHS     CHK17
          LDX     #MDATA6         ;Use slope/intercept data #6
          STX     CALC
          JSR     CNVRT           ;Determine required voltage
          LDA     RESULTL
          AND     #$08
          BNE     OUTPUT2         ;Check if overflow occurred
          LDA     #$FF            ;set to output highest reading
          STA     RESULTL
          STA     RESULT4
OUTPUT2   JMP     V_OUT           ;Jump to output voltage routine CHK17     LDX     #MDATA7         ;Use slope/intercept data #7
          STX     CALC
          JSR     CNVRT           ;Determine required voltage
          LDA     RESULTL
          AND     #$08
          BNE     OUTPUT          ;Check if overflow occurred
          LDA     #$FF            ;set to output highest reading
          STA     RESULTL
          STA     RESULT4
OUTPUT    JMP     V_OUT           ;Jump to output voltage routine

*******************************************************
* CNVRT - multiplies slope and adds intercept         *
```

```
************************************************
CNVRT    LDA     0,X                 ;get uppr byte of conversion data
         BMI     MNSFLG              ;set flag bit 6 in register A
CONT1    STA     MULTH               ;store uppr byte of cal data for multiply
         LDA     1,X                 ;get lwr byte of conversion data
         STA     MULTL               ;store lwr byte of conv. data for multiply
         LDA     SNSRH
         STA     DUMMYH
         LDA     SNSRL
         STA     DUMMYL
         BRSET   REGA6,REGA,CRRCT    ;Convert cal data to unsigned positive
MTPLY    JSR     MULTA               ;perform multiplication
         BSET    REGA0,REGA
         LDA     #$0C
SHIFT5   CLC                         ;Shift to right 12 bits
         ROR     RESULT1
         ROR     RESULTH
         ROR     RESULTL
         ROR     RESULT4
         DECA
         BNE     SHIFT5
         BCLR    REGA7,REGA
         BRSET   REGA6,REGA,CRRCT2   ;Convert to twos complement if negative
TC2      BCLR    REGA0,REGA
         BCLR    REGA7,REGA
         BCLR    REGA6,REGA
         CLC
         LDX     CALC                ;load slope used for calc. address
         LDA     3,X                 ;set lower intercept byte
         STA     DUMMYL
         LDA     RESULT4
         SUB     DUMMYL
         STA     RESULT4             ;deviation lower byte
         LDA     2,X                 ;set higher intercept byte
         STA     DUMMYH
         LDA     RESULTL
         SBC     DUMMYH
         STA     RESULT1             ;deviation higher byte
         RTS CRRCT    LDA     #$12
         CLC
MODIFY   DECA
         BEQ     DONE2
         ROR     MULTH
         ROR     MULTL
         BCC     CHKRGA
         BRCLR   REGA7,REGA,BTSET
         CLC
         BRA     MODIFY

CHKRGA   BRCLR   REGA7,REGA,MODIFY
         SEC
         BRA     MODIFY

DONE2    BRA     MTPLY

MNSFLG   BSET    REGA6,REGA          ;set flag in register - negative value
         BRA     CONT1

BTSET    BSET    REGA7,REGA
         SEC
         BRA     MODIFY

CRRCT2   LDA     #$012
         CLC
```

```
MODIFY2   DECA
          BEQ     DONE3
          ROR     RESULT4
          ROR     RESULTL
          BCC     CHKRGA2
          BRCLR   REGA7,REGA,BTSET2
          CLC
          BRA     MODIFY2

CHKRGA2   BRCLR   REGA7,REGA,MODIFY2
          SEC
          BRA     MODIFY2

DONE3     BRA     TC2

BTSET2    BSET    REGA7,REGA
          SEC
          BRA     MODIFY2

*****************************************************************
* V_OUT - Subtracts deviation from input reading and outputs to DAC *
*****************************************************************
V_OUT     CLC
          LDA     RESULT4         ;temp check 12-10-94
          STA     TMPAL           ;store lower byte result for DAC
          LDA     RESULTL         ;temp check 12-10-94
          STA     TMPAH           ;store higher byte result for DAC
          JSR     DAOUT           ;Output voltage
          JMP     DEC19

*****************************************************************
* TEMP - Read thermistor voltage                                 *
*****************************************************************
TEMP      BSET    REGA3,REGA      ;Set for thermistor
          BCLR    ADCS,PORTA      ;LTC1298 CS# = low
          BSET    ADDIN,PORTA     ;Din - Start Bit & SGL/Diff#
          BSET    SCLK,PORTA      ;Clk = 1  Recognize start bit
          BCLR    SCLK,PORTA      ;Clk = 0
          BSET    SCLK,PORTA      ;Clk = 1  Recognize single-ended mode
          BCLR    SCLK,PORTA      ;Clk = 0
          BSET    SCLK,PORTA      ;Clk = 1  Recognize Channel 1
          BCLR    SCLK,PORTA      ;Clk = 0
          BSET    SCLK,PORTA      ;Clk = 1  Recognize MSB first
          BCLR    SCLK,PORTA      ;Clk = 0
          BCLR    ADDIN,PORTA
          JSR     ADREAD          ;Read data from A/D
          BCLR    REGA3,REGA      ;Clear thermistor indication
          BSET    ADCS,PORTA      ;LTC1298 CS# = high         RTS

*****************************************************************
* SENSOR - Read the sensor voltage from the LTC1298.             *
*****************************************************************
SENSOR    BCLR    ADCS,PORTA      ;LTC1298 CS# = low
          BSET    ADDIN,PORTA     ;Din - Start Bit & SGL/Diff#
          BSET    SCLK,PORTA      ;Clk = 1  Recognize start bit
          BCLR    SCLK,PORTA      ;Clk = 0
          BSET    SCLK,PORTA      ;Clk = 1  Recognize single-ended mode
          BCLR    SCLK,PORTA      ;Clk = 0
          BCLR    ADDIN,PORTA     ;Din - Select Channel 0
          BSET    SCLK,PORTA      ;Clk = 1  Recognize Channel 0
          BCLR    SCLK,PORTA      ;Clk = 0
          BSET    ADDIN,PORTA     ;Din - Select MSB first
          BSET    SCLK,PORTA      ;Clk = 1  Recognize MSB first
          BCLR    SCLK,PORTA      ;Clk = 0
          BCLR    ADDIN,PORTA
          JSR     ADREAD          ;Read data from A/D
```

```
        BSET    ADCS,PORTA      ;LTC1298 CS* = high
        RTS
*****************************************************************
* ADREAD - Read data from the A/D.                              *
*****************************************************************
ADREAD  CLR     SNSRH           ;Clear hall sensor RAM location
        CLR     SNSRL
        CLC                     ;clear carry bit
        LDA     #COUNT4         ;Load count for upper 4 bits
INPLOOP1 BSET   SCLK,PORTA      ;Clk = 1
        BCLR    SCLK,PORTA      ;Clk = 0
        BRCLR   ADDOUT,PORTA,INPUT1 ;Read one bit from A/D
INPUT1  ROL     SNSRH           ;Store bit into memory
        DECA
        BNE     INPLOOP1        ;Check if all upper 4 bits input
        LDA     #COUNT8         ;Load count for lower 8 bits
INLOOP2 BSET    SCLK,PORTA      ;Clk = 1
        BCLR    SCLK,PORTA      ;Clk = 0
        BRCLR   ADDOUT,PORTA,INPUT2 ;Read one bit from A/D
INPUT2  ROL     SNSRL           ;Store bit in memory
        DECA
        BNE     INLOOP2         ;Check if all lower 8 bits input
        LDA     #COUNT8         ;Set mask to check bit 3 of register A
        AND     REGA
        BEQ     DONE            ;If hall sensor reading end routine
        CLR     THRMSTH         ;Clear thermistor RAM location
        CLR     THRMSTL
        LDA     SNSRH
        STA     THRMSTH         ;upper 4 bits of thermistor reading
        LDA     SNSRL
        STA     THRMSTL         ;lower 8 bits of thermistor reading
DONE    RTS

*****************************************************************
* MULTA - Routine to multiply two 16 bit numbers                *
*****************************************************************
MULTA   LDX     #SNSRH          ;Load sensor voltage location
        CLR     4,X             ;Clear result location
        CLR     5,X
        CLR     6,X
        CLR     7,X
        LDA     #COUNT5         ;Initialize count
        STA     CNT1
UPMULT  ROR     0,X             ;Rotate multiplier right
        ROR     1,X
        BCC     NEXTMT          ;Carry Set?
        LDA     3,X             ;Yes. Add Multiplicand to result
        ADD     5,X
        STA     5,X
        LDA     2,X
        ADC     4,X
        STA     4,X
NEXTMT  ROR     4,X             ;Rotate result right
        ROR     5,X
        ROR     6,X
        ROR     7,X
        DEC     CNT1            ;Decrement count
        BNE     UPMULT          ;Repeat if count not zero
        RTS

*****************************************************************
* DAOUT - Input data to get DAC output voltage                  *
*                                                               *
```

```
* TMPAH - high byte of data to send to D/A              *
* TMPAL - lower byte of data to send to D/A             *
*********************************************************
DAOUT   BCLR    SCLK.PORTA      ;Clk = 0
        LDA     COUNT5          ;Initialize counter to 16 bits
        STA     CNT5
        BCLR    DACS.PORTA      ;Enable DAC input CS* = low
        CLC                     ;Clear carry bit
DALOOP  ROL     TMPAL
        ROL     TMPAH
        BCS     DAONE           ;OUTPUT A ONE??
        BCLR    DADIN.PORTA     ;Send a zero to D/A input
        BSET    SCLK.PORTA      ;Clk = 1
        BCLR    SCLK.PORTA      ;Clk = 0
        DEC     CNT5
        BEQ     DADONE          ;Check if done
        BRA     DALOOP
DAONE   BSET    DADIN.PORTA     ;Send a one to D/A input
        BSET    SCLK.PORTA      ;Clk = 1
        BCLR    SCLK.PORTA      ;Clk = 0
        DEC     CNT5
        BEQ     DADONE          ;Check if done
        BRA     DALOOP
DADONE  BSET    DACS.PORTA      ;Disable DAC input CS* = high
        JSR     DELAY
        RTS

*********************************************************
* SEREN - Serial EEPROM enable write routine            *
*********************************************************
SEREN   LDA     #$09            ;load count
        STA     CNT1
        LDA     #EWEN           ;load erase/write command
        BCLR    EXCLK.PORTA     ;Clk = 0
        BSET    EPCS.PORTB      ;Enable EEPROM chip select
EEEWEN  ROLA                    ;MSB into carry bit
        BCC     EEBO            ;Is carry set.
        BSET    EPDIN.PORTB     ;Bit = 1 out to EEPROM
        BSET    EXCLK.PORTA     ;Clk = 1
        BCLR    EXCLK.PORTA     ;Clk = 0
DOCHK   DEC     CNT1
        BEQ     EWRDONE         ;Check if finished
        BRA     EEEWEN
EEBO    BCLR    EPDIN.PORTB     ;Bit = 0 out to EEPROM
        BSET    EXCLK.PORTA     ;Clk = 1
        BCLR    EXCLK.PORTA     ;Clk = 0
        BRA     DOCHK
EWRDONE BCLR    EPCS.PORTB      ;Disable EEPROM chip select
        RTS

*********************************************************
* SERDS - Serial EEPROM disable write routine           *
*********************************************************
SERDS   LDA     #$09            ;load count
        STA     CNT1
        LDA     #EWDS           ;load erase/write command
        BCLR    EXCLK.PORTA     ;Clk = 0
        BSET    EPCS.PORTB      ;Enable EEPROM chip select
EEEWDS  ROLA                    ;MSB into carry bit
        BCC     EELO            ;Is carry set.
        BSET    EPDIN.PORTB     ;Bit = 1 out to EEPROM
        BSET    EXCLK.PORTA     ;Clk = 1
        BCLR    EXCLK.PORTA     ;Clk = 0
EETST   DEC     CNT1
        BEQ     EWROVER         ;Check if finished
```

```
            BRA     EEENDS
EELO        BCLR    EPDIN.PORTB     ;Bit = 0 out to EEPROM
            BSET    EXCLK.PORTA     ;Clk = 1
            BCLR    EXCLK.PORTA     ;Clk = 0
            BRA     EETST
EWROVER     BCLR    EPCS.PORTB      ;Disable EEPROM chip select
            RTS

*************************************************************
* EEDATIN - Serial EEPROM data write routine                 *
*************************************************************
EEDATIN     LDA     #$16            ;Load count = 22
            STA     CNT1
            BCLR    EXCLK.PORTA     ;ExClk = 0
            BSET    EPCS.PORTB      ;Enable EEPROM chip select
            BSET    EPDIN.PORTB     ;Start bit
            BSET    EXCLK.PORTA     ;ExClk = 1,recognize start bit
            BCLR    EXCLK.PORTA     ;ExClk = 0
            BCLR    EPDIN.PORTB     ;OP1 = 0
            BSET    EXCLK.PORTA     ;ExClk = 1,recognize OP1
            BCLR    EXCLK.PORTA     ;ExClk = 0
            BSET    EPDIN.PORTB     ;OP2 = 1
            BSET    EXCLK.PORTA     ;ExClk = 1,recognize OP2
            BCLR    EXCLK.PORTA     ;ExClk = 0
            LDX     EEDATI          ;Input address location
            ROL     2,X             ;adjust for upper two unused bits
            ROL     1,X
            ROL     0,X
            ROL     2,X
            ROL     1,X
            ROL     0,X
EDATIN      ROL     2,X             ;Rotate MSB into carry
            ROL     1,X
            ROL     0,X
            BCC     EEZRO           ;Is carry bit set
            BSET    EPDIN.PORTB     ;EPDIN = 1
CONT        BSET    EXCLK.PORTA     ;ExClk = 1,recognize bit
            BCLR    EXCLK.PORTA     ;ExClk = 0
            DEC     CNT2            ;Decrement bit counter
            BNE     EDATIN
            BCLR    EPCS.PORTB      ;Disable EEPROM chip select
            RTS
EEZRO       BCLR    EPDIN.PORTB     ;EPDIN = 0
            BRA     CONT

*************************************************************
* EDATOUT - Serial EEPROM data read routine                  *
*************************************************************
* Send bits to EEPROM to recognize a read command
EDATOUT     LDA     #COUNT7         ;Load count = 6
            STA     CNT1
            BCLR    EXCLK.PORTA     ;ExClk = 0
            BSET    EPCS.PORTB      ;Enable EEPROM chip select
            BSET    EPDIN.PORTB     ;Start bit
            BSET    EXCLK.PORTA     ;ExClk = 1,recognize start bit
            BCLR    EXCLK.PORTA     ;ExClk = 0
            BSET    EPDIN.PORTB     ;OP1 = 1
            BSET    EXCLK.PORTA     ;ExClk = 1,recognize OP1
            BCLR    EXCLK.PORTA     ;ExClk = 0
            BCLR    EPDIN.PORTB     ;OP2 = 0
            BSET    EXCLK.PORTA     ;ExClk = 1,recognize OP2
            BCLR    EXCLK.PORTA     ;ExClk = 0
* Transmit address of serial EEPROM location to read
            LDX     #EEDATO         ;Output address location
            ROL     0,X             ;adjust for upper two unused bits
```

```
             ROL     0,X
EEADR        ROL     0,X              ;Rotate MSB into carry
             BCC     EZERO            ;Is carry bit set?
             BSET    EPDIN.PORTB      ;EPDIN = 1
CNTADR       BSET    EXCLK.PORTA      ;ExClk = 1,recoonize bit
             BCLR    EXCLK.PORTA      ;ExClk = 0
             DEC     CNT1             ;Decrement bit counter
             BNE     EEADR
* Receive data from serial EEPROM
             LDA     #COUNT5          ;Load count = 16
             STA     CNT1
             LDX     #EEDOUTH         ;Load address to store data
DOIN         BSET    EXCLK.PORTA      ;ExClk = 1,recoonize bit
             BCLR    EXCLK.PORTA      ;ExClk = 0
             BRCLR   EPDOUT.PORTB,EINZRO ;Is input bit 1??
             SEC                      ;Set carry bit
CNTINP       ROL     1,X              ;Store data
             ROL     0,X
             DEC     CNT1
             BNE     DOIN
             BCLR    EPCS.PORTB       ;Disable EEPROM chip select
             RTS
* Subroutine EDATOUT loops
EZERO        BCLR    EPDIN.PORTB      ;EPDIN = 0
             BRA     CNTADR
EINZRO       CLC                      ;Clear carry bit
             BRA     CNTINP

*****************************************************************
* INITREG - Initialize Ports A & B and data direction            *
*****************************************************************
INITREG      LDA     #INIT1
             STA     PORTA            ;Initialize Port A to known state.
             LDA     #INIT2           ;ExClk,Din2,Dout2,CS*2,CLK,Dini,CS*1,Douti
             STA     DDRA             ;In, Out, In ,Out,Out,Out ,Out , In
             LDA     #INIT3
             STA     PORTB            ;Initialize Port B to known state.
             LDA     #INIT4           ;COMPin,COMPout, Cal, NU, NU, EPCS
             STA     DDRB             ; Out,   In,   In, Out, Out,  In
             CLR     REGA
             RTS

*****************************************************************
* LDRAM - Load RAM with serial EEPROM calibration data           *
*****************************************************************
LDRAM        LDA     COUNT6           ;21 words of calibration data
             STA     CNT2
             CLR     CNT3             ;offset for RAM address
             LDA     #INIT5            ;Starting address of cal data in EEPROM
             STA     DUMMYH
MORE         LDA     DUMMYH
             STA     EEDATD
             JSR     EDATOUT          ;Read 16 bit word from EEPROM
             LDX     CNT3             ;offset address of RAM data storage
             LDA     EEDOUTH          ;Higher byte from EEPROM
             STA     EERAM.X          ;Store in RAM
             INC     CNT3
             INCX
             LDA     EEDOUTL          ;Lower byte from EEPROM
             STA     EERAM.X          ;Store in RAM
             INC     CNT3
             INC     DUMMYH           ;Increment EEPROM address
             DEC     CNT2
             BNE     MORE             ;Any more data??
             RTS
```

```
UNUSED      RTI                     ;Unused interrupts

****************************************************************
* Interrupt & reset vectors                                     *
****************************************************************
            ORG     $OFF8           ;Start of vector area TIMVEC      FDB     UNUSED          ;Change if vector used
IRQVEC      FDB     UNUSED          ;Change if vector used
SWIVEC      FDB     UNUSED          ;Change if vector used
RESETV      FDB     START           ;Beginning of a program on reset
```

What is claimed and desired to be secured by Letters Patent of the United States is:

1. An electronic circuit for automatically compensating for part to part errors in a sensor which generates predetermined sensor output signals within a predetermined output range, the circuit comprising:

means for sensing the output signal of said sensor;

means for automatically compensating for non-temperature related part to part errors in said output signal, wherein said compensating means includes means for storing ideal output values for said sensor at predetermined calibration points and means for generating compensation values as a predetermined function of said ideal values for the entire output range of the sensor and wherein said compensating means further includes means for automatically compensating for errors in the output signal resulting from temperature deviations.

2. An electronic circuit as recited in claim 1, wherein said predetermined sensor output signals are analog signals.

3. An electronic circuit as recited in claim 1, wherein said predetermined sensor output signals are digital signals.

4. An angular position sensor for sensing the angular position of a pivotally mounted device mounted in a predetermined housing comprising:

a sensor housing adapted to be mechanically coupled to said predetermined housing;

a circular magnet with a central aperture for generating magnetic flux defining a magnetic axis through opposing North and South magnetic poles;

a drive arm, rotatably carried relative to said sensor housing, said drive arm including means for providing a mechanical coupling to said pivotally mounted device and means for carrying said magnet;

means at least partially disposed within said central aperture of said magnet for sensing the magnetic flux density generated by said magnet, said sensing means disposed at a substantially constant air gap relative to said magnet; and means for enabling continuous mechanical adjustment of the sensitivity of said generating means.

5. An angular position sensor as recited in claim 4, further including means for providing temperature compensation for said sensor.

6. An angular position sensor as recited in claim 4, further including means for hermetically sealing said generating means.

7. An angular position sensor as recited in claim 6, wherein said sealing means includes a potting compound.

8. An angular position sensor as recited in claim 6, wherein said potting compound is an epoxy.

9. An angular position sensor as recited in claim 4, wherein said housing is formed from a predetermined non-magnetically conductive material.

10. An angular position sensor as recited in claim 9, wherein said predetermined material is plastic.

11. An angular position sensor for sensing the angular position of a pivotally mounted device mounted in a predetermined housing about a predetermined pivot axis, said sensor comprising:

a sensor housing adapted to be mechanically coupled to said predetermined housing, said housing including means for enabling rotatable coupling to said pivotally mounted device in said predetermined housing;

means for providing magnetic signals that vary as a function of the angular position of said pivotally mounted device including means for providing a mechanical coupling to said pivotally mounted device and a magnet having north and south magnetic poles defining one or more magnetic axes therethrough;

means responsive to said magnetic signals for generating electrical signals representative of said angular position of said pivotally mounted device, said generating means having a sensing plane for sensing said magnetic signals, said generating means having a predetermined offset voltage when said sensing plane is generally aligned with said magnetic axis; said generating spaced away from said providing means defining a predetermined substantially constant air gap; and sensitivity adjustment means for mechanically adjusting the sensitivity of said generating means.

12. An angular position sensor as recited in claim 11, wherein said magnet is a circular magnet.

13. An angular position sensor as recited in claim 11, further including means for linearizing the output signal of said generating means.

14. An angular position sensor for sensing the angular position of a pivotally mounted device about a predetermined pivot axis disposed in a predetermined housing, said sensor comprising:

a sensor housing adapted to be mechanically coupled to said predetermined housing and for enabling rotatable coupling with said pivotally mounted device;

means for providing magnetic signals that vary as a function of the angular position of said pivotally mounted device including a magnet having opposing north and south magnetic poles defining one or more magnetic axes therethrough, said providing means including means for providing a rotatable coupling to said pivotally mounted device in said predetermined housing; and means responsive to said magnetic signals for generating electrical signals representative of the angular position of said pivotally mounted device, including a Hall effect device having a predetermined sensing plane, said sensing plane disposed substantially parallel with respect to said predetermined pivot axis.

15. An angular position sensor as recited in claim 14 further including means for linearizing the output signals from said generating means.

16. An angular position sensor for sensing the angular position of a pivotally mounted device about a predetermined pivot axis, said angular position sensor including a housing; coupling means for providing a mechanical coupling to said pivotally mounted device, rotatably mounted relative to said housing; magnetic field generating means having North and South poles; and signal generating means responsive to said coupling means are generating an electrical signal representative of the angular position of said pivotally mounted device, characterized in that said magnetic field generating means consist of a circular magnet with a central aperture defining two semicircular portions of opposite magnetic polarities and that said signal generating means are disposed within said central aperture.

17. An electronic circuit for automatically compensating errors in the output signal of a displacement type sensor which generates predetermined sensor output signals within a predetermined output range, the errors due to part to part variations said sensor, said electronic circuit comprising:

a memory for storing ideal values for said output signals at predetermined points within said predetermined output range of said sensor:

means for compensating said output signals to compensate for part to part variations in said sensor relative to said stored ideal values and generating compensated output signals corresponding to said sensor output signals: and means for compensating for errors due to temperature variations.

18. An electronic circuit as recited in claim 17, wherein said predetermined sensor output signals are analog signals.

19. An electronic circuit as recited in claim 17, wherein said predetermined sensor output signals are digital signals.

* * * * *